United States Patent [19]

Sabot et al.

[11] Patent Number: 5,347,654
[45] Date of Patent: Sep. 13, 1994

[54] SYSTEM AND METHOD FOR OPTIMIZING AND GENERATING COMPUTER-BASED CODE IN A PARALLEL PROCESSING ENVIRONMENT

[75] Inventors: Gary W. Sabot, Cambridge; David F. Lively, Georgetown; Alexander D. Vasilevsky, Watertown, all of Mass.

[73] Assignee: Thinking Machines Corporation, Cambridge, Mass.

[21] Appl. No.: 830,564

[22] Filed: Feb. 3, 1992

[51] Int. Cl.⁵ ............................................. G06F 15/16
[52] U.S. Cl. ............................. 395/600; 364/DIG. 1; 364/280.5; 364/228; 364/229.41
[58] Field of Search ............... 395/200, 325, 600, 650, 395/800

[56] References Cited

U.S. PATENT DOCUMENTS

| | | |
|---|---|---|
| 4,598,400 | 7/1986 | Hillis . |
| 4,773,038 | 9/1988 | Hillis et al. . |
| 4,827,403 | 5/1989 | Steele, Jr. et al. . |
| 4,984,235 | 1/1991 | Hillis et al. . |
| 5,129,077 | 7/1992 | Hillis ............................. 364/DIG. 1 |
| 5,187,801 | 2/1993 | Zenios et al. ....................... 395/800 |

OTHER PUBLICATIONS

David Douglas et al., "The Architecture of the CM-2 Data Processor", Technical Report HA88-1, Thinking Machines Corp., Cambridge, Mass., Apr. 1988.
Gary Sabot et al., "CM Fortran Optimization Notes: Slicewise Model", Technical Report TMC-184, Thinking Machines Corp., Cambridge, Mass., Mar. 1991.
Gary Sabot, "Optimized CM Fortran Compiler for the Connection Machine Computer", *Proceedings of the IEEE Intl. Conf. on System Sciences*, pp. 161-172, Jan. 1992.
Aho, et al., "Compilers-Principles, Techniques and Tools", Chapter 1 (Mar. 1988).

*Primary Examiner*—Thomas Heckler
*Attorney, Agent, or Firm*—Sterne, Kessler, Goldstein & Fox

[57] ABSTRACT

A system and method for optimizing statements to produce more efficient assembly language for use in a parallel processing environment. In doing this, the present invention separates elemental from non-elemental nodes in a statement, encapsulates the elemental statements, and generates a parallel assembly language code stream from encapsulated statements, and a scalar code stream from scalar statements and non-elemental nodes (for which the scalar assembly language is used to utilize a non-elemental resolver).

19 Claims, 35 Drawing Sheets

INDICIES
(PROCESSORS)

| | 1 | 2 | 3 | 4 | 5 | 6 | 7 | 8 |
|---|---|---|---|---|---|---|---|---|
| A | 12 | 15 | 4 | 17 | 9 | 3 | 22 | 8 |

| | 1 | 2 | 3 | 4 | 5 | 6 | 7 | 8 |
|---|---|---|---|---|---|---|---|---|
| B | 5 | 6 | 11 | 16 | 2 | 4 | 18 | 7 |

*Figure 1A*

PRE-RESTRUCTURED LIR TREES (D1) INTEGER a(1000), c(1000)
 (1) RESULT = 1+CSHIFT (Q * C, 1, 9)
 (2) RESULT = RESULT * 2
 (3) a = 0
 (4) c = 0

---

(1)

(2)

(3)

(4)

RESTRUCTURED LIR TREES (D2)  INTEGER a(1000), c(1000), TEMP1 (1000), TEMP2 (1000)
 (5)  TEMP1 = a * c
 (6)  TEMP2 = C SHIFT (TEMP1, 1, 9)
 (7)  RESULT = 1 + TEMP2
 (8)  RESULT = RESULT * 2
 (9)  a = 0
(10)  c = 0

---

(5)

(6)

(10)

(7)

(8)

(9)

LIR
INTEGER a(1000), c(1000), TEMP1 (1000), TEMP2 (1000), Z(300)

(1)

(2)

(3)

(4)

(5)

(6)

(7)

MAXIMAL CONTIGUOUS ELEMENTAL BLOCKS $$\begin{bmatrix} (8) & X = CSHIFT\ (RESULT,\ 1,\ 1) \\ (9) & Y = 1 + RESULT \\ (10) & Z = 3 + RESULT \end{bmatrix}$$

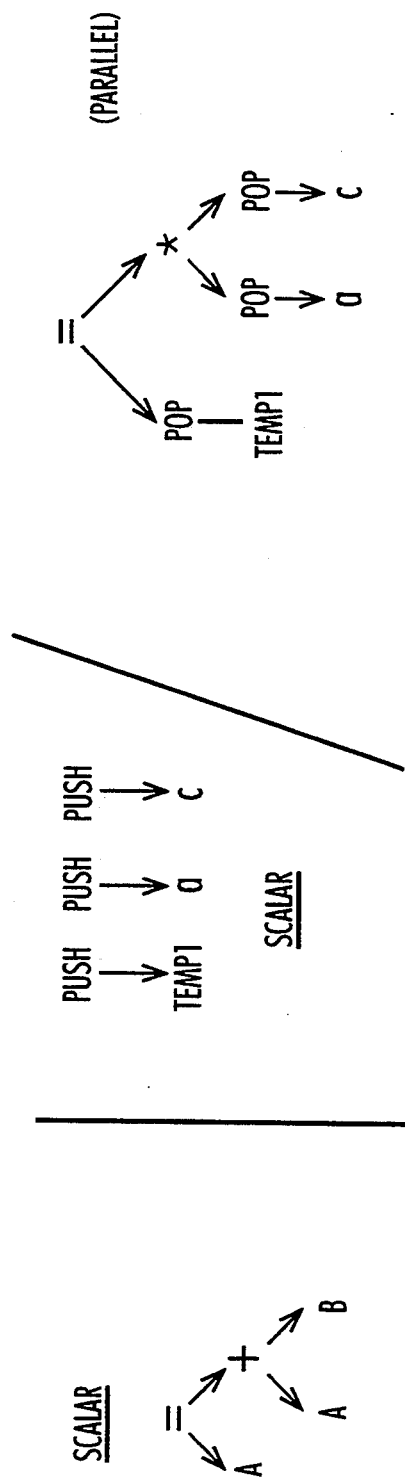
*Figure 21A*
*Figure 21B*
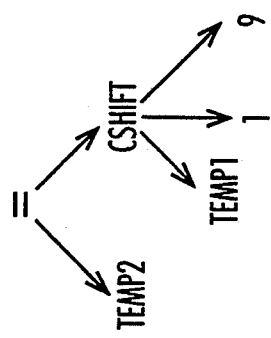
*Figure 21C*

SYSTEM AND METHOD FOR OPTIMIZING AND GENERATING COMPUTER-BASED CODE IN A PARALLEL PROCESSING ENVIRONMENT

CROSS-REFERENCE TO OTHER APPLICATIONS

The following applications are assigned to the assignee of the present application:

U.S. patent application Ser. No. 07/042,761, filed Apr. 27, 1987, by W. Daniel Hillis, entitled "Method and Apparatus for Simulating M-Dimensional Connection Networks in an N-Dimensional Network Where M is Less Than N", now U.S. Pat. No. 5,050,069, incorporated herein by reference.

U.S. patent application entitled "System and Method for Mapping Array Elements to Processing Elements", Ser. No. 07/829,480, filed Feb. 3, 1992, abandoned, incorporated herein by reference.

U.S. patent application entitled "System and Method for Compiling Towards A Super-Pipelined Architecture", Ser. No. 07/827,945, filed Feb. 3, 1992, incorporated herein by reference.

U.S. patent application entitled "Vector Parallel Model", Ser. No. 07/827,942, filed Feb. 3, 1992, now U.S. Pat. No. 5,274,818, incorporated herein by reference.

INCORPORATION BY REFERENCE

U.S. Pat. No. 4,589,400, issued Jul. 1, 1986, to W. Daniel Hillis, for "Method and Apparatus for Routing Message Packets", and assigned to the assignee of the present application, incorporated herein by reference.

U.S. Pat. No. 4,984,235, issued Jan. 8, 1991, to Hillis et al., for "Method and Apparatus for Routing Message Packets and Recording the Routing Sequence", and assigned to the assignee of the present application, incorporated herein by reference.

BACKGROUND OF THE INVENTION

1. Field of the Invention

The present invention is a computer-based system and method for optimizing parsed statements to be used for generating low level code, and for generating that low level code for a target computer having a scalar and a parallel portion.

2. Related Art

Over the past several years, society has placed an increasingly larger demand on the speed at which it expects computers to operate. This is due in large part to the desire to solve larger and more complex problems. This has driven computer manufacturers to design faster, more complex computers to keep up with these demands.

Most computers in the marketplace today have been designed using the traditional von Neumann architecture. This type of architecture basically contemplates using a single central processing unit (CPU) to execute the instructions of a computer program. Many computer companies desiring to create faster machines have concentrated on developing faster CPUs and continuing to design devices using von Neumann architecture.

In recent years, much interest has developed in the area of parallel processing. This concept contemplates using possibly tens of thousands of processors simultaneously to solve a specific problem. Using this scheme, the specific problem is divided up into tasks, and each of these tasks is sent to a specific processor to be executed. The result from each of these processors is then brought together again, yielding a final result. Of course, this is more complicated than it at first sounds, and there have been many problems in developing efficient and robust parallel processing devices.

In a typical computer program (and specific problem being solved) there are pieces that can be efficiently divided up into parallel tasks to be handled by a plurality of processors, and there are pieces where such division would be inefficient or highly impractical. Consequently, many parallel processing devices (referred to hereafter as a target computer) contain a scalar portion for executing scalar code (that is, that portion of the program which is best executed on a single processor device). Another portion of the target computer then contains multiple processors which can be used simultaneously to solve different portions of a particular problem. These two portions can be two different machines interconnected together, or they can be, for example, a single target device where one of the processors acts as the separate scalar processor.

In order to allow the various processors in a parallel processing environment to effectively communicate with one another to solve a problem, the importance of software to facilitate this communication cannot be overestimated. This is because it is the software that divides the problem into various portions, and then puts together a final result of each processor.

One way in which tasks might be divided so that they can be resolved in parallel is shown with regard to FIG. 1A. Referring now to FIG. 1A, two arrays (also called "parallel variables") are shown as variable A and variable B. One way that the tasks might be divided is along the lines of the indicies. Thus, one processor will be responsible for handling the contents of the arrays having an index of 1, another processor would be responsible for handling the contents of arrays having an index of 2, etc. This is indicated by the dotted lines in FIG. 1A. Thus, if A and B were added together and the result put into a parallel variable C, then A(1) will be added to B(1) by processor 1 and the result would be put into C(1). Similarly, A(2) would be added to B(2) by a second processor, etc. In this way, tasks can be broken up for each processor.

The situation becomes more complicated when an operation is to be performed that requires one processor to communicate with another processor. For example, if an answer is desired for $C(i)=A(i)+B(i+1)$ where $i=1$ to 7, then communication will be required among the different processors to resolve the equation. Based upon the way that the tasks would be divided in FIG. 1A, this equation is not as quickly resolvable as the one in the previous example.

One way to minimize communication in situations where the processors need to communicate with one another is to change the boundaries along which tasks are created. For example, one could A(1) and B(2) to one processor, A(2) and B(3) to another processor, etc. However, this would create considerable overhead to constantly change these boundaries in accordance with the problem being solved and that would result in a slower system.

It is noted that an entity (e.g., and equation or "statement") which utilize parallel variables and does not require communication among processors is termed "elemental," entities which utilize parallel variables and do require communication among processors are termed "non-elemental" and entities which do not utilize parallel variables are termed "scalar."

Thus, it can be seen that non-elemental entities (or portions thereof) are not as quickly executable as elemental ones, since communication between processors is necessary. Thus, what is needed is a scheme to minimize the effect of the non-elemental entites, while maximizing the efficiencies of elemental ones.

In addition to the problems of non-elemental statements, conventional technology generates a single assembly language code stream from source code for using both the parallel and scalar portions of a target computer. This creates difficulties, since a single mechanism needs to evaluate each line of this assembly language code stream to determine whether it is scalar or parallel. Thus, what is also needed is some mechanism to alleviate this difficulty.

SUMMARY OF THE INVENTION

The present invention overcomes the deficiencies of the devices discussed above by providing a system and method for separating non-elemental statements from elemental statements during the compilation phase of a computer program which is to be executed in a parallel processing environment. This then allows contiguous elemental statements to be grouped together to form what is effectively a single elemental block. This single elemental block can then be evaluated, and transformed into assembly language. The assembly language is then more efficient than that which would have been generated if the non-elemental statements had not been separated. In addition, this restructuring also allows the non-elemental statement to be handled separately.

In addition, the present invention also contemplates creating a scalar assembly language code stream and a separate parallel assembly language code stream. In this way, the scalar assembly language is executed on a scalar portion of the target computer while the parallel assembly language is executed on the parallel portion. In addition, the present invention also provides that the statements are modified so that assembly language to pass variables from the scalar portion to the parallel portion can be generated mor efficiently.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which:

FIG. 1A is used to illustrate a procedure for dividing tasks.

FIGS. 21A-21C, and FIG. 22 are examples of LIR statements used by the present invention from which low-level code is generated.

DETAILED DESCRIPTION OF THE PREFERRED EMBODIMENTS

I. General Overview

Figure 1B:
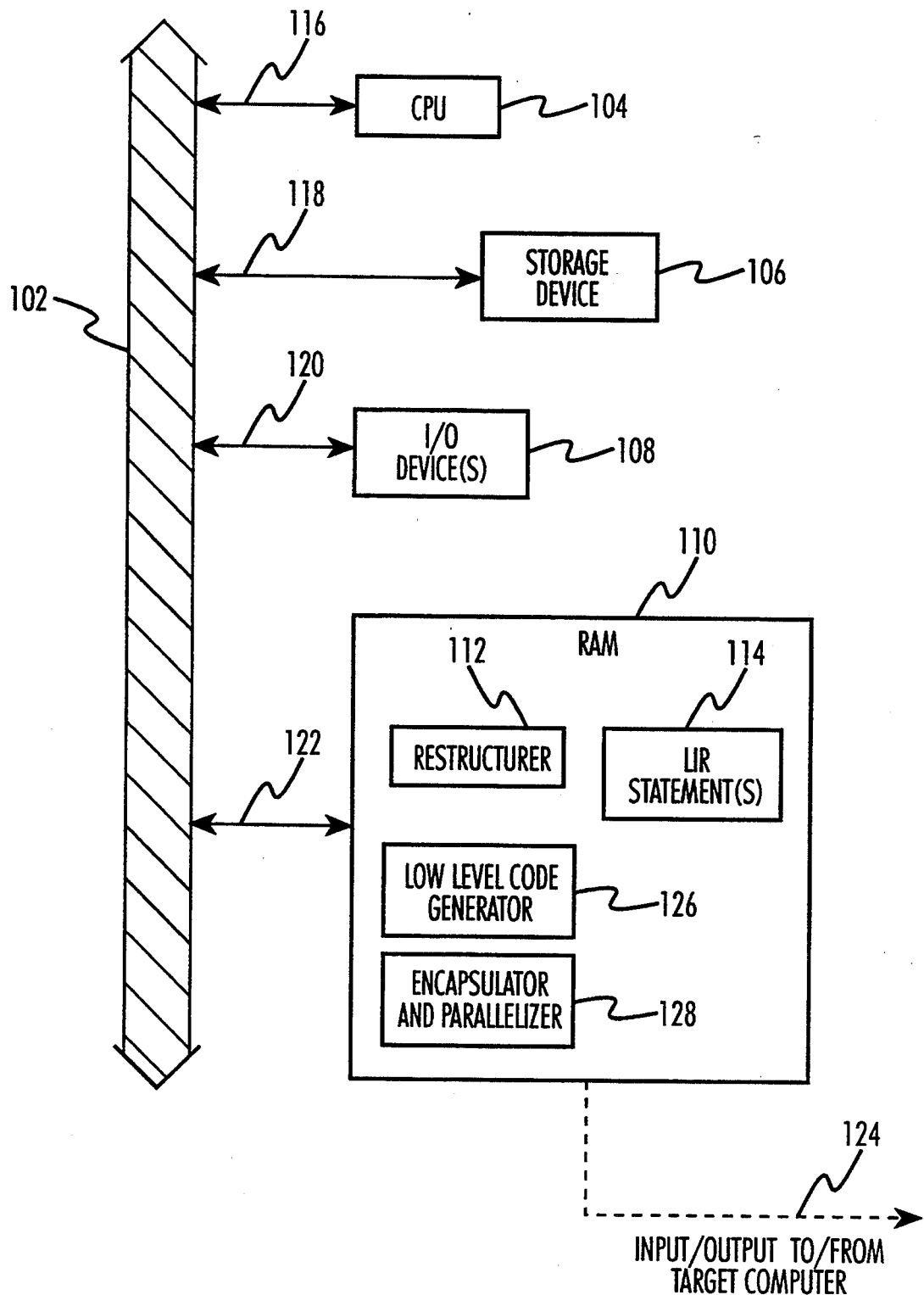
FIG. 1B shows a hardware environment as contemplated for use by embodiments of the present invention.

The present invention is a system and method for optimizing parsed statements to be used for generating low level code, and for generating that low level code for a target computer having a scalar and a parallel portion. More specifically, the present invention relates to a computer-based system and method for receiving source statements in a representational form such as a lowered intermediate representational (LIR) form, and for optimizing the LIR statement in a way that those nodes of the LIR statement which invoke communication between processors (or whose parent nodes invoke communication) are "restructured" (so that they themselves become statements) and are effectively separated from other nodes which do not invoke such communication. In essence, those "non-elemental" nodes which invoke communication (and which have been restructured into "non-elemental statements") are in a sense repositioned "above" the "elemental" nodes (which have themselves been restructured into statements).

Separating elemental nodes from non-elemental nodes to form elemental and non-elemental statements allows the present invention to encapsulate larger blocks of contiguous elemental statements. More specifically, embodiments of the present invention search for maximal blocks of contiguous elemental statements within the restructured LIR statements. It then encapsulates these maximal contiguous blocks by associating the block with a block identifier, which in some respects transforms this block into a single LIR statement. The blocks of contiguous elemental statements are then modified so that the appropriate low level scalar and parallel code can be generated. Finally, this low level code is generated.

It is noted that while some embodiments of the present invention contemplate that maximal contiguous blocks of elemental statements are encapsulated, some embodiments contemplate that "simple" non-elemental statements can be encapsulated along with the elemental statements. For this reason, the encapsulated blocks will often be referred to as "PE executable" (indicating that they will be executing using the parallel "Processing Elements"). It is also noted that some embodiments of the present invention contemplate that LIR statements as received by the present invention are themselves associated with a block identifier. Typically, it is envisioned that a block identifier is associated with a "basic block" of LIR statements, and this will be discussed further below.

The scalar portion of the target computer contemplated by embodiments of the present invention is envisioned to be a single processor device such as a Sparcstation from Sun Microsystems of Mountain View, Calif. However, embodiments of the present invention also contemplate that the scalar portion is actually just one processor residing within the parallel portion of the target computer.

The parallel portion may be a data parallel computer manufactured by Thinking Machines Corporation, such as the Connection Machine® Model CM1 ™, CM2 ™ and CM5 ™ Supercomputers. These are described in U.S. Pat. No. 4,589,400 to Hillis, U.S. Pat. No. 4,984,235 to Hillis et al., and U.S. patent application Ser. No. 07/042,761, entitled "Method and Apparatus for Simulating M-Dimensional Connection Networks in an N-Dimensional Network Where M is Less Than N", filed Apr. 27, 1987, by Hillis, all of which were cited above.

Specifically, U.S. Pat. No. 4,589,400 describes a massively-parallel computer with which the present invention can be used. U.S. Pat. No. 4,984,235 also describes a massively-parallel computer. U.S. patent application Ser. No. 07/042,761, entitled "Method and Apparatus for Simulating M-Dimensional Connection Networks in an N-Dimensional Network Where M is Less Than N", describes, in a massively parallel computer including processor chips interconnected by a hypercube, an arrangement for emulating 2-, 3-, or higher dimensional nearest-neighbor communication network ("NEWS") between chips using the hypercube wires.

The present invention can be best explained with regard to the following figures.

FIG. 1B shows a computer system environment contemplated for use with various embodiments of the present invention. It should be understood, however, that the present invention also contemplates embodiments using environments other than the one shown in FIG. 1B.

Referring now to FIG. 1B, a central processing unit (CPU) 104 is shown in communication with a communications channel 102 via a line 116. Embodiments of the present invention contemplate that the CPU 104 could be any type of CPU, such as an i386 microprocessor from Intel Corporation of Cupertino, Calif. The communications channel 102 could be any type of communications device (such as a bus or a network) for facilitating communication between components in a computer system.

A storage device 106 and an I/O device(s) 108 are shown as being in communication with communications channel 102 via a line 118 and a line 120, respectively. The storage device 106 could be any standard type of electronic/magnetic/optical mass-storage device. Of course, other types of storage devices could be used as well. The I/O device(s) 108 are contemplated to be keyboards, pointer devices, printers, display screens, and any other I/O device that would facilitate the communication of source statements and their results to and from the remaining components of the environment.

A random access memory (RAM) 110 is also shown as in communication with communications channel 102 via a line 122. Within this RAM 110 is contemplated to be one or more LIR statements 114 a Restructurer 112 for restructuring the nodes of the LIR statement (s) 114, an Encapsulator and Parallelizer 128 for encapsulating elemental (or otherwise PE executable) nodes of the LIR statement(s) 114 and facilitating the transference (i.e., parallelization) of variable information from the scalar portion of the target computer (not shown) to the parallel portion, and a Low Level Code Generator 126 for generating scalar and parallel low level code. Although RAM 110 is the memory device shown in FIG. 1B, it should be understood that the present invention contemplates that any type of memory device could be used to contain items 112, 114, 126 and 128. In addition, embodiments of the present invention contemplate that where it is advantageous to do so, some or all of these items can reside in some other type of storage device, including storage device 106.

The LIR statement(s) which is restructured by Restructurer 112 could be used within the environment of FIG. 1B to encapsulate and modify the restructured LIR statement (forming encapsulated LIR) using the Encapsulator and Parallelizer 128 and to ultimately generate low level code using the Low Level Code Generator 126. This low level code could then be sent to the target computer via a line 124, or the environment shown in FIG. 1B could be used as the scalar portion so that only the parallel low level code is sent. Alternatively, the restructured LIR statement could be sent to another device via line 124 for encapsulation and/or generation of low level code. In other words, the Restructurer 112, Encapsulator and Parallelizer 128 and Low Level Code Generator 126 can operate in different environments, and each item is not necessarily required for the functioning of another.

As indicated above, it should be understood that the environment contemplated for use by the present invention as shown in FIG. 1B is only an example, and that other types of environments are also contemplated. For example, the utilization of multiple CPUs to facilitate the functioning of the various items shown in RAM 110 is also contemplated.

Figure 2:
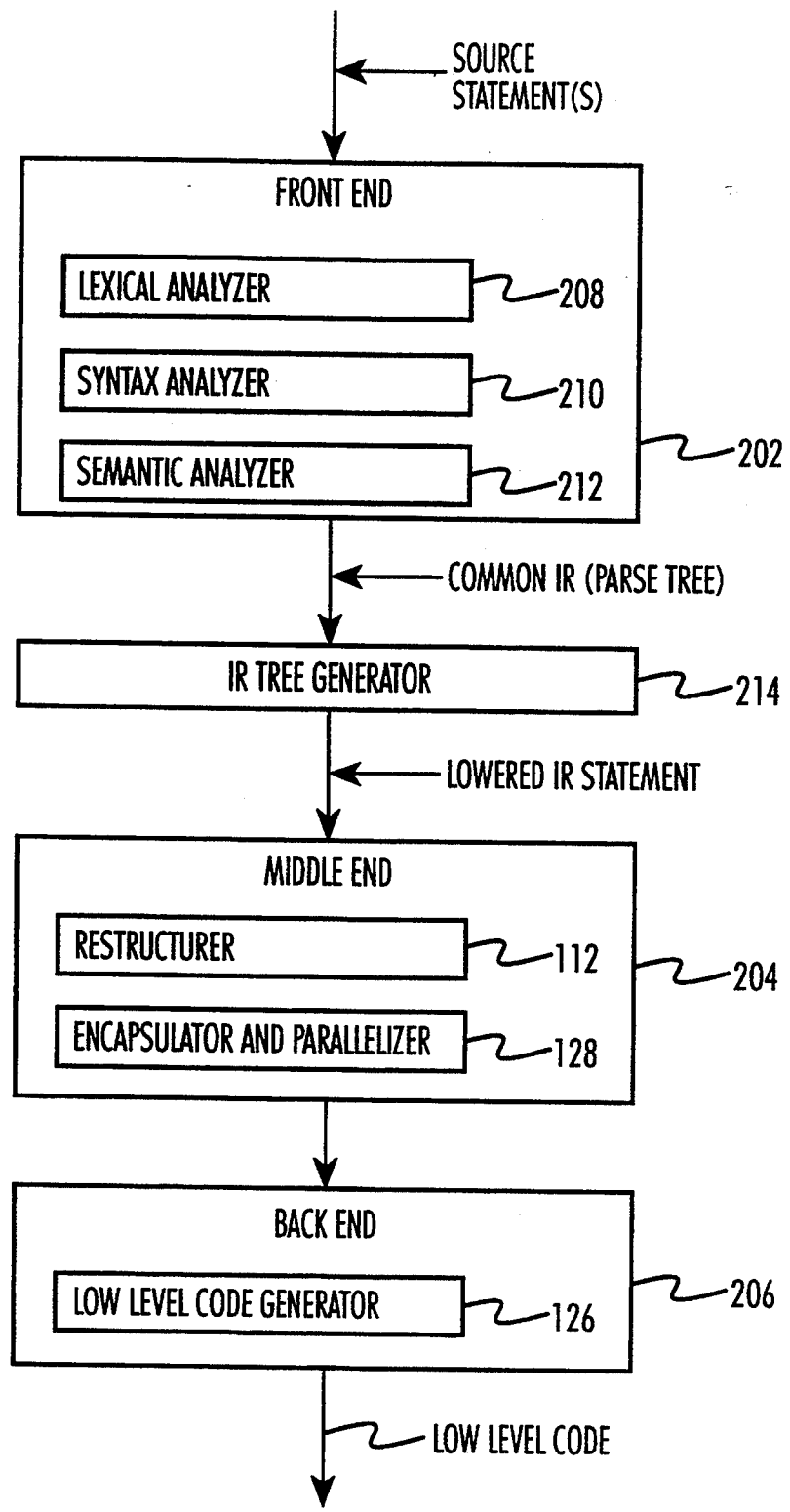
FIG. 2 shows a compiler environment as contemplated for use by embodiments of the present invention.

An environment contemplated for use in conjunction with the present invention showing various software-based components is shown in FIG. 2. In general, these components taken together comprise a compiler for converting source statements into low level code (e.g., assembly language). While the present invention is contemplated to be used in a compiler-type environment, other purposes and compiler-type designs other than that shown in FIG. 2 are also possible.

According to a preferred embodiment, the source statements are written in a CM Fortran programming language, which is essentially Fortran 77 combined with the array features of the ISO Fortran 90 standard. Fortran 77 and the ISO Fortran 90 standard are both well known. CM Fortran is described in CM Fortran Reference Manual (version 1.0, 1991), which is herein incorporated by reference.

Referring now to FIG. 2, one or more source statements are received by a Front End 202 which contains a Lexical Analyzer 208, a Syntax Analyzer 210, and a Semantic Analyzer 212. The Lexical Analyzer 208 reads in each of the characters of each source statement and groups each token of the source statement (i.e., each variable, function or mathematical operator) into a stream of internal tokens representative of a key word of the programming language or a variable in the source statement. The syntax analyzer 210 "parses" the statement into a high-level parse tree by grouping the tokens of the statement into a hierarchical tree so that they become "nodes" where the mathematical operators (or functions) of the statement are the parent nodes for each token. The mathematical operators themselves are the children of other nodes. The semantic analyzer 212 checks the parse tree for semantic errors, and performs such functions as data type checking. The result is what is hereafter referred to as common internal representation (common IR).

The next stage is for the common IR to be received by an IR Tree Generator 214. The IR tree generator 214 converts the common IR into a form which is "lowered" (i.e., it reflects the semantics rather than the syntax), and thus a lowered IR tree (i.e., LIR statement) is formed. Thus, the IR tree generator 214 takes into account the various needs and idiosyncracies of the target computer system and makes changes to the common IR accordingly.

The LIR statement is then received by what is conventionally known as the middle end 204. In FIG. 2, the middle end 204 is shown to contain the Restructurer 112 and the Encapsulator and Parallelizer 128. As discussed above, the Restructurer 112 takes this LIR statement and restructures various nodes within the LIR statement so that the low level code for the target computer can be generated more efficiently. The Encapsulator and Parallelizer 128 encapsulates PE executable statements and then facilitates the transference of variable information from the scalar portion of the target computer to the parallel portion.

Once the LIR statement has been restructured, encapsulated and parallelized, then a back end 206 is used to generate the low level code. This is done by the Low Level Code Generator 126. As discussed above, embodiments of the present invention contemplate that the Low Level Code Generator 126 generates one stream of low level code for use on the parallel portion of the target computer system (i.e., those portions of the LIR statement which can be done in parallel) and also generates low level scalar code for those portions of the LIR which are to be executed serially on a single processor.

For a more in-depth discussion on the above-noted environment used in conjunction with the present invention, particularly the Lexical Analyzer 208, Syntax Analyzer 210, Semantic Analyzer 212 and IR tree generator 214, see Aho, et al., "Compilers—Principles, Techniques, and Tools," Chapter 1 (March 1988 edition). Also, for an overview of Internal Representations, see Leverett et al., "An Overview of the Production-Quality Compiler-Compiler Project," IEEE Computer, p.40 (August 1990). Also, for an overview of the compiler itself, see Gary Sabot, "Optimized CM Fortran Compiler for the Connection Machine Computer", *Proceedings of the Hawaii International Conference on System Sciences* (25), 1992, pages 161–172. These three above-noted documents are incorporated by reference herein.

While various components of the environment contemplated by embodiments of the present invention and shown in FIG. 2 are shown to be situated in a certain way within the Front End 202, Middle End 204 and Back End 206, the present invention contemplates embodiments where such distinctions are not made, and also contemplates embodiments where these (or other) components can be placed in other configurations.

II. Restructurer

The Restructurer 112 is now described in greater detail below.

A. Operational Overview

Figure 3A:
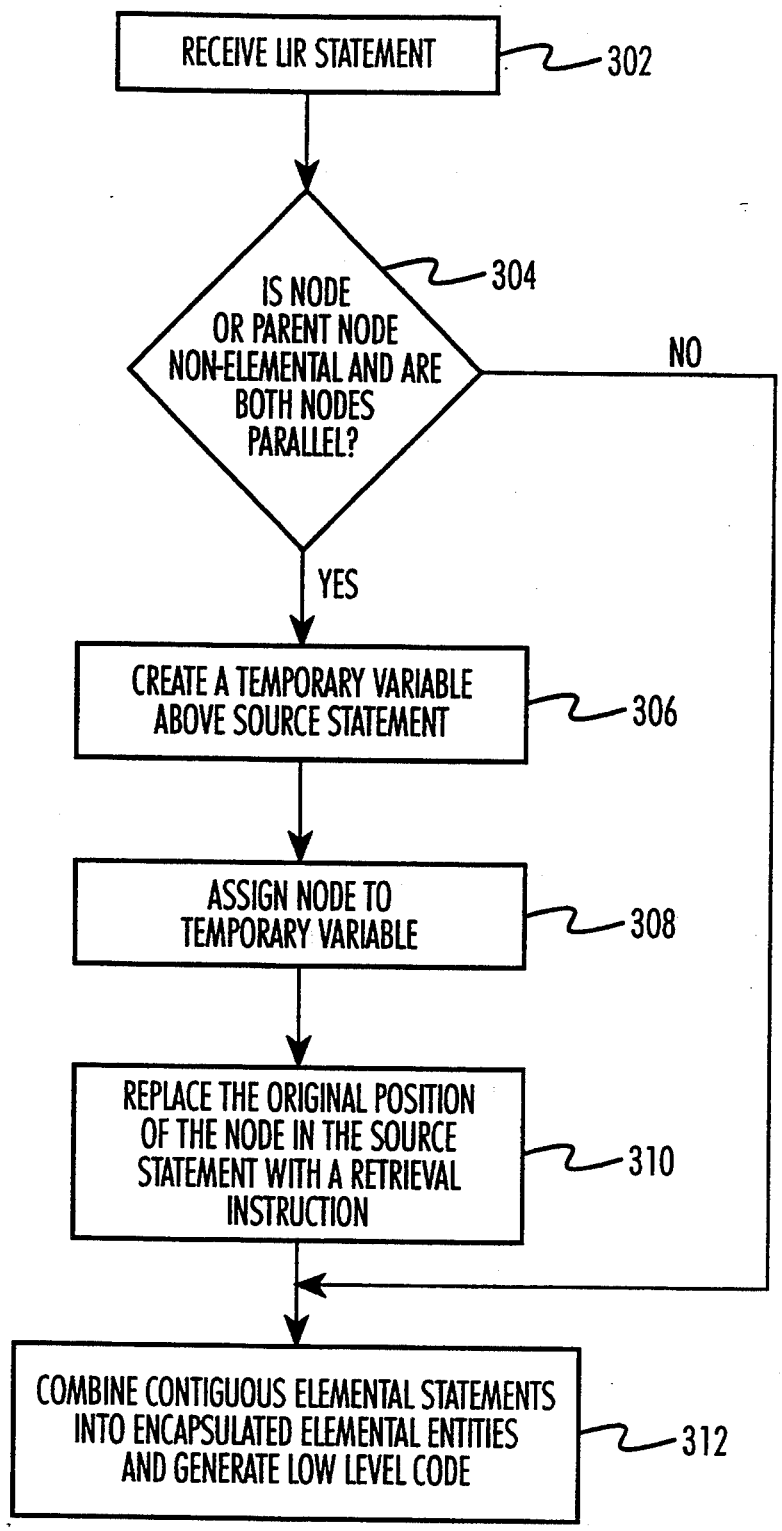
FIG. 3A is a high-level flow diagram of a method contemplated by embodiments of the present invention for restructuring nodes in an LIR statement.

Embodiments of a method of operation of the present invention are described using the flowchart of FIG. 3A. Referring now to FIG. 3A, it should first be noted that the four steps 304–310 shown in FIG. 3A are performed (in some given sequence) for each node of the LIR statement. In other words, all four of these steps need not be completely executed on a given node in order for one of these steps to be executed on another node (for example, step 304 could be executed for each node before step 306 is executed for any node). However, environments contemplated by the present invention envision that the last step (312) is performed once (i.e., after all the nodes in the LIR statement have been visited). Although the first step (302) is contemplated to be performed only once for each LIR statement received, embodiments of the present invention contemplate that the flowchart of FIG. 3A can be a repetitive process, and thus steps 304–310 can be repeated for each LIR statement received.

Discussing the flowchart of FIG. 3A with greater specificity, the first step is that an LIR statement is received. This is indicated by a block 302. Thus, the statement is received in a form where the tokens and operations of a statement are grouped to form nodes in a hierarchical tree structure, as previously indicated. Further, embodiments of the present invention contemplate that the intermediate representation has been modified (i.e., lowered) in accordance with the target computer system.

As discussed above, the present invention determines which nodes in the LIR statement are non-elemental. More specifically, embodiments of the present invention contemplate that a determination is made as to whether a particular node (or its parent node) are non-elemental and whether both the particular node and its parent node are parallel (that is, whether the particular node is, or is associated with, a parallel variable [i.e., an array]). This is indicated by a decision block 304.

If the answer to decision block 304 is "yes," then the next step is to restructure the node at issue so that it is separated from the elemental nodes in the statement. Embodiments of the present invention accomplish this by first creating a temporary variable "above" the LIR statement (in execution order) as indicated by a block 306. This ensures that all non-elemental node in a statement are executed before all elemental nodes. It should be noted, though, that embodiments of the present invention contemplate that this reordering of execution does not affect the result of any low level code generated from the restructured nodes.

The next step is to assign the node to the created temporary variable, as indicated by a block 308. This step effectively converts the node into a statement. The original position of the node in the LIR statement is then replaced with a retrieval instruction, as indicated by a block 310. In this way, when the value of whatever is at the position of the retrieval instruction is requested (as is contemplated to occur when low level code is generated), a value can be obtained from the previously-evaluated temporary variable (since it is higher in the execution order).

Once the above-noted steps have been accomplished for each node (which are visited in some defined sequence), embodiments of the present invention contemplate that this restructured LIR statements can be used in environments (such as that which include the Encapsulator and Parallelizer 128) which combine contiguous elemental (or PE executable) statements into encapsulated blocks and/or environments (such as that which include the Low Level Code Generator 126) which generate low level code for a target machine having scalar and parallel portions. This is indicated by a block 312. Some of these embodiments envision environments where contiguous LIR statements are combinable (i.e., PE executable) only when they contain variables of the same shape. However, other embodiments envision use in environments where contiguous "simple" non-elemental statements (i.e., those which require minimal communication between processors) can be combined along with the elemental statements.

Figure 3B:
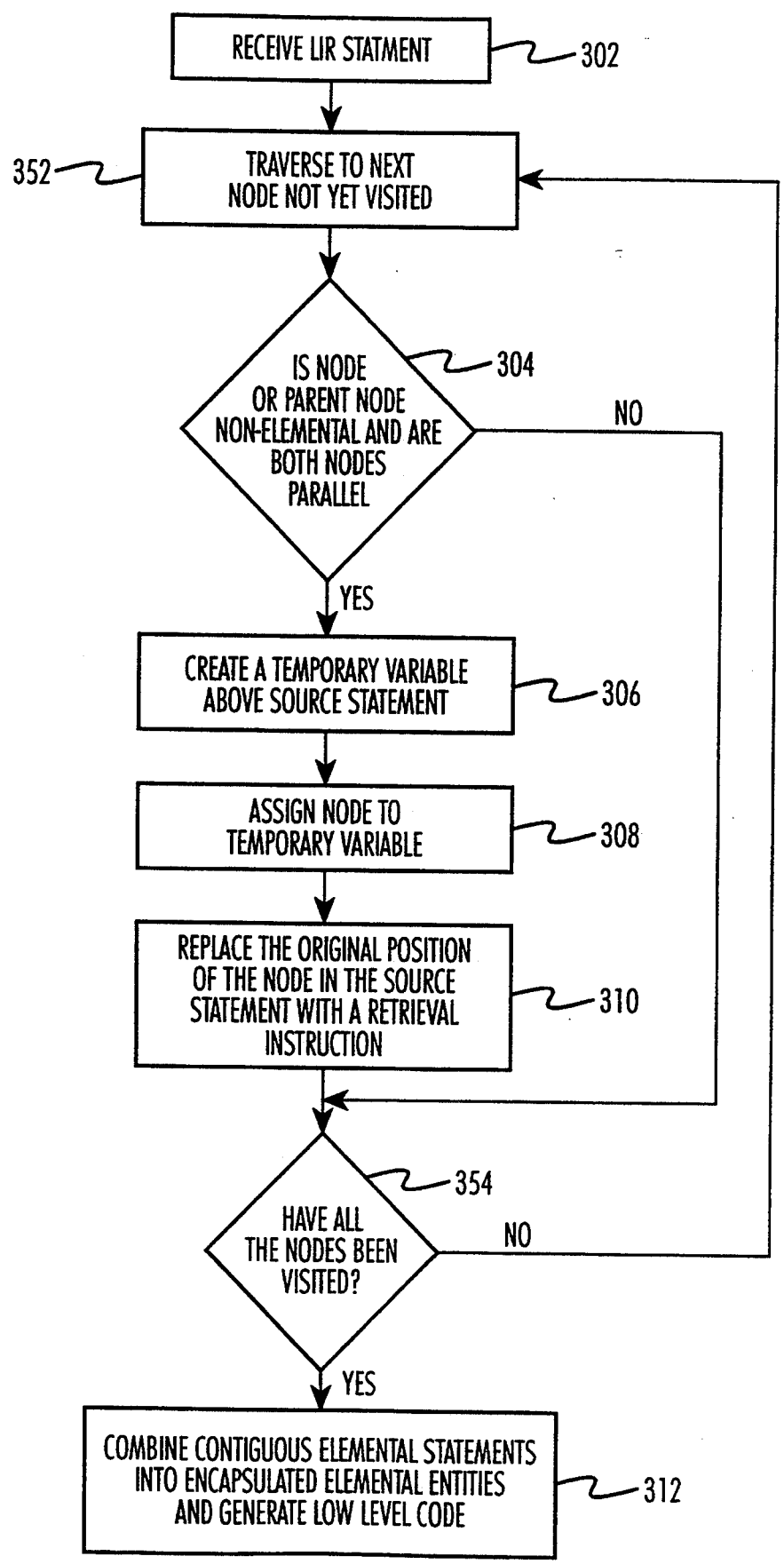
FIG. 3B is an alternative embodiment to that shown in FIG. 3A.

A specific method of operation contemplated by some embodiments of the present invention is shown in FIG. 3B. Referring now to FIG. 3B, this Figure adds specificity to FIG. 3A by providing that the steps described in blocks 304–310 be completely executed for each node before traversing to another node. This is facilitated by the steps described in blocks 352 and 354. More specifically, block 352 indicates that the present invention should traverse to a node which has not yet been visited. Embodiments of the present invention contemplate that this is done using a depth-first ordering.

During the "visit" to a node, the steps of blocks 304–310 are executed as discussed above. The present invention then determines whether all of the nodes have been visited as indicated by block 354. If they have not, then the next step will be to traverse to the next node not yet visited as indicated by block 352, and the cycle begins anew. Once all the nodes have been visited, then as discussed above, embodiments of the present invention contemplate use in environments which combine all contiguous elemental statements into encapsulated entities and generate low level code, as indicated by block 312.

B. Module Configuration

Figure 4:
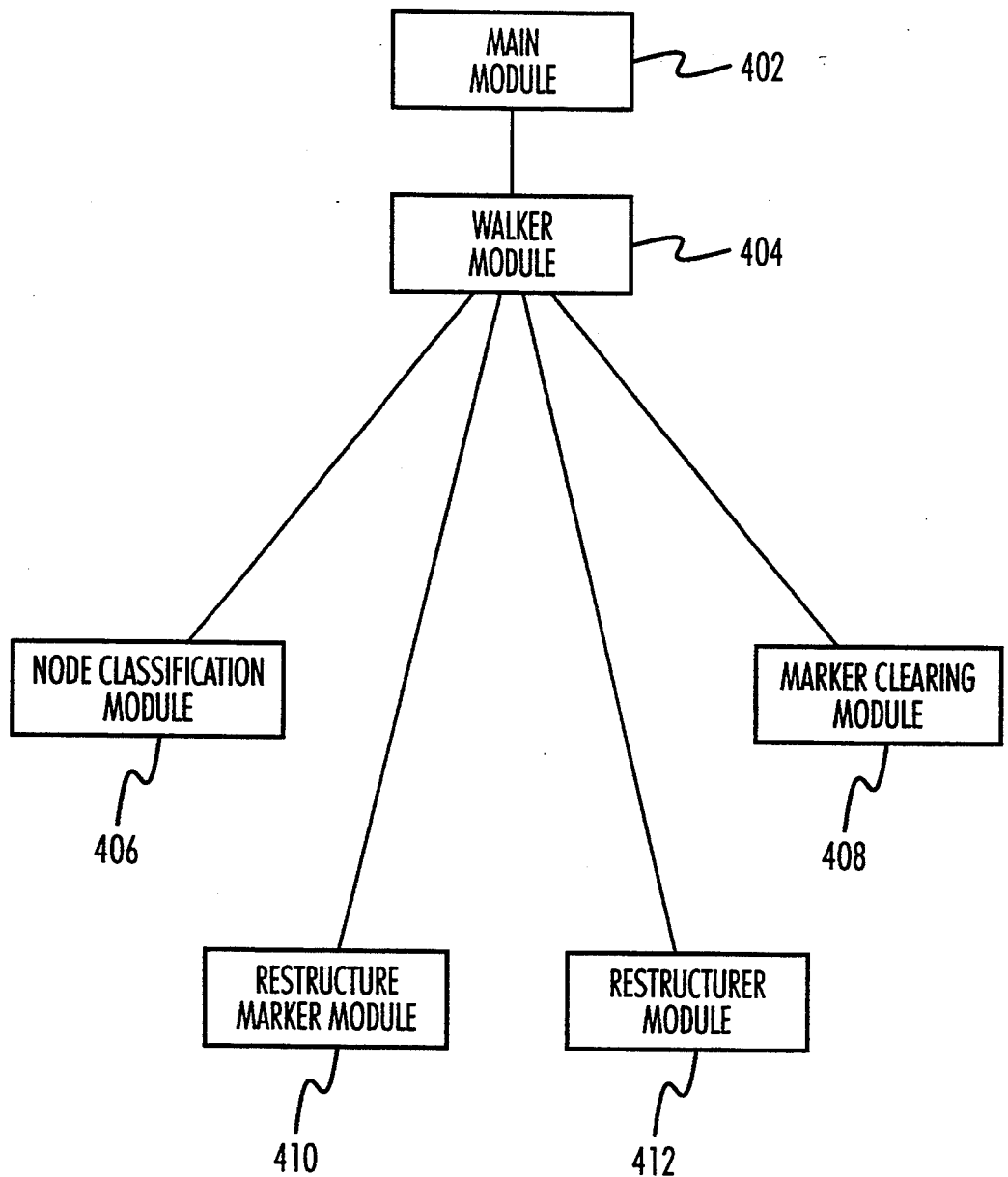
FIG. 4 is a block diagram of a statement restructurer as contemplated by embodiments of the present invention.

Embodiments of a system of the present invention are described using the diagram of FIG. 4. Referring now to FIG. 4, a Main Module 402 is used to control the various aspects of the present invention. In embodiments contemplated by the present invention, the Main Module 402 continuously invokes a Walker Module 404 which "walks" (i.e., visits) each node in the received LIR statement. Embodiments of the present invention contemplate that the Walker Module 404 traverses the LIR statement several times in order to restructure the appropriate nodes, and that it utilizes several modules during its "walk."

The first module utilized by the Walker Module 404 is a Node Classification Module 406 which classifies a node as elemental or non-elemental (or, in some embodiments, as PE executable or non-PE executable). Thus, the Walker Module 404 will cause each node to be visited, and the Node Classification Module 406 will then classify the visited node as either elemental or non-elemental.

Embodiments of the present invention contemplate that a look-up table (not shown) is used to determine whether a node is elemental or non-elemental. More specifically, those types of nodes that are elemental and non-elemental are stored in the look-up table in some type of memory (for example, RAM 110) so that each node can be classified appropriately. Any node that does not fall under one of these classifications is considered scalar.

Embodiments of the present invention further contemplate that the Walker Module 404 traverses the nodes of the LIR statement using a depth-first ordering. This is facilitated by marking each visited node as "visited" once the Node Classification Module 406 has completed performing its intended function on the visited node. In addition, when a node is visited, the Node Classification Module 406 will return "true" if a node has not been visited before (i.e., if there is no "visited" mark). Otherwise, it will return "false." If "true" is returned, then this serves as an indication to the Walker Module 404 that all the child nodes of the visited node need to be visited. Embodiments of the present invention contemplate that all nodes utilized by the Walker Module 404 perform in this manner.

The next module to be utilized as contemplated by embodiments of the present invention is a Restructure Marker Module 410. Again, using the Walker Module 404 to walk through the LIR statement, the Restructure Marker Module 410 will analyze each node and its parent node to determine if either of these nodes has been previously classified as non-elemental by the Node Classification Module 406. If the answer is "yes" (and both nodes are parallel) then the node being visited is marked "to be restructured." Again, embodiments of the present invention contemplate that if the node has not been visited before, then the Restructure Marker Module 410 returns "true," and otherwise returns "false."

A Restructurer Module 412 is utilized by the Walker Module 404 to restructure all of those nodes which were marked by the Restructure Marker Module 410. Thus, the Restructurer Module 412 creates a temporary variable "above" the elemental nodes as discussed above and assigns the temporary variable to the non-elemental node. The Restructurer Module 412 then replaces the position of the non-elemental node within the LIR statement with a pointer (i.e., a retrieval instruction) to the temporary variable.

Embodiments of the present invention contemplate that when the Node Classification Module 406, Restructure Marker Module 410 or Restructurer Module 412 is used to visit a node, that the "visited" mark utilizes a region a memory device such as RAM 110. This region is set to some state to indicate that particular nodes have been visited.

A Marker Clearing Module 408 is utilized to clear (i.e., reset) all of the "visited" marks which were created by the above-noted modules. In embodiments contemplated by the present invention, the Marker Clearing Module 408 is used after each use of the Node Classification Module 406, Restructure Marker Module 410 and Restructurer Module 412. Embodiments of the present invention contemplate that the Marker Clearing Module 408 itself returns "true" when it finds a "visited" mark.

It should be understood that the configuration of the modules as shown in FIG. 4 and as described above is one scheme contemplated by embodiments of the present invention, but that the present invention contemplates that other configurations of these modules as well as other modules could be used as well. It should also be understood that the above-described concept of a "walker" is an example of how the LIR statement is traversed, and that the present invention contemplates other schemes as well.

C. Operational Embodiments

Figure 5A:
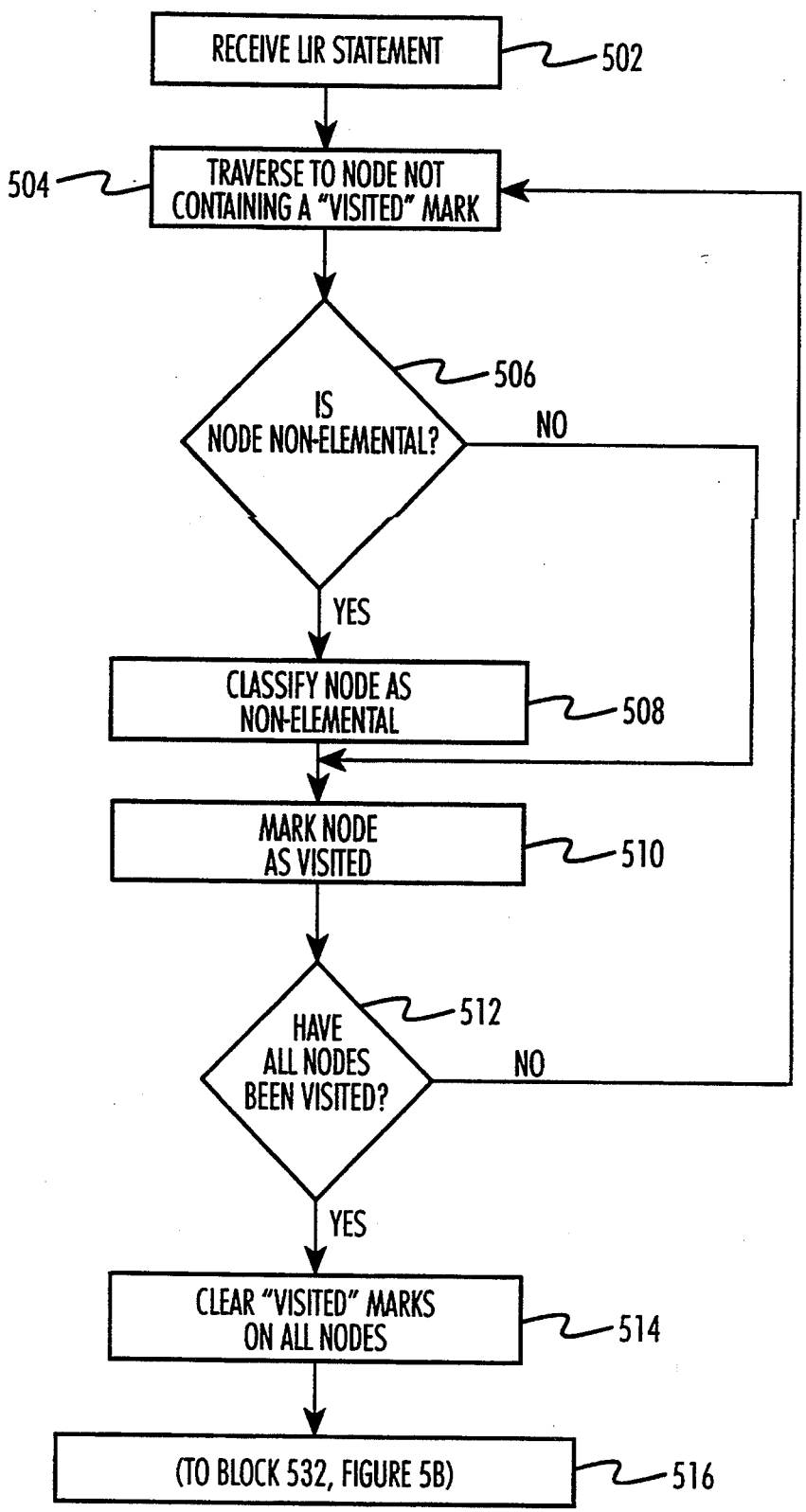
FIGS. 5A-5C show a flow diagram of a method contemplated by embodiments of the present invention for restructuring statements so that non-elemental statements are separated from elemental statements.
Figure 5B:
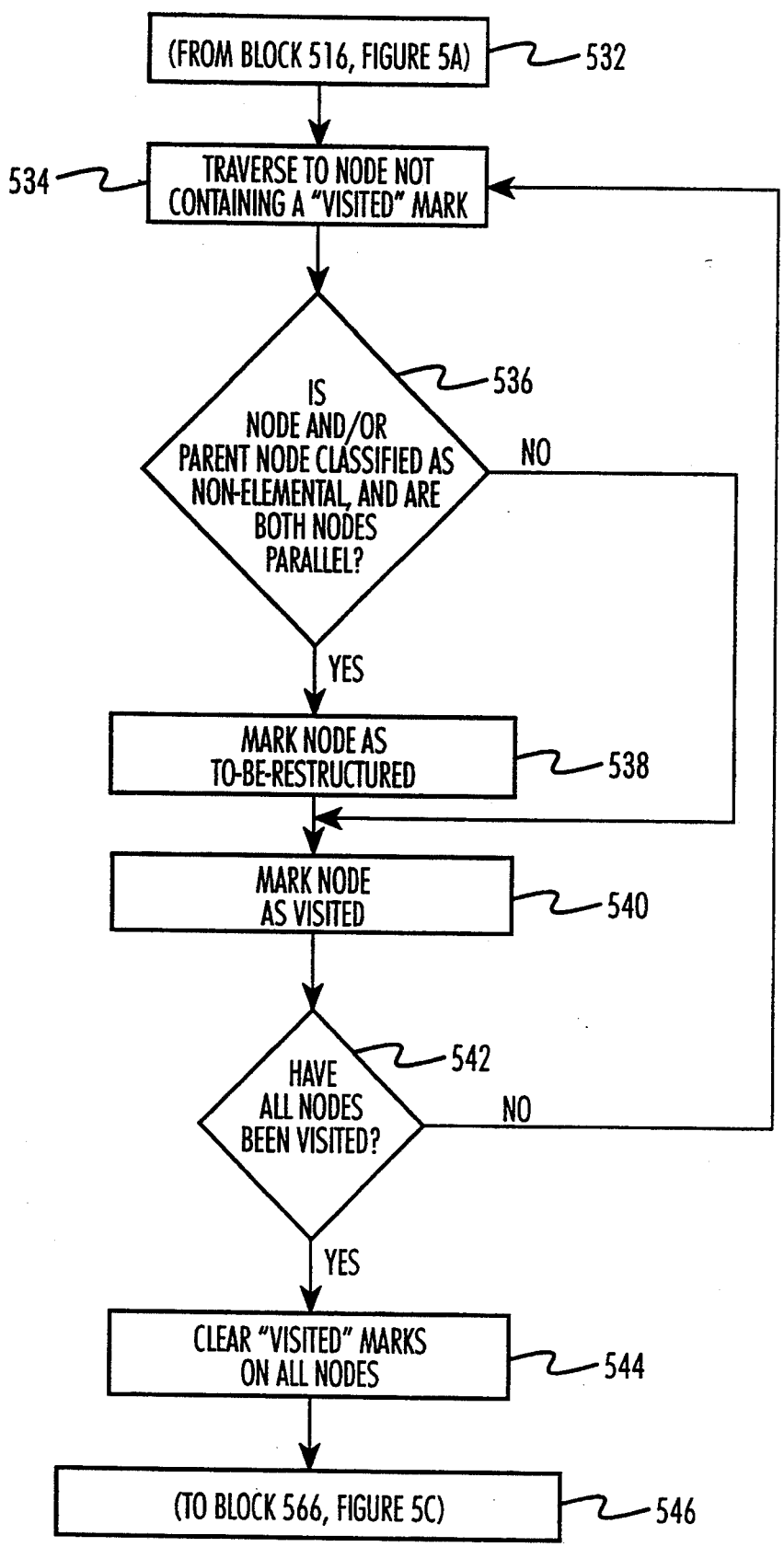
Figure 5C:
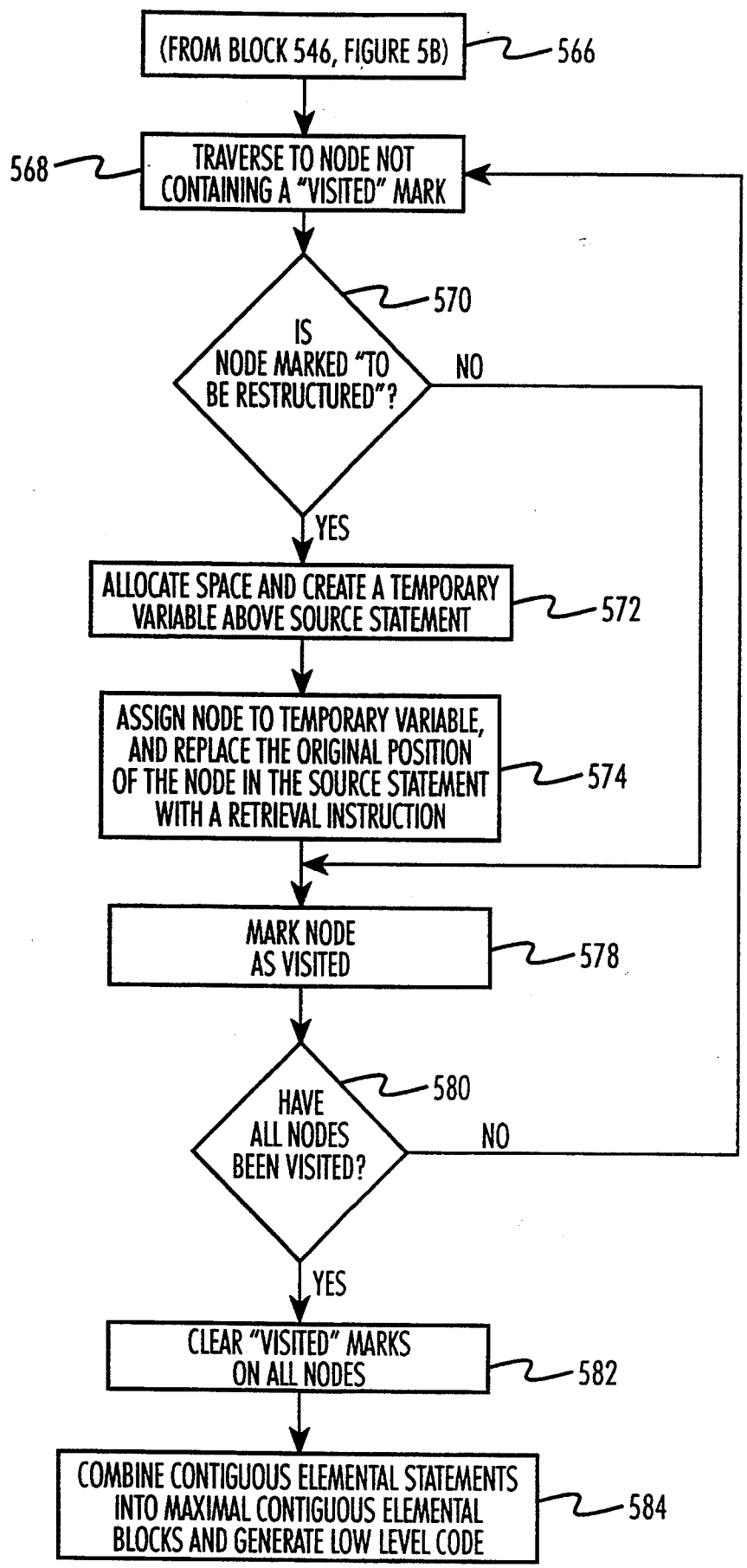

Embodiments of a method of operation of the present invention are described in greater detail using the flowchart of FIGS. 5A, 5B and 5C. Referring first to FIG. 5A, an LIR statement is received by the present invention, as indicated by a block 502. The first step then taken by the present invention is to traverse to a node which does not contain a "visited" mark (i.e., the node has not yet been visited) as indicated by a block 504. A determination is then made as to whether the node being visited is non-elemental (or otherwise non-PE executable). This is indicated by a block 506. If the node is not non-elemental, then the node is just marked as "visited," as indicated by a block 510.

If, however, the node which is being visited is non-elemental, then the node is classified as such. This is indicated by a block 508. In embodiments of the present invention, it is contemplated that the node is marked (using, for example, some designated portion of RAM 110) to indicate its non-elemental status. The node being visited is then marked as "visited," as indicated by block 510.

The next step is to determine whether all of the nodes in the LIR statement have been visited (i.e., are there no nodes left to investigate). This is indicated by a block 512. If all the nodes have not yet been visited, then the next step is to traverse to a node not containing a "visited" mark as indicated by block 504; the sequence of steps as discussed above is then re-commenced. As previously indicated, embodiments of the present invention contemplate that the nodes are traversed using a depth-first ordering.

If all the nodes in the LIR statement have been visited as per decision block 512, the next step is to clear visited marks for all of the nodes in the LIR statement. This is indicated by a block 514. As contemplated by embodiments of the present invention, a depth-first ordering is used to clear all nodes of their "visited" marks.

Once all of the nodes have been cleared of "visited" marks, then referring to FIG. 5B the present invention again traverses the LIR statement to a node not containing a "visited" mark, as indicated by a block 534. The next step is to determine whether the visited node and/or its parent node have previously been classified as elemental (and whether both nodes are parallel). This is indicated by a block 536. If the answer is "no," then the next step will be to simply mark the node as "visited," as indicated by a block 540.

If, however, the node and/or parent node are non-elemental, then the node is marked as "to be restructured." This is indicated by a block 538. Again, the node will then be marked as visited, as indicated by block 540.

The next step is determining whether all of the nodes have been visited. This is indicated by a block 542. If they have not all yet been visited, then the next step will again be to traverse to a node not containing a visited mark, as indicated by block 534.

If, however, all of the nodes have been visited, then the next step is to clear all nodes that were visited of their visited marks. This is indicated by a block 544.

Once all the visited marks have been cleared as per block 544, then referring to FIG. 5C the next step as contemplated by embodiments of the present invention is to again traverse to a node not containing a visited mark, as indicated by a block 568. The next step is to determine whether the node being visited is marked as "to be restructured," as indicated by a block 570. If the node is not to be restructured, then the node is just marked as "visited," as indicated by a block 578.

If, however, the node is marked as "to be restructured," then the next step is to allocate space (e.g., in RAM 110) for a temporary variable "above" the statement containing this node and to create a temporary variable in that allocated space. This is indicated by a block 572. Space for the node (and its child nodes) is also allocated at this time as well.

The next step is then to assign the node (and its child nodes) to the temporary variable, thus forming a new statement (in LIR form). The node (and its child nodes) within the original traversed LIR statement is then replaced with a retrieval instruction, which acts as a pointer to the temporary variable. This is indicated by a block 574. The node is then marked as visited, as indicated by a block 578.

The next step is to again determine whether all of the nodes have been visited. This is indicated by a block 580. If they have not, then the next step is to again traverse to a node not containing a visited mark, as indicated by block 568. However, if all of the nodes in the LIR statement have been visited, then the next step is to clear the visited marks on all of the nodes, as indicated by a block 582. As indicated above, embodiments of the present invention then contemplate functioning in environments where contiguous elemental statements are combined into maximal contiguous elemental blocks, and where low level code is generated from this.

This is indicated by a block 584. In any event, even if contiguous elemental statements are not formed, it is desirable in such environments to restructure a statement to break-out (i.e., separate) elemental portions for efficiency considerations. For this reason, embodiments of the present invention restructures nodes whose parents are non-elemental, even if they themselves are not.

Again, some embodiments of the present invention contemplate treating certain types of non-elemental nodes as elemental, in that they are combined into a maximal contiguous elemental block as though they were elemental. Such non-elemental nodes would be those which act in a regular fashion (i.e., are a "general permutation").

D. Example

Figure 6A:
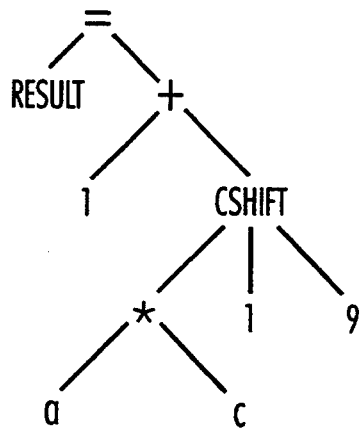
FIGS. 6A and 6B are examples showing the effect of restructuring statements.
Figure 6A:
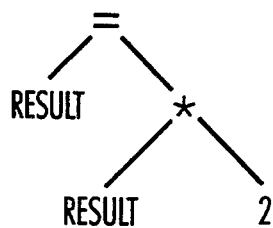
Figure 6A:
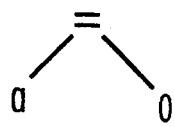
Figure 6A:
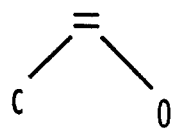
Figure 6B:
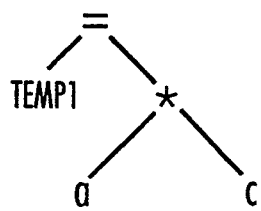
Figure 6B:
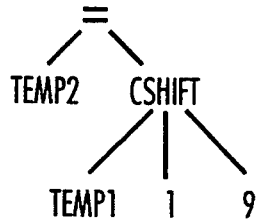
Figure 6B:
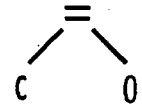
Figure 6B:
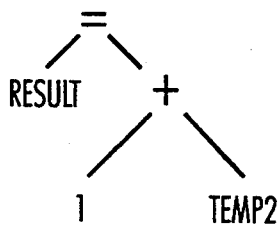
Figure 6B:
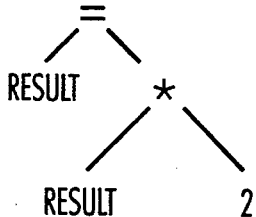
Figure 6B:
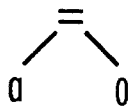

An example of the functioning of an embodiments of the present invention can be seen from the example shown in FIGS. 6A and 6B. Referring first to FIG. 6A, a sequence of LIR statements is shown at the top of this FIG., with its corresponding LIR statement shown below prior to any restructuring of nodes. A declaration statement (shown as statement (D1)) is the first LIR statement shown, indicating that the variables "a" and "c" are each two-dimensional arrays of length 1000.

The next statement (shown as statement (1)) is "result=1+cshift(a * c, 1, 9)." This statement indicates that the result of calling the function cshift (on its three arguments) is to be added to 1, with the result going into the variable "result." The function "cshift" is used here as an example, and is a Fortran function for shifting the elements in an array. Because of the effect of this function, it is non-elemental.

The effect that the present invention has on statement (1) is as follows. The LIR statement is traversed in depth-first order, which means that the first node traversed to is "a." On its first pass through the LIR statement the present invention marks those nodes which are non-elemental, which means in this example that only "cshift" gets marked.

On the second pass through the LIR statement, the present invention searches for nodes that are 1) non-elemental or whose parent nodes are non-elemental, and 2) parallel and whose parent nodes are parallel. Thus, when the present invention reaches the "*" node, it determines that its parent (cshift) is non-elemental and that both "*" and "cshift" are parallel (in that they operate on at least one parallel variable, in this case "a" and "c"). Thus, "*" is marked as "to be restructured." The same is true for "cshift," since it is itself non-elemental (and parallel).

Embodiments of the present invention contemplate that the LIR statement is searched depth-first during the restructuring phase. Thus, a temporary variable for "*" (temp1) is created first, as shown by source statement (5) (and corresponding LIR statement) in FIG. 6B. (FIG. 6B shows the effect that the present invention has on the LIR statement). Then, "*" and its child nodes are assigned to this variable. It should be noted that when the nodes are assigned to these temporary variables, they in effect become statements. It should also be noted that embodiments of the present invention contemplate that the "source statements" shown at the top of FIG. 6B are shown for illustrative purposes, and are not actually generated. Only their corresponding LIR statements are generated.

"Cshift" is the next node that is restructured. The variable "temp2" is allocated and this node (and its child nodes) are assigned to it, as shown by source statement (6) (and its corresponding LIR statement) in FIG. 6B. Note that "a * c" has been replaced by "temp1" in statement (6).

After the restructuring of the nodes in statement (1), what is left of this statement is statement (7) ("result=1+temp2") as shown in FIG. 6B. "Temp2" as shown within source statement (7) (and its corresponding LIR statement) represents the pointer or "retrieval instruction" that has been substituted in the original LIR statement for "cshift." Note that when statement (7) is finally executed, any non-elemental nodes upon which this statement depends will have already been evaluated. Also, it should be noted that embodiments of the present invention contemplate that the space allocated for the temporaries used by the retrieval instructions are deallocated after their last use during execution.

The remaining statements (statements (2), (3) and (4)) are examples of statements having no non-elemental nodes, and so they are not affected by the present invention. This is shown by the fact that their corresponding statements in FIG. 6B (statements (8), (9) and (10)) are the same as (2), (3) and (4), respectively. It should be noted, then, that only statements (5), (6) and (7) are related to the original statement (1) shown in FIG. 6A, and as indicated above, statement (7) is the restructured equivalent to statement (1). It should also be noted that the declaration statement (D2) after the restructuring now includes the variables "temp1" and "temp2."

For those embodiments of the present invention that contemplate use in an environment in which the contiguous elemental statements are combined into encapsulated elemental entities, it should be noted that by restructuring the statements in the above-noted example, that statements (7), (8), (9) and (10) can now be combined. Prior to the restructuring, only statements (2), (3) and (4) (which correspond to statements (8), (9) and (10)) could have been combined. Statement (1) was not combinable, since it was not homogeneous (i.e., it had elemental and non-elemental elements, and therefore would be deemed "non-elemental" for combinability purposes). It is further noted that some environments contemplated for use with the present invention contemplate that only contiguous elemental statements of the same size can be combined, while other environments require that the contiguous elemental statements must be of the same shape.

The scheme discussed above is shown below by the following pseudo-code, which basically follows the constructs of the C programming language. It is envisioned that this pseudo-code can be used to generate workable source code for the present invention in a suitable language, such as C or PASCAL:

```
/*main procedure*/
GLOBAL PROCEDURE me_sep()
{
```

```
/* info walk */
   me_walk_passblock_allbb(NULL, &me_utl_finish_bb,
     &me_sep_info_pre, NULL);
   me_walk_plain_allbb(NULL, NULL,
     &me_utl_clear_visited_bits_pre,NULL);
```

/* Next, figure out who should be moved to a temp. This is separate from the previous walk because it needs all of the information calculated above, but it must go in the prewalk BEFORE the visited bit gets set (see code). *,

```
   me_walk_plain_allbb(NULL, NULL, &me_sep_setmove_pre, NULL);
   me_walk_plain_allbb(NULL, NULL,
     &me_utl_clear_visited_bits_pre,NULL);
```

/* Now, move things to temps that need to be moved. Movement takes place in the prewalk because updating of USE requires it (see comment in me_sep_domove_pre) */

```
   me_walk_passblockitrptr_allbb(NULL,
     &me_sep_recalc_vstores_and_finish_bb,
                           &me_sep_domove_pre,
                           &me_sep_domove_post);
   me_walk_plain_allbb(NULL, NULL,
     &me_utl_clear_visited_bits_pre,NULL);
}

/* Can be used for walk that clears visited bit if already set */
GLOBAL FUNCTION BOOLEAN me_utl_clear_visited_bits_pre(vc)
     tVC          vc;
{
   if(me_utl_is_visited(vc)) {
     me_utl_clear_visited (vc);
     return(TRUE);
   }
   else
     return(FALSE);
}

LOCAL FUNCTION BOOLEAN
me_sep_domove_pre(vc,bb,insert_itr_ptr)
     tVC          vc;
     tBB          bb;
     tACitr       *insert_itr_ptr
/*ARGSUSED*/
{
   BOOLEAN                          result;
```

```
if (utl_trace_enabled) {
  me_utl_ac_name(vc,me_utl_opstring);
  springf(me_utl_msgstring,"me_sep_domove_pre: %s",
          me_utl_opstring);
  TraceEnter(me_utl_msgstring);
} if(me_utl_is_visited(vc))
    result = FALSE;
else
    result = TRUE;
me_utl_set_visited(vc);

if (utl_trace_enabled) {
  me_utl_ac_name(vc,me_utl_opstring);

sprintf(me_utl_msgstring,"me_sep_domove_pre: %s",
          me_utl_opstring);
  TraceLeave(me_utl_msgstring);
}
return(result);
}

/* insert_itr points to an itr pointing to a statement
      if moving to a temp, put everything before that point. */

LOCAL PROCEDURE me_sep_domove_post(vc,bb,insert_itr_ptr)
    tVC         vc;
    tBB         bb;
    tACitr      *insert_itr_ptr;
{
  tVC   allcntx;
  if (utl_trace_enabled) {
    me_utl_ac_name(vc,me_utl_opstring);
    sprintf(me_utl_msgstring,"me_sep_domove_post: %s",
            me_utl_opstring);
    TraceEnter(me_utl_msgstring);
  } if (me_utl_is_needsmove(vc)
      &&
      (!swMeParisCgnSwitch
       !me_class_is_pariscgn_nosep_op(fcGetOp(vcGetFormal(vc)))))
      {
    allcntx = me_utl_get_vc_allcntx_used(vc);
    (void) me_sep_move_to_ptemp(bb, vc, allcntx, insert_itr_ptr);
    }
```

```
      if (utl_trace_enabled) {
        me_utl_ac_name(vc,me_utl_opstring);
        sprintf(me_utl_msgstring,"me_sep_domove_post: %s",
                me_utl_opstring);
        TraceLeave(me_utl_msgstring);
      }
}

LOCAL FUNCTION BOOLEAN me_sep_info_pre(vc, bb)
    tVC            vc;
    tBB            bb;
{

BOOLEAN result;
if (utl_trace_enabled) {
   me_utl_ac_name(vc,me_utl_opstring);
   sprintf(me_utl_msgstring,"me_sep_info_pre: %s, visited=%d",
            me_utl_opstring, me_utl_is_visited(vc));
   TraceEnter(me_utl_msgstring);
}
if(me_utl_is_visited(vc))
   result = FALSE;
else {
   tFC                        fc;
   t_lir_va_op                op;
   me_utl_set_visited(vc);
   fc = vcGetFormal(vc);
   op = fcGetOp(fc);

if (me_class_is_node_with_vpset_last_op(op)) {
      tVC        vpset_fetch;
      tVC        allcntx;
      vpset_fetch = me_sep_last_child(vc);
      me_utl_set_vc_vpsetfetch_used(vc,vpset_fetch);
      if (me_utl_ispresent_vc_allcntx_used(vpset_fetch)) {
         allcntx = me_utl_get_vc_allcntx_used(vpset_fetch);
      }
      else {
         allcntx = me_utl_make_allcntx(bb,vpset_fetch);
         me_utl_set_vc_allcntx_used(vpset_fetch,allcntx);
      }
      me_utl_set_vc_allcntx_used(vc,allcntx);
   }
   else if (me_class_is_node_with_cntx_child_op(op)) {
      tVC        cntx;
      tVC        allcntx;
      tVC        vpset_fetch;
```

```
    /* Find and attach vpset to node */
    if (me_class_is_node_with_cntx_child_2ndlast_op(op))
        cntx = me_sep_2ndlast_child(vc);
    else if (op == vaDIAGON)
        cntx = vctabGeti(vcGetOpds(vc),2);
    else if (op == vaPACKVEC)
        cntx = vctabGeti(vcGetOpds(vc),4);
    else
        cntx = me_sep_last_child(vc);
        me_utl_setup_cntx_vpset_info(bb,cntx,&vpset_fetch,&allcntx);
        me_utl_set_vc_vpsetfetch_used(vc,vpset_fetch);
        me_utl_set_vc_allcntx_used(vc,allcntx);
    }
    . if (op==vavSTORE)
        me_sep_calc_vstore(vc);
        result = TRUE;
    }
    if (utl_trace_enabled) {
        me_utl_ac_name(vc,me_utl_opstring);
        sprintf(me_utl_msgstring,"me_sep_info_pre: %s, visited=%d",
                me_utl_opstring, me_utl_is_visited(vc));
        TraceLeave(me_utl_msgstring);
    }
    return(result);
}
```

It should be understood that embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. In particular, the pseudo-code discussed above can be especially useful for creating the software embodiments.

III. Encapsulator and Parallelizer

The Encapsulator and Parallelizer 128 is now described in greater detail below.

A. General Overview

In general, the Encapsulator and Parallelizer 128 is used for optimizing a plurality of statements in representational form by identifying and combining maximal contiguous PE executable blocks within a set of LIR statements. This is done to facilitate the efficient generation of low level code and to facilitate the transference of variable values (or addresses in the case of an array) from the scalar portion of the target computer to a parallel portion. More specifically, the Encapsulator and Parallelizer 128 analyzes a set of LIR statements and determines the boundaries of contiguous blocks of LIR statements which are PE executable. It then associates block identifiers with each of these contiguous PE executable blocks.

To prepare the contiguous PE executable block so that it can be most effectively used for the subsequent generation of low level code, the nodes within the contiguous PE executable block are traversed (i.e., "visited"). When a node which is a variable is visited, a "push" node is generated which signifies that low level code should be generated (by an entity such as the Low Level Code Generator 126) to "push" the variable on the scalar portion of the target computer. At the same time, a node is generated indicating that low level code should be generated to pop the pushed variable on the parallel portion of the target computer.

A scalar-to-parallel transfer device such as a FIFO or some type of networking interface (not shown) is contemplated to be used as the intermediary into which the variables are pushed to and popped from. This allows for greater efficiency in the transferrence of information from the scalar portion to the parallel portion.

The Encapsulator and Parallelizer 128 can best be further explained with regard to the following figures and discussion.

B. Operational Overview

Figure 7:
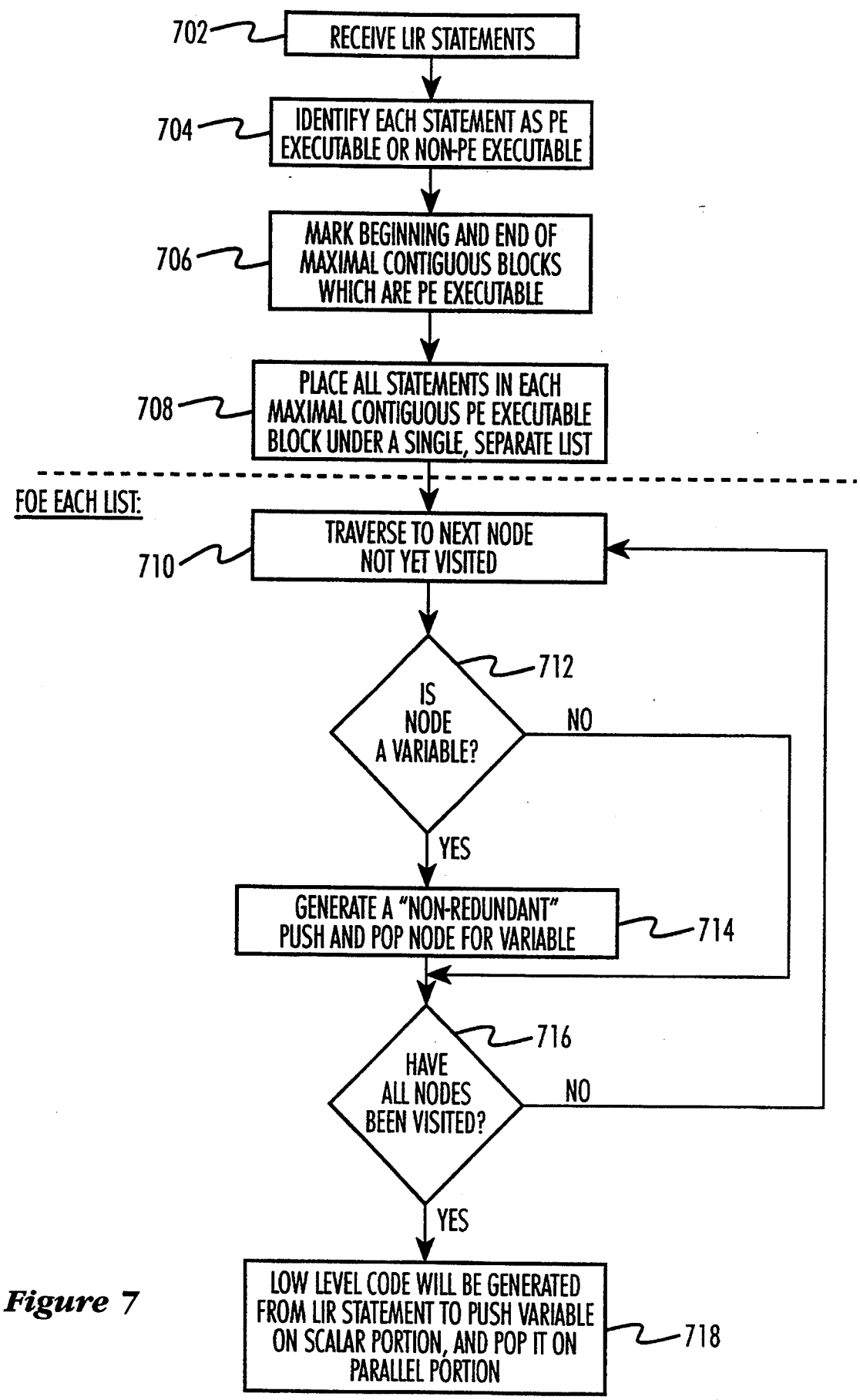
FIG. 7 is a flow diagram of a method contemplated by embodiments of the present invention for encapsulating contiguous PE executable blocks, and for preparing for the generation of a parallel and scalar code stream for the contiguous block, and for facilitating the transference of information between the scalar and parallel portion of a target computer.

Embodiments of a method of operation of the Encapsulator and Parallelizer 128 are described using the flowchart of FIG. 7. Referring now to FIG. 7, the first step is that the present invention receives LIR statements, as indicated by a Block 702. These LIR statements may have been processed by Restructurer 112, but use of the Restructurer 112 is not necessary for the functioning of the Encapsulator and Parallelizer 128.

Some embodiments of the present invention contemplate use in environments where the LIR statements are received in blocks associated with a block identifier. In essence, this block identifier is nothing more than a marker which allows groups of statements and/or individual nodes themselves to be conveniently associated together in a single group. These block identifiers can also be used to associate groups of statements and/or individual nodes together which are within (i.e., a subset of) the original block of statements received. Such block identifiers are referred to hereafter as LISTs.

The next step as contemplated by the present invention is to identify each of the statements as PE executable or non-PE executable, as indicated by a Block 704. In some embodiments of the present invention, only elemental statements are PE executable, whereas non-elemental statements would not be PE executable. However, as indicated above, embodiments of the present invention also contemplate situations where "simple" non-elemental statements can be PE executable. These would be statements where minimal communication or communication following some pre-defined pattern occurs between processor elements. In any event, embodiments of the present invention contemplate using a look-up table (not shown) containing the types of LIR statements which would be PE executable, and when a match is found, the LIR statement is marked in some way as being PE executable. Of course, other schemes to determine whether a statement is PE executable or not is also contemplated.

Once the source statements received have each been identified as PE executable or non-PE executable, the present invention then contemplates marking the beginning and end of contiguous blocks which are PE executable. This is indicated by a Block 706. Embodiments of the present invention contemplate that the beginning and end of the largest or "maximal" contiguous blocks possible will be marked. In other words, the present invention will form blocks out of the maximal number of elemental statements that are adjacent to one another. Thus, if there are 5 adjacent elemental statements the present invention will form an elemental block out of the maximum number of nodes that it can (which in this example is 5).

The next step is to place all statements in each of the maximal contiguous PE executable blocks under a single, separate LIST. This is indicated by a Block 708. This in effect treats the contiguous block as a single, manipulatable statement. For each LIST created which is used as a block identifier for each maximal contiguous PE executable block, the present invention contemplates that the steps indicated by Blocks 710-716 will be executed.

Referring, then, to Block 710, the next step is to traverse to the next node which has not yet been visited. Embodiments of the present invention contemplate that this is done using a depth-first ordering. However, other schemes can be used in which the nodes are traversed using some other defined sequence.

The next step is to determine whether the node which has been traversed to is a variable. This is indicated by a Block 712. Embodiments of the present invention contemplate that this is done using a look-up table located in a memory device such as RAM 110. If the node is not a variable, then a determination will be made as to whether all the nodes have been visited (and thus analyzed), as indicated by a Block 716. If they have not all been visited, then the next node is traversed to, as indicated by Block 710.

If, however, the node is a variable, then the present invention will generate a "push" and a "pop" node for the variable (although some embodiments of the present invention contemplate that a pop node is generated only once for each variable, and that subsequent occurrences of the same variable use the original pop). This is indicated by a block 714. Again, a determination will be made as to whether all the nodes have been visited as indicated by Block 716. If they have not all been visited, then the next node is traversed to, as indicated by Block 710.

It is contemplated that environments envisioned for use with the present invention will utilize these nodes to create actual low level code (e.g., assembly language) to implement the pushes and pops. A push node itself is thus merely a store instruction sequence while a pop node is a retrieve instruction sequence. More specifically, it is contemplated that low level code is generated by environments used with the present invention which will push variables on the scalar portion of the target computer, and pop these variables on the parallel portion. In this way, variables are passed from the scalar portion of the target computer to the parallel portion.

Once all of the nodes have been visited as indicated by Block 716, then as indicated above environments contemplated for use by the present invention envision that low level code is then actually generated for the scalar portion of the target computer to push whatever is in the variable (be it a value or an address). Low level code is also generated to pop that variable on a parallel portion of the target computer. This is indicated by a Block 718.

C. Module Configuration

Figure 8A:
FIG. 8A is a block diagram of an embodiment of the present invention for encapsulating contiguous PE executable nodes.
Figure 8B:
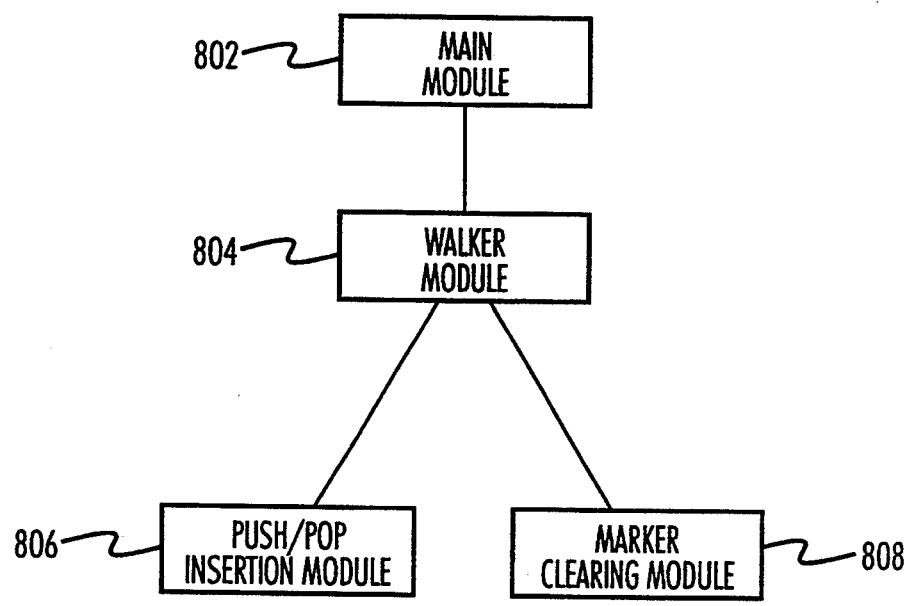
FIG. 8B is a block diagram of an embodiment of the present invention for modifying the nodes in an encapsulated block and for transferring information between the scalar and parallel portion of a target computer.

Embodiments of a system of the present invention are now described using the diagram of FIGS. 8A and 8B. Referring first to FIG. 8A, a Statement Grouper module 801 is used to walk through the received LIR statements, and to determine whether each statement is PE executable or non-PE executable. Some embodiments of the present invention contemplate that this is accomplished by looking at the top node of each LIR statement (which is an "=") and then analyzing the first right-hand side node in the LIR statement. If that right-hand side node is PE executable (as determined using a look-up table), then the statement will be grouped with any other contiguous PE executable statements as described above regarding FIG. 3. It is noted, however, that this embodiment requires that the LIR statements were first processed by the Restructurer 112 or some other similar device. Otherwise, another scheme will need to be used (which are also contemplated by embodiments of the present invention).

Referring now to FIG. 8B, Main Module 802 is used to control the various aspects of the present invention. In embodiments contemplated by the present invention, the Main Module 802 continuously invokes a Walker Module 804 which "walks" (i.e. visits) each node under the original block identifier, (including maximal contiguous PE executable blocks).

The first module utilized by the Walker Module 804 is a Push/Pop Insertion Module 806. This Push/Pop Insertion Module generates the nodes which will lead to the ultimate creation of a push and a pop in low level code. As indicated above, when a node indicates that the variable to be pushed is a parallel variable (that is, an array) then the address of that variable is what the low level code will actually be generated to push. If, however, a the node indicates that a scalar variable is what is pushed, then the value of the variable is what low level code is generated to push.

Embodiments of the present invention further contemplate that the Walker Module 804 traverses the nodes of the modified LIR using a depth-first ordering. This is facilitated by marking each visited node as "visited" once the Push/Pop Insertion Module 806 has completed performing its intended function with regard to the visited node. In addition, when a node is visited, the Push/Pop Insertion Module 806 will return "true" if a node has not been visited before (i.e., if there is no "visited" mark). Otherwise, it will return "false." If "true" is returned, then this serves as an indication to the Walker Module 804 that all the child nodes of the visited node need to be visited. In addition, embodiments of the present invention contemplate that when the Push/Pop Insertion Module 806 is used to visit a node, that the "visited" mark is in a region of memory such as RAM 110 which is set to some state to indicate that particular nodes have been visited.

A Marker Clearing Module 808 is utilize to clear (i.e., reset) all of the "visited" marks which were created by the Push/Pop Insertion Module 806. In embodiments contemplated by the present invention, the Marker Clearing Module 808 is used after each use of the Push/Pop Insertion Module 806. In this way, the visited marks are reset for the next LIR statement (either an individual statement or a maximal contiguous PE executable block) that will be traversed. Embodiments of the present invention contemplate that the Marker Clearing Module 808 itself returns "true" when it find a "visited" mark.

It should be understood that the configuration of the modules as shown in FIGS. 8A and 8B and as described above is one scheme contemplated by embodiments of the present invention, but that the present invention contemplates that other configurations of these modules as well as other modules could be used as well. It should also be understood that the above-described concept of a "walker" is an example of how an LIR statement is traversed, and that the present invention contemplates other schemes as well.

D. Operational Embodiments

Figure 9A:
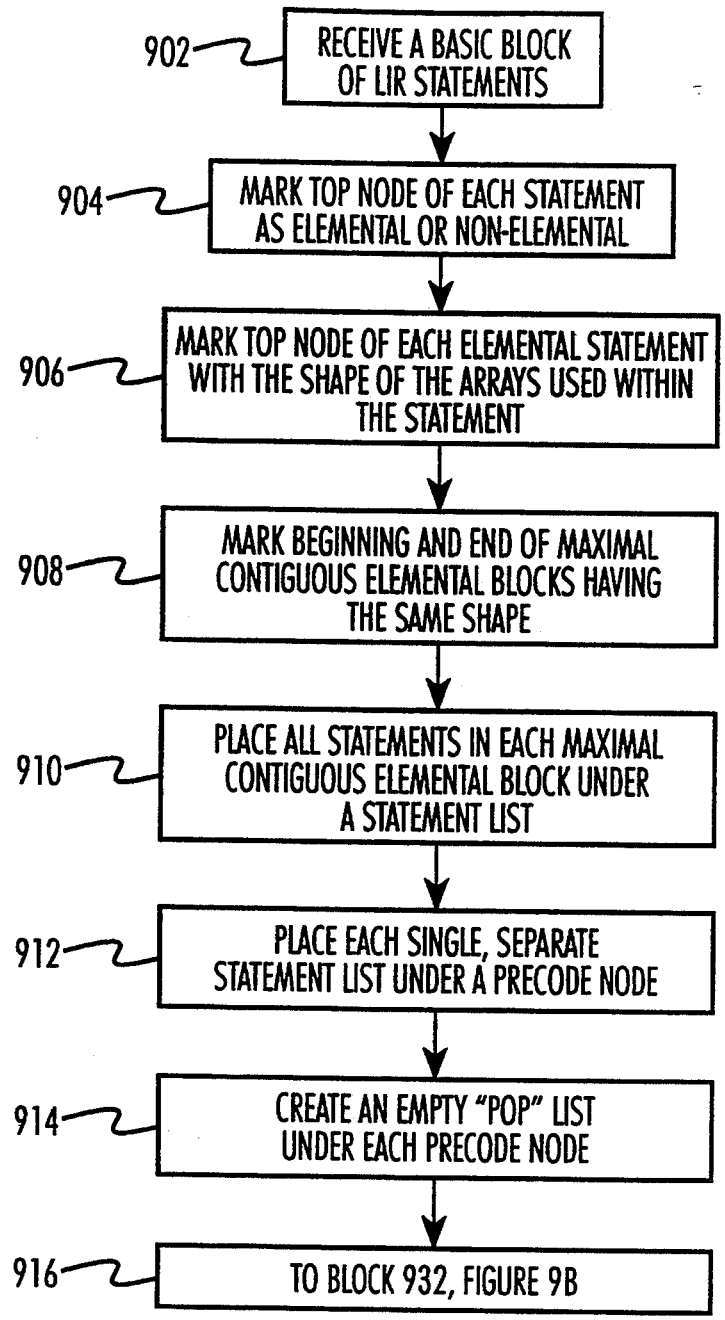
FIGS. 9A and 9B show an alternative embodiment of what is generally described in FIG. 7.
Figure 9B:
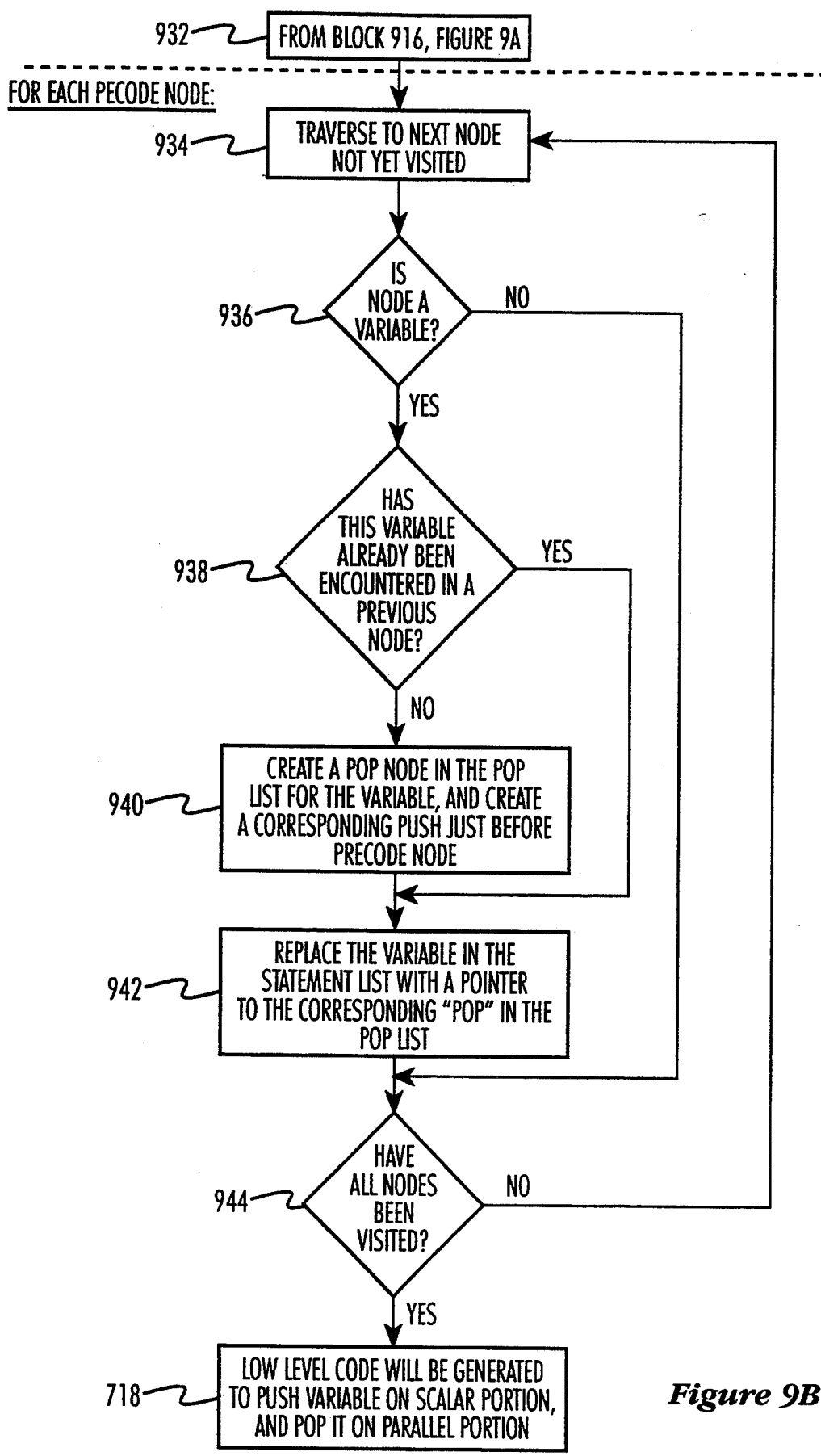

Embodiments of a method of operation of the present invention are described in greater detail using the flowchart of FIGS. 9A and 9B. For purposes of explanation, the flowchart of FIGS. 9A and 9B show an embodiment of the present invention which contemplates that LIR statements will be combinable when they are elemental and their variables are of the same "shape." It should be understood, however, that the present invention contemplates other criteria for combinability of LIR statements as well.

Referring first to FIG. 9A, embodiments of the present invention contemplate receiving a basic block of LIR statements. This is indicated by a Block 902. (A basic block is merely a straight-line sequence of statements whose constituents do not contain any nodes which would change the linear order of execution [e.g., it does not contain any GOTO statements]).

The next step is to mark the "top" node (that is, the highest node in the LIR statement) as being either elemental or non-elemental after identifying a statement as belonging to one of these categories, as indicated by a block 904. As contemplated by some embodiments of the present invention, a determination is then made as to the "shape" of the arrays used within the received LIR statement at issue. This is indicated by a Block 906. These embodiments contemplate that one of the criteria required for combining statements (which have been determined to be PE executable) into a maximal contiguous block is that the variables in each statement all contain the same shape. Thus, in these embodiments, even if contiguous statements are elemental, if the variables used are not all of the same shape, they will not be combinable.

The next step is to mark the beginning and end of the maximal contiguous elemental blocks (in which the variables of the statements have the same shape) as indicated by a Block 908. Then, all of the statements in each maximal contiguous elemental block are placed under a single, separate "statement" LIST. This is indicated by a Block 910. In embodiments contemplated by the present invention this LIST (which is referred to as a "statement" LIST for purposes of clarity and explanation) is merely a marker which allows groups of nodes and/or statements themselves to be conveniently associated together in a single group.

The next step is to associate each statement LIST with a PECODE node, as indicated by a Block 912. That is, each statement LIST which was created as a marker for a maximal contiguous elemental block of statements is now itself associated with a PECODE node (which itself serves as a marker representing the maximal contiguous elemental block). The designation "PECODE" represents the fact that the LIR statements associated with this marker will be those which will be utilized to generate low level code for use on the parallel portion of the target computer.

The next step is to then create an empty "pop" LIST which is also to be associated with the PECODE node. This is indicated by a Block 914. The empty pop LIST will be filled as discussed further below.

Turning now to FIG. 9B, for each statement LIST associated with each PECODE node, the present invention contemplates that steps 934–944 will be executed. The next step, then, is to traverse to the next node in the statement LIST which has not yet been visited, as indicated by a Block 934. If the node is not a variable, as indicated by Block 936, then the next step will be to determine if all the nodes have been visited, as indicated by a Block 944. If they have not, then the present invention will traverse to the next node not yet visited, as indicated by a Block 934. As stated above, the present invention contemplates various schemes in which the nodes are visited and analyzed using some defined sequence.

Referring back to Block 936, if the node at issue is a variable, then a determination is made as to whether the variable has already been encountered in a previous node associated with the statement LIST. This is indicated by a Block 938. If the variable has not been encountered in a previous node within the statement LIST, then the present invention will create a pop node which will be associated with the pop LIST. In addition, the present invention will generate a corresponding push node just "before" the PECODE node in traversal order of the statements in the LIR. In other words, environments contemplated by embodiments of the present invention envision that the nodes being generated by the present invention will be traversed in some defined sequence in order to generate low level code. Thus, the embodiment mentioned above places the above-mentioned push node before the PECODE node in this sequence.

Whether or not the variable has already been encountered in a previous node, the next step is then to replace the variable in the statement LIST with a pointer to the corresponding "pop" in the pop LIST. This is indicated by a Block 942. Thus, a variable in the statement LIST uses the "pop" in the pop LIST, rather than having the statement LIST contain its own variable.

The next step is to determine whether all the nodes (within the statement LIST) have been visited, as indicated by Block 944. If they have not, then the present invention will traverse to the next node not yet visited, as indicated by a Block 934. If all of the nodes have been visited, then as discussed above environments of the present invention contemplate that low level code will be generated based upon a traversal of the LIR statements in the maximal contiguous PE executable block which has been modified by the present invention.

E. Examples

Figure 10:
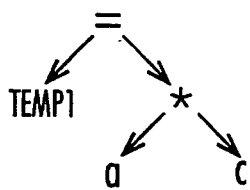
FIGS. 10-14 are examples of the effect of the encapsulization and paralellization implemented by the present invention.
Figure 10:
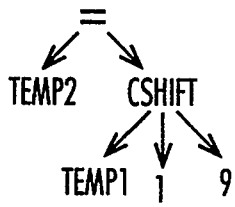
Figure 10:
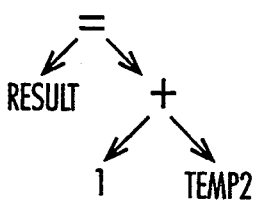
Figure 10:
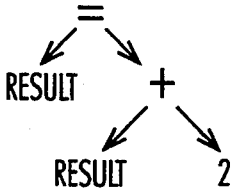
Figure 10:
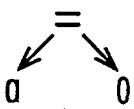
Figure 10:
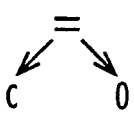
Figure 10:
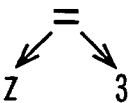

Examples of the functioning of the present invention are shown using FIGS. 10–14. Referring first to FIG. 10, several statements (numbered (1) to (7)) are shown in LIR form. The variables used in these statements have been declared in an integer statement which is shown at the top of FIG. 10. Note that the shape of variables a, c, temp1 and temp2 are all the same, and that z is different. For the purposes of this example, the embodiments of the present invention described will be those which allow for the combinability (i.e., PE executability) of statements which are elemental and whose variables are of the same shape. As indicated above, however, other embodiments of the present invention contemplate combining statements which are elemental with those which are "simple" non-elemental, as well as combining statements whose variables have different shapes.

From the example shown in FIG. 10, it can be seen that while statement (1) is elemental, statement (2) is not, since it contains a "cshift" function which requires communication between processors (this function is used here as an example, and is a Fortran function for shifting the elements in an array). Thus, these two statements would not be considered combinable. For the same reason, statement (2) would not be combinable with statement (3). However, statements (3)–(6) are all elemental, and also contain variables containing the same shape. Therefore, the present invention would mark statement (3) as the beginning of a maximal contiguous elemental block while statement (6) would be marked as the end of that block. Statement (7) would not be included in this block since the variable z has a different shape than the other variables within the maximal contiguous elemental block. However, statement (1) and statement (7) in essence each form their own maximal contiguous elemental block, although there are really no suitable "contiguous" statements for them to be combined with.

Figure 11:
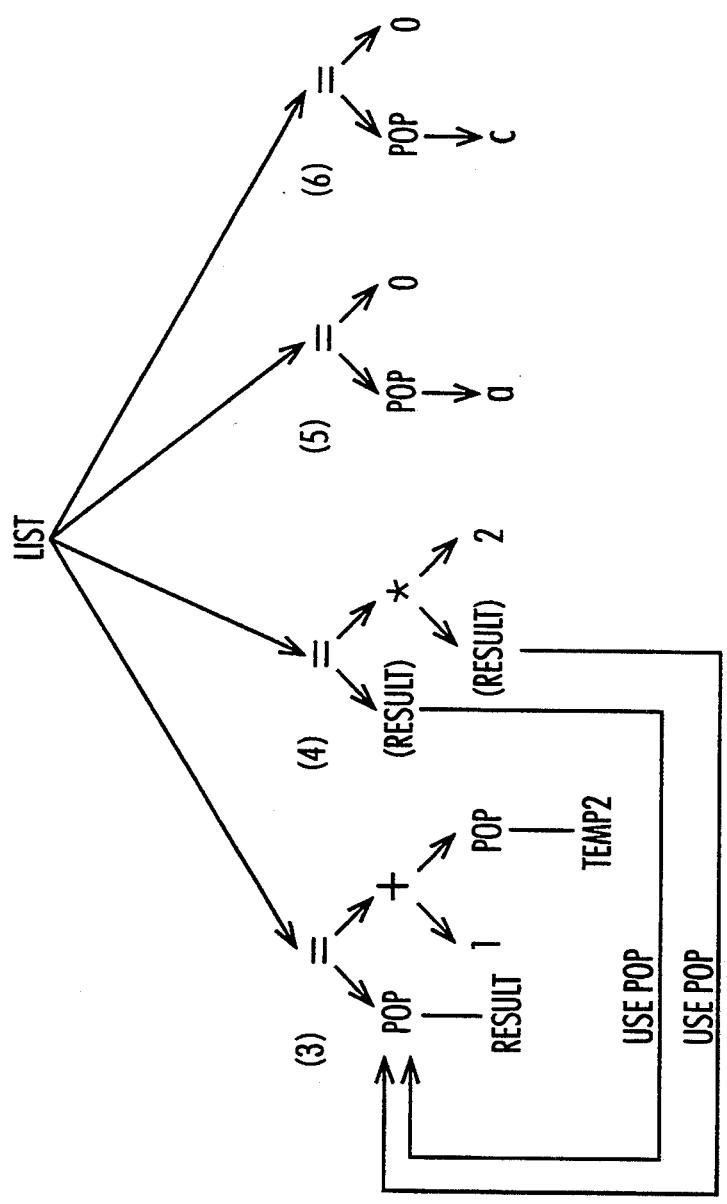
Figure 11:
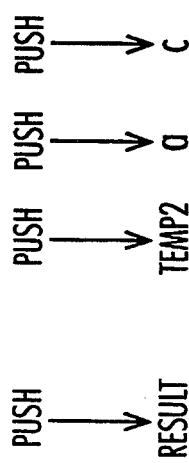

The end results of one scheme contemplated by the present invention for modifying the LIR statements within a maximal contiguous elemental block are shown with regard to LIR statements (3)–(6) of FIG. 10 is shown in FIG. 11. Referring now to FIG. 11, the embodiments of the present invention first generate a push node for each of the variables which are used in the maximal contiguous elemental block. Thus, a push is generated for result, temp2, a and c. These push nodes are generated first so that the environments contemplated by the present invention which actually generate the assembly language code from these nodes will generate the code for them first (that is, before the corresponding pops).

After the creation of the push nodes the present invention then creates a LIST under which the elemental statements reside. For example, in FIG. 11, it can be seen that LIR statements (3)–(6) have now been associated with a single LIST. The statements under this LIST are envisioned to be used to generate low level code for the parallel portion of the target computer.

In addition to creating the push nodes for the eventual generation of scalar low level code for the scalar portion of the target computer, embodiments of the present invention further replace the occurrence of each variable with a pop node so as to eventually generate low level code to pop the contents of the variable on the parallel portion of the target computer. As indicated above, the contents of the variable are contemplated to be an address (if the variable is an array), or a value (if the variable is scalar). In addition, embodiments of the present invention contemplate that once a particular variable has been replaced with a pop node, then any subsequent uses of that variable utilize the original pop node. That is, some type of pointer is used to point to the pop to be utilized. In this example, the variable "result" is replaced with a pop node in statement (3), and then this node is subsequently utilized in two different places in statement (4) of FIG. 11.

Figure 12:
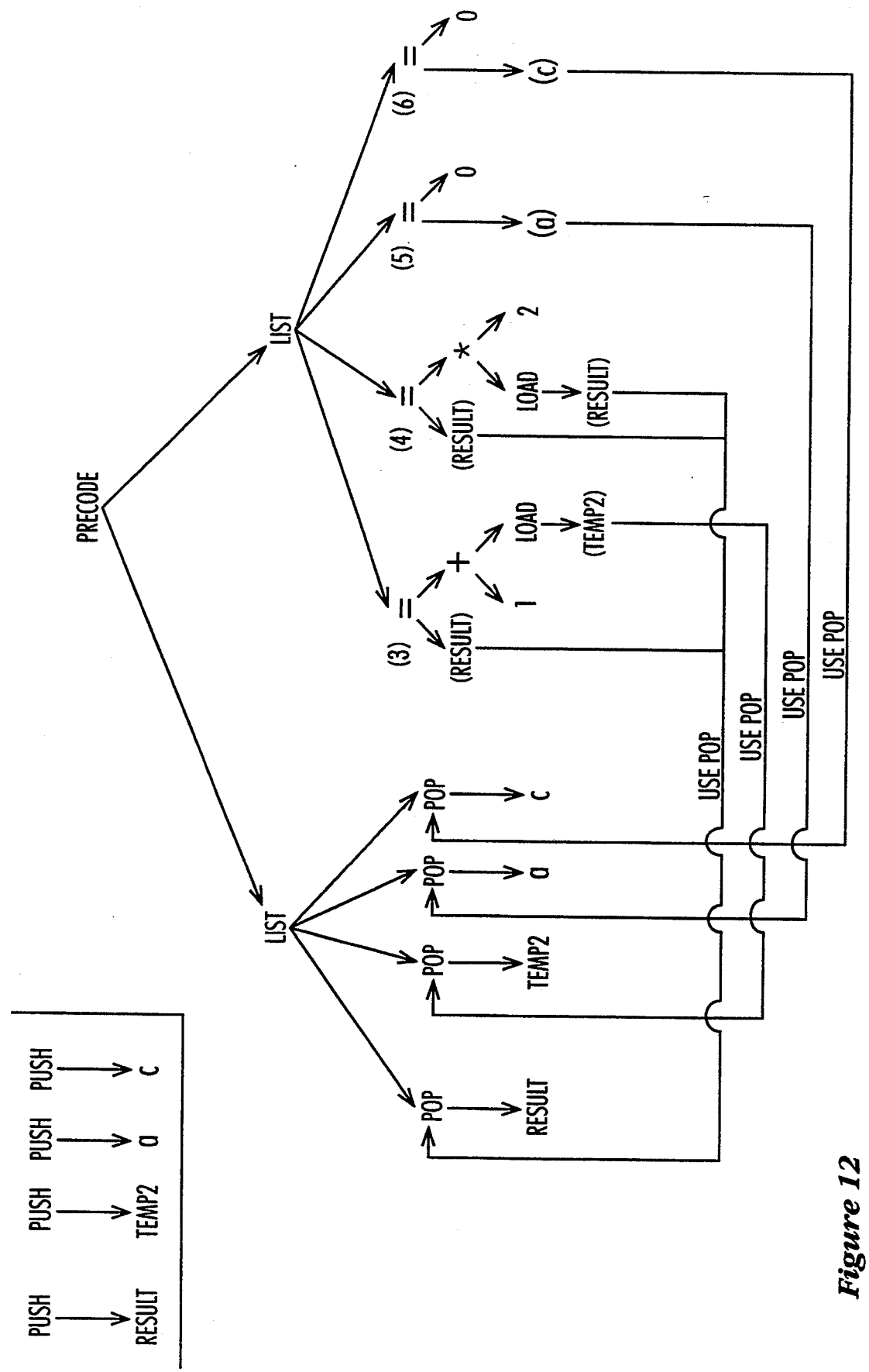

FIG. 12 shows LIR statements from a maximal contiguous elemental block modified using a somewhat different embodiment contemplated by the present invention from that which would be used to create the modified LIR of FIG. 11. Referring now to FIG. 12, again, push nodes for each variable in the maximal contiguous elemental block would be created to generate the appropriate assembly language code for the scalar portion of the target computer. With regard to the portion of the modified LIR pertaining to the parallel portion of the target computer, a PECODE node is generated containing two LISTS. The first list is a pop LIST, and is shown as a LIST on the left-hand side of the PECODE node in FIG. 12. Beneath this LIST are pop nodes for each of the variables.

The LIST on the right-hand side of the PECODE node of FIG. 12 contains statements (3)–(6), and is the "statement" LIST. In this embodiment, it is contemplated that each of the variables use the popped variables on the pop LIST. For this reason, the variables shown in the statement LIST are in parentheses, indicating that there is no variable at those positions, but have been replaced by a pointer to the popped variable on the pop LIST. In addition, it should be noted that embodiments of the present invention contemplate that (as discussed above with regard to FIGS. 9A and 9B) the pop LIST is created by traversing the statement LIST, a pop node is created when a new variable is encountered. If the variable has been encountered before, then the variable in the statement list is replaced with a pointer to the previously-created pop node, but no new pop node is created.

Some embodiments of the present invention further contemplate that the variables which are not used for storage purposes (that is, the variables on the right-hand side of each of the statements) implicitly contain a load node. This automatically causes the contents of the variable (either a value or an address) to automatically be loaded into a register for appropriate usage.

Figure 13:
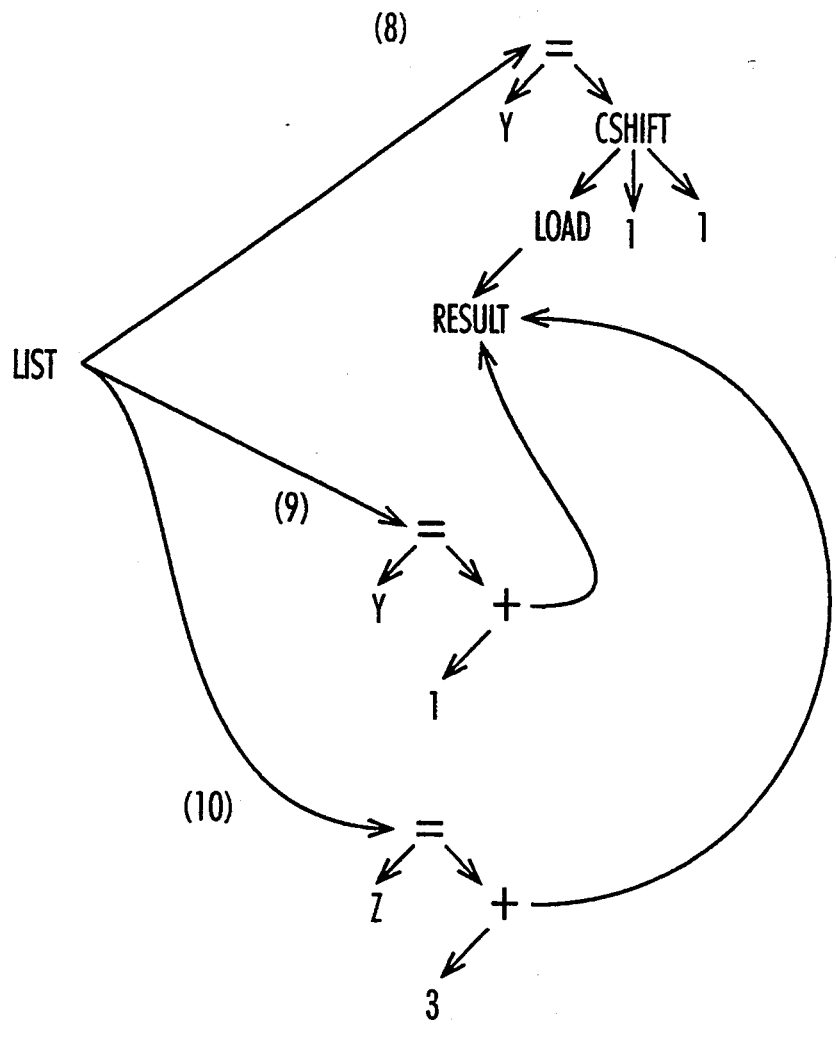

Another embodiment showing the input and results of the present invention is shown by FIGS. 9 and 10. Referring first to FIG. 13, the LIR for statements (8)–(10) (of which the statements are also depicted in source code form at the bottom of the Figure) is shown. In this example, a LIST is used to represent these three statements. The variable "result," shown in statement (8), is shown to be shared by statements (9) and (10). This sharing of variables in the LIR is known as "dagging." All of the statements are linked together using a basic block LIST, since in this example it is assumed that these statements are part of the same basic block.

The dilemma posed by the LIR shown in FIG. 13 is that the variable "result" is shared by both elemental and non-elemental statements. That is, statement (8), which is non-elemental, shares the variable "result" with statements (9) and (10), which are elemental.

Figure 14:
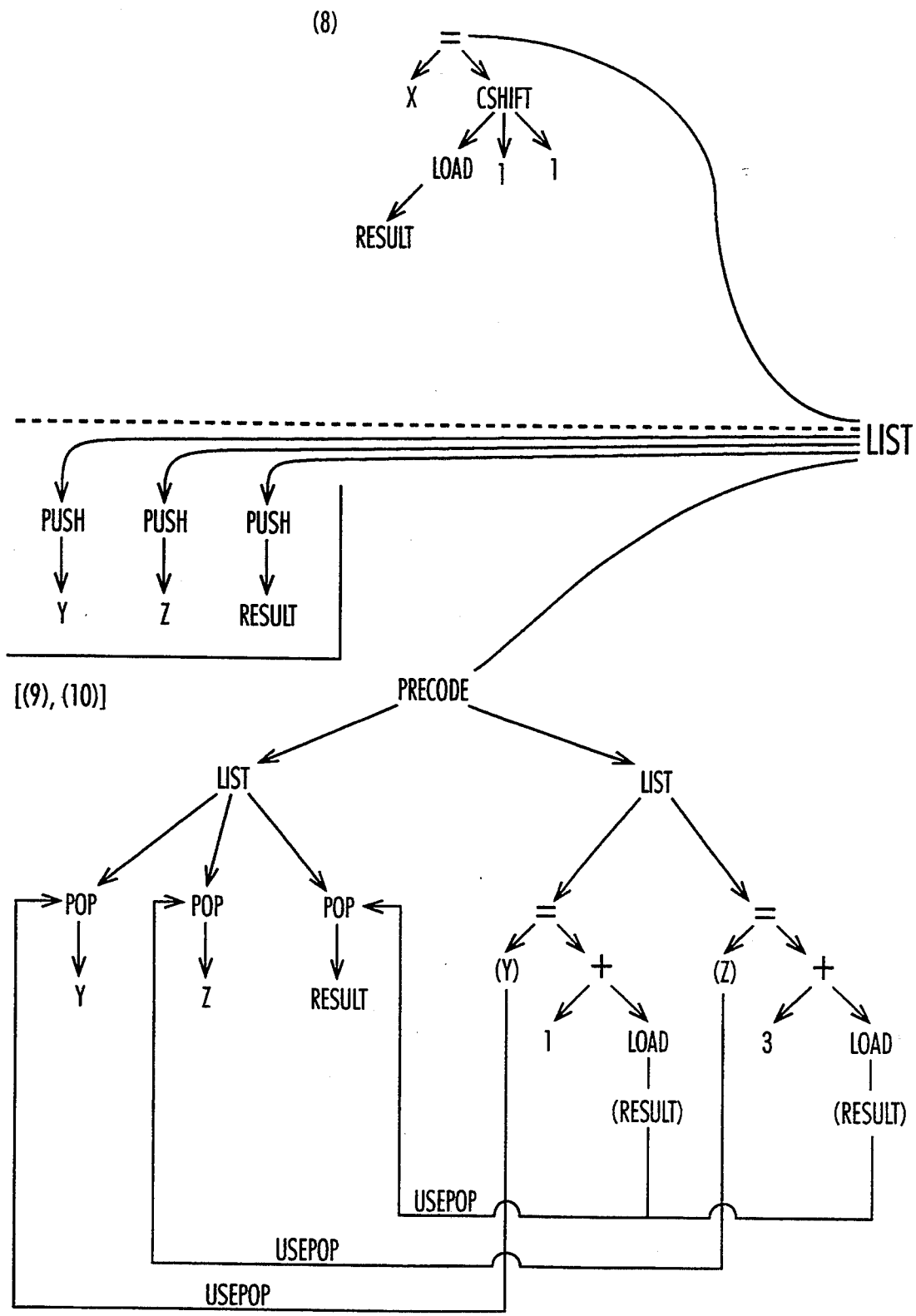

Embodiments of the present invention contemplate separating such a common variable. The results of this are shown in FIG. 14. Referring now to FIG. 14, a basic block LIST is still used as a marker for all of the statements in the basic block. Statement (8) is unchanged from FIG. 13, and the elemental statements in the contiguous elemental block (that is, statements (9) and (10)) have been put into the same type of modified LIR form as was discussed in FIG. 12. However, it should be noted that a new "result" is being used by the statements which have become part of the contiguous elemental block. In other words, they no longer refer back to the "result" associated with the non-elemental node. The purpose for this is so that the non-elemental node can be handled differently and separately from the elemental nodes, thus providing greater flexibility when the assembly language code is finally generated.

The general scheme discussed above is shown below by the following pseudo-code, which basically follows the constructs of the C programming language. In the following scheme, an embodiment is shown in which the statement LIST (referred to below as a "subgrid loop") is created before the pop LIST and before the PECODE node. It is envisioned that this pseudo-code can be used to generate workable source code for the present invention in a suitable language, such as C or PASCAL:

```
/* INSERT SUBGRID LOOPS */

GLOBAL PROCEDURE me_subg()
{
    iterid      bb_itr;
    BB          bb;

/* walk the list of basic blocks attached to the GR,
       processing each in turn                           */
    first_BB_list(get_GR_blks(lir_gr),&(bb_itr));
    while (isvalid_BB_list(&(bb_itr))) {
        bb = yield_BB_list(&(bb_itr));
        me_subg_bb(bb);
        succ_BB_list(&(bb_itr));
    }
}

/* call with bb, returns with SUBGRID_LOOPS wrapped around compatible
   vstores. */
LOCAL PROCEDURE me_subg_bb(bb)
    BB bb;
{

AC_list     rootlist;
    iterid      root_itr;
    AC          root;

rootlist = get_BB_roots(bb);
    first_AC_list(rootlist,&(root_itr));
```

```
while (isvalid_AC_list(&(root_itr))) {
  root = yield_AC_list(&(root_itr));
    if (me_class_root_is_vstore(root) &&
me_utl_is_vstore_elemental(root)) {
    me_subg_from_vstores_TOSUCC(bb,&root_itr);
  }
  else
    succ_AC_list(&(root_itr));
  }
}
```

/* call with pointer to statement list at a vSTORE, gobble up the succesive compatible vstores. Replace with a subgrid_loop. */
```
LOCAL PROCEDURE
me_subg_from_vstores_TOSUCC(bb,root_itr_ptr)
    BB      bb;
    iterid  *root_itr_ptr;
{
  AC        root,vpset_fetch1,cntx1,cntx2;
  FC        loop_desc1,loop_desc2;
  AC_list   vstore_list;
  BOOLEAN   gobbling = TRUE;

vstore_list = make_AC_list();
  cntx1 = me_utl_get_vc_allcntx_used(yield_AC_list(&(*root_itr_ptr)));
  vpset_fetch1 =
me_utl_get_vc_vpsetfetch_used(yield_AC_list(&(*root_itr_ptr)));
  loop_desc1 = me_utl_vpset_fc_from_cntx_ac(cntx1);
  while (gobbling && isvalid_AC_list(&(*root_itr_ptr))) {
    root = yield_AC_list(&(*root_itr_ptr));
    if (me_class_root_is_vstore(root) &&
        me_utl_is_vstore_elemental(root) &&
        (cntx2 = me_utl_get_vc_allcntx_used(root),
         loop_desc2 = me_utl_vpset_fc_from_cntx_ac(cntx2),
         me_subg_vstore_compatible_loops(loop_desc1, loop_desc2))) {
      append_AC_list(vstore_list, root);
      aclstRemove_TOSUCC(*root_itr_ptr);
      gobbling = !swMeSubgrid1longSwitch;
    }
```

```
        else
            gobbling = FALSE;
    }
    me_subg_from_list(bb, root_itr_ptr, vpset_fetch1, vstore_list);
}
```

GLOBAL FUNCTION BOOLEAN
me_subg_vstore_compatible_loops(loop_desc1, loop_desc2)
    FC loop_desc1, loop_desc2;
```
{
    return(loop_desc1 == loop_desc2);
}
```

```
/* insert subgrid_loop before the itr, based on vstore_list */
LOCAL PROCEDURE me_subg_from_list(bb,root_itr_ptr, vpset_fetch, vstore_list)
    BB          bb;
    iterid      *root_itr_ptr;
    AC          vpset_fetch;
    AC_list     vstore_list;
{
    attrib_pack ap_tmp;
    AC          subgrid_loop_ac;

subgrid_loop_ac = lir_vc_list_opn(vaSUBGRID_LOOP, vstore_list);
    me_utl_set_vc_vpsetfetch_used(subgrid_loop_ac,vpset_fetch);
    aclstInsert(*root_itr_ptr, subgrid_loop_ac, DB_BEFORE);
}
```

----------------
/* <u>ADD PUSH POPS</u> */ me_pecd_add_push_ret_pops
```
    {
    list_of_pushes = empty list;
    list_of_pops = empty list;

call walker on pecode body with me_pecd_pushpop_pre, pass lists
``` call walker on pecode body with me_utl_clear_visited_bits_pre for each push on list_of_pushes, insert before
    root_itr_ptr in the bb Insert the list of pops into the PECODE child
}

```
me_pecd_pushpop_pre(list_of_pushes, list_of_pops) {
  if node has already been visited
    result = false
  else {
    if operator of node is a me_class_is_pushpop_just_walk_children_op {
      /* nothing to do but walk its children */
      result = TRUE;
    }
    else if operator of node is a constant
      result = FALSE;
    }
    else /* everything else needs a push. It might be
          a fetch of a scalar or a parallel value
      me_pecd_make_bcvalue(node, list_of_pushes, list_of_pops);
      result = FALSE; /* nothing more to do */
    }
  }
  return(result);
}
```

```
me_pecd_make_bcvalue(node, list_of_pushes, list_of_pops);
{
    build push(node); add to list of pushes;
    build pop(node); add to list of pops;
    replace node where used by a parent in the pecode with the pop
}
```

It should be understood that embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. In particular, the pseudo-code discussed above can be especially useful for creating the software embodiments.

IV. Low Level Code Generator

The Low Level Code Generator 126 is now described in greater detail below.

A. Operational Overview

Figure 15:
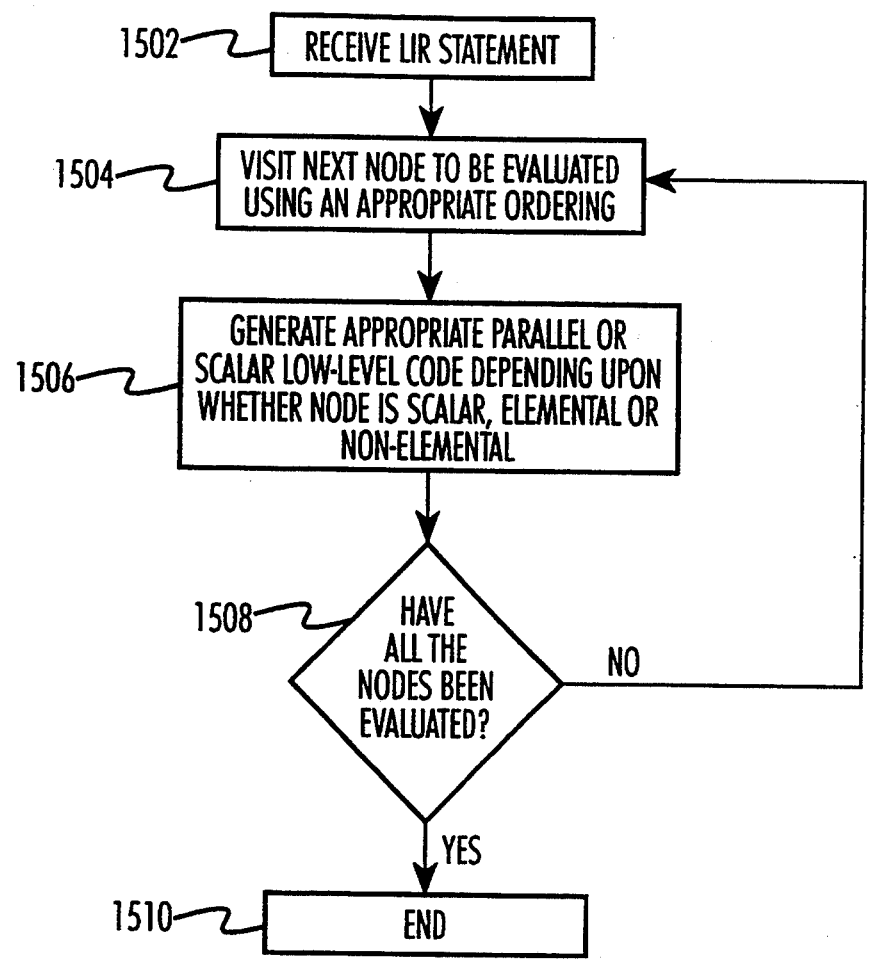
FIG. 15 is a high-level flow diagram of a method contemplated by embodiments of the present invention for generating low-level scalar and parallel code.

Embodiments of a method of operation to generate low level code are described using the flowchart of FIG. 15. Referring now to FIG. 15, the first step is to receive an LIR statement, as indicated by a Block 1502. The next step is to visit next node to be evaluated using an appropriate ordering. This is indicated by a Block 1504. Embodiments of the present invention contemplate that this ordering is some efficient mechanism such as a depth-first ordering. However, other types of orderings are contemplated as well. In any event it is contemplated that each node is to be evaluated once, although nodes can be traversed to multiple times. (It should be understood, however, that in order to "visit"

the next node not yet evaluated, it may be necessary to travel through other nodes which have been already visited).

The next step is to generate the appropriate parallel or scalar low level code (based upon the visited node) depending upon whether the node is scalar, elemental, or non-elemental. Thus, the present invention will generate different types of code depending upon the type of the node. The low level code which is generated is contemplated by embodiments of the present invention to be assembly language. However, it should be understood that machine language or some other form of low level code could also be generated. Some embodiments further contemplate that a higher-level language such as C could also be generated (thus, for example, Fortran could be changed into C).

The next step is to determine whether all of the nodes in the LIR statement have been evaluated. This is indicated by a Block 1508. If they have not, then the next step is to visit the next node not yet evaluated, as indicated by Block 1504. If all the nodes have been evaluated, then the present invention ends. Of course, embodiments of the present invention contemplate that the overall invention can exist in a loop so that it receives multiple LIR statements sequentially. In fact, embodiments of the present invention contemplate that the present invention sequentially receives LIR statements one basic block at a time.

It is noted that in evaluating the nodes for the generation of the appropriate type of low level code, the evaluation is done on a node-by-node basis. In other words, individual nodes are characterized as scalar, elemental or non-elemental, as opposed to characterizing an entire statement and basing subsequent actions on such characterization. However, it should be understood that the children of nodes may affect the characterization of the individual nodes. For example, the children of a "pStore" (parallel store) operation would be looked at to determine whether the "pStore" operation is elemental or non-elemental.

B. Operational Embodiments

Embodiments of a method of operation of the Low Level Code Generator 114 are described in greater detail using the flowcharts of FIGS. 16–19. In these embodiments, it is contemplated that assembly language is generated. Referring first to FIG. 16, again, the first step is to receive an LIR statement. This is indicated by a Block 1602. The next step is to visit the next node not yet visited. This is indicated by a Block 1604. Embodiments of the present invention contemplate that this is accomplished using a depth-first ordering.

The next step (which assumes that a depth-first ordering is being used) is to determine if each child of the visited node has already been visited, or if the visited node has no children. This is indicated by a Block 1606. If the answer to both of these questions is "no," then this means that there are no more nodes "below" the visited node in the LIR statement that need to be traversed first. Where this is the case, the next step is to traverse to the next node not yet visited, as indicated by Block 1604. It can be seen that by continually moving down toward the lowest child in the LIR in this fashion, that the present invention contemplates the utilization of a recursive scheme to implement the depth-first ordering.

If, however, the answer to either of the questions stated in Block 1606 is "yes," then a determination is made whether the node matches a defined pattern. This is indicated by a Block 1608. Embodiments of the present invention contemplate that patterns to which the nodes can be matched are stored in some memory device, such as RAM 110. More specifically, these patterns indicate whether a node which has been visited is a "legal" node. (That is, one that has been previously defined as code-generatable by the present invention).

Embodiments of the present invention contemplate that the types of nodes for which patterns exists can be classified into the categories of scalar, elemental and non-elemental. Some embodiments of a present invention contemplate that examples of scalar nodes are a scalar "+" (that is, addition of two scalar variables), scalar "−", scalar "store" and scalar "load." Examples of elemental nodes for which some embodiments of the present invention contemplate patterns exists are largely identical to those examples for the scalar nodes, except that parallel variables (i.e., arrays) would be involved. Examples of non-elemental nodes would be "CSHIFT" (circular shift), "SPREAD" (copy data across processors) and "GARRAY" (read data from a particular processor on a parallel portion of the target computer). These non-elemental nodes are actually functions or statements from various high-level programming languages that result in communication between processors.

If the node which has been visited does not match a defined (that is, "legal") pattern, then some embodiments of the present invention contemplate that an error message is generated. This is indicated by a Block 1611. Where this is the case, the next step would be for the present invention to determine if all the nodes in the LIR statement have been evaluated. This is indicated by a Block 1614. Where this is not the case, then the next node will again be visited as indicated by a Block 1604.

If the node being visited does, in fact, match a defined pattern, then the next step would be to use the appropriate rule for the pattern. This is indicated by a Block 1610. In embodiments of the present invention, each pattern is associated with one rule, both of which are contemplated to exist in a memory device such as RAM 110.

Because the target computer contains a scalar portion and a parallel portion, assembly language needs to be generated for both portions. Consequently, two code "streams" of assembly language are generated, one which is to be executed on the scalar portion of the target computer, and the other which is to be executed on the parallel portion. Thus, the present invention provides rules which (depending upon the visited node) result in the generation of the appropriate assembly language. In embodiments contemplated by the present invention, if a node is scalar, it will use one of the rules as generally defined in FIG. 17. In other words, it will utilize one of the general schemes as shown in that Figure. If the node is non-elemental, then it will use rules generally defined in FIG. 18, and if the node is elemental, it will use rules generally defined in FIG. 19. This is indicated by a Block 1612. Application of one of these rules will then generate appropriate assembly language.

After a rule has been applied to the visited node, then the present invention will determine whether all of the nodes have been evaluated, as indicated by a Block 1614. Again, if they have not all been evaluated, then the next node will be visited as indicated by Block 1604. If all the nodes have been visited, then the present invention will end, as indicated by Block 1616. However, as discussed above, embodiments of the present invention do contemplate sequentially receiving multiple LIR statements.

Figure 17A:
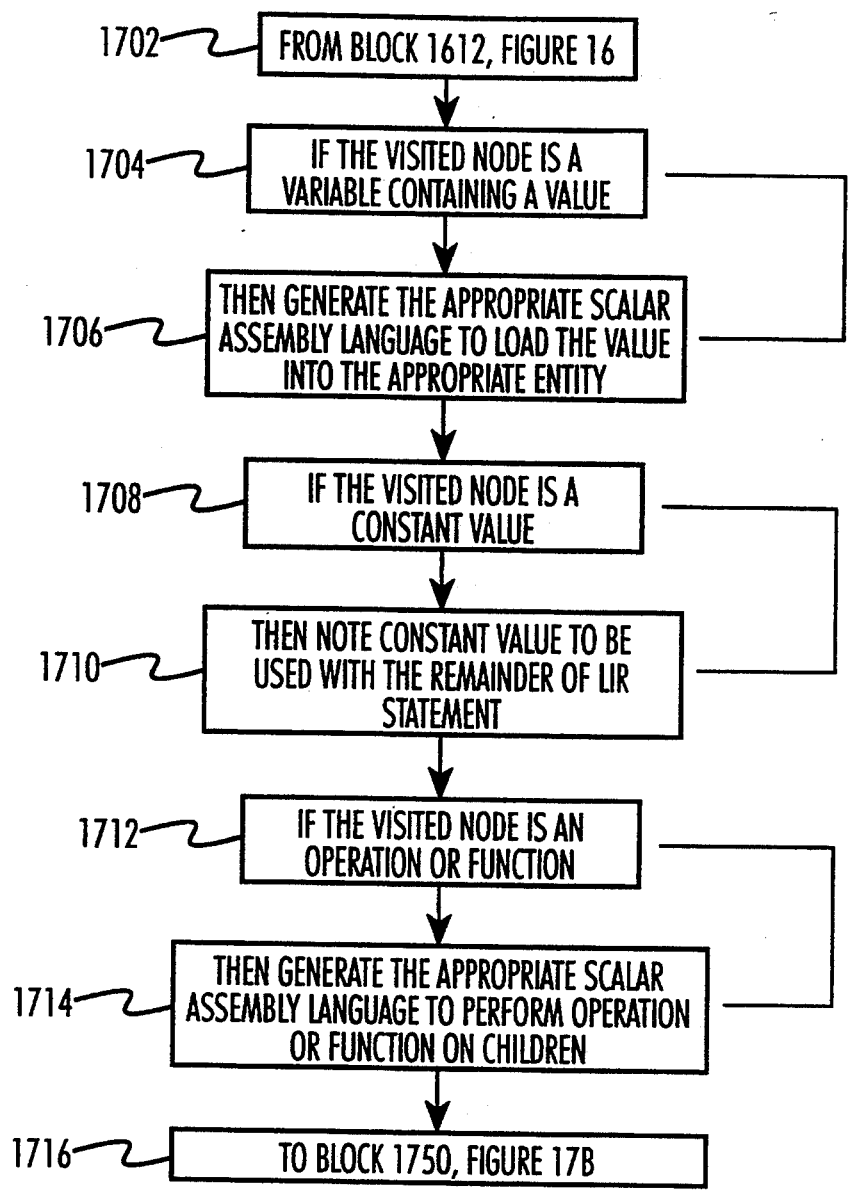
FIGS. 17A and 17B is a flow diagram of a method contemplated by embodiments of the present invention for choosing a rule for a scalar node.
Figure 17B:
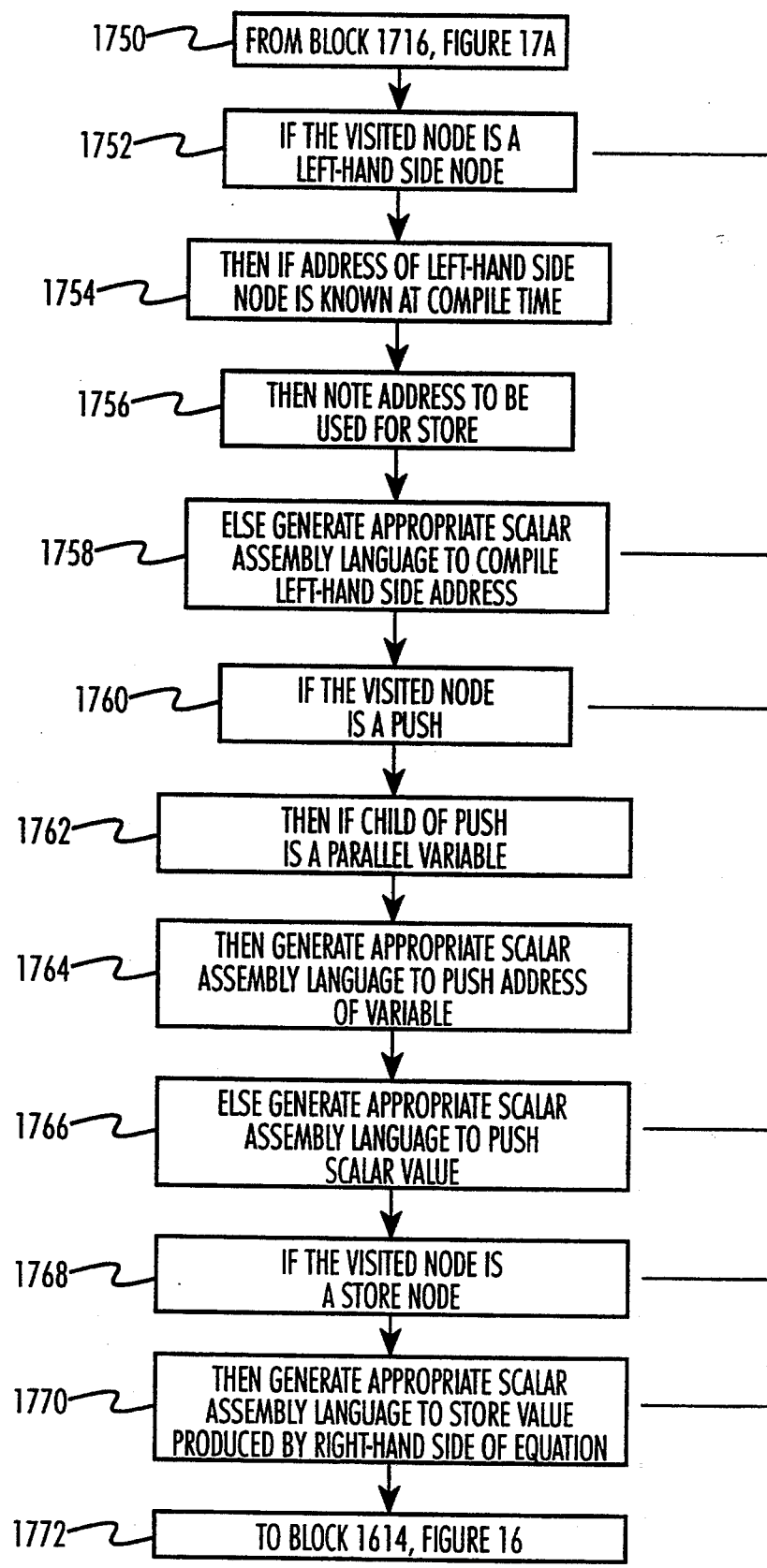

FIGS. 17A and 17B demonstrate some of the general categories of rules applied to scalar nodes as contemplated by embodiments of the present invention. Referring first to FIG. 17A, it should be noted that this figure (and several of the following figures) is set up in an "if-then" fashion, demonstrating the criteria by which a rule is chosen. The first rule shown in FIG. 17A is applied if the visited node is a variable containing a value. This is indicated by a Block 1704. If this is the case, then the appropriate scalar assembly language is generated which will load the value into the appropriate entity (for example, a register), as indicated by a Block 1706. This is accomplished in order to perform whatever operation is about to be performed using the scalar variable.

The next rule will be applied if the visited node is a constant value. This is indicated by a Block 1708. When this is the case, the embodiments of the present invention contemplate that the constant value will merely be noted, and will be used with the remainder of the LIR statement. This is indicated by a Block 1710. In other words, this value is noted so that it can be used in conjunction with some operation. In some situation, however, it may be necessary to load the constant into a register if, for example, the constant is being passed as an argument to some function.

The next rule will be applied if the visited node is an operation or function. This is indicated by a Block 1712. Where this is the case, then the appropriate assembly language will be generated to perform the specified operation or function on the children of the visited node. This is indicated by a Block 1714.

The remaining categories of rules for generating assembly language to be used on the scalar portion of the target computer are shown at FIG. 17B. Referring now to FIG. 17B, the next rule will be applied if the visited node is a left-hand side node, as indicated by Block 1752. In other words, if the node is on the left-hand side of the equal sign in the statement, then this rule will be applied. It is noted that the left-hand side node represents the address at which whatever is evaluated on the right-hand side of the statement is stored. According to this rule, if the visited node is a left-hand side node, then if the address of the left-hand side node is known at compile time, then the address to be used to store the right-hand side is noted. This is indicated by Blocks 1754 and 1756. This will be the situation where the left-hand side node is a simple variable. If, however, the address of the left-hand side node is not known at compile time, then a rule will be applied to generate appropriate scalar assembly language to compute the left-hand side address. This is indicated by a Block 1758. This would be the case where, for example, the left-hand side is an array, and the index into the array is not known at compile time.

The next rule will be applied if the visited node is a "push" node. This is indicated by a block 1760. Where this is the case, then if the child of the push node (that is, the variable that is to be pushed) is a parallel variable, then the present invention will generate the appropriate scalar assembly language to push the address of the variable onto whatever transference mechanism is being used to transfer information between the scalar and parallel portions of the target computer.

However, if the child of the push node is not a parallel variable, but rather is a scalar variable, then embodiments of the present invention contemplate that a rule will be applied to generate the appropriate scalar assembly language to push the scalar value. This is indicated by a Block 1766.

The next rule will be applied if the visited node is a store node (i.e., an "="). Where this is the case, the present invention contemplates generating appropriate scalar assembly language to store the value produced by the right-hand side of the equation (at an address which is either known or will be computed as per Blocks 1752 and 1758).

Figure 16:
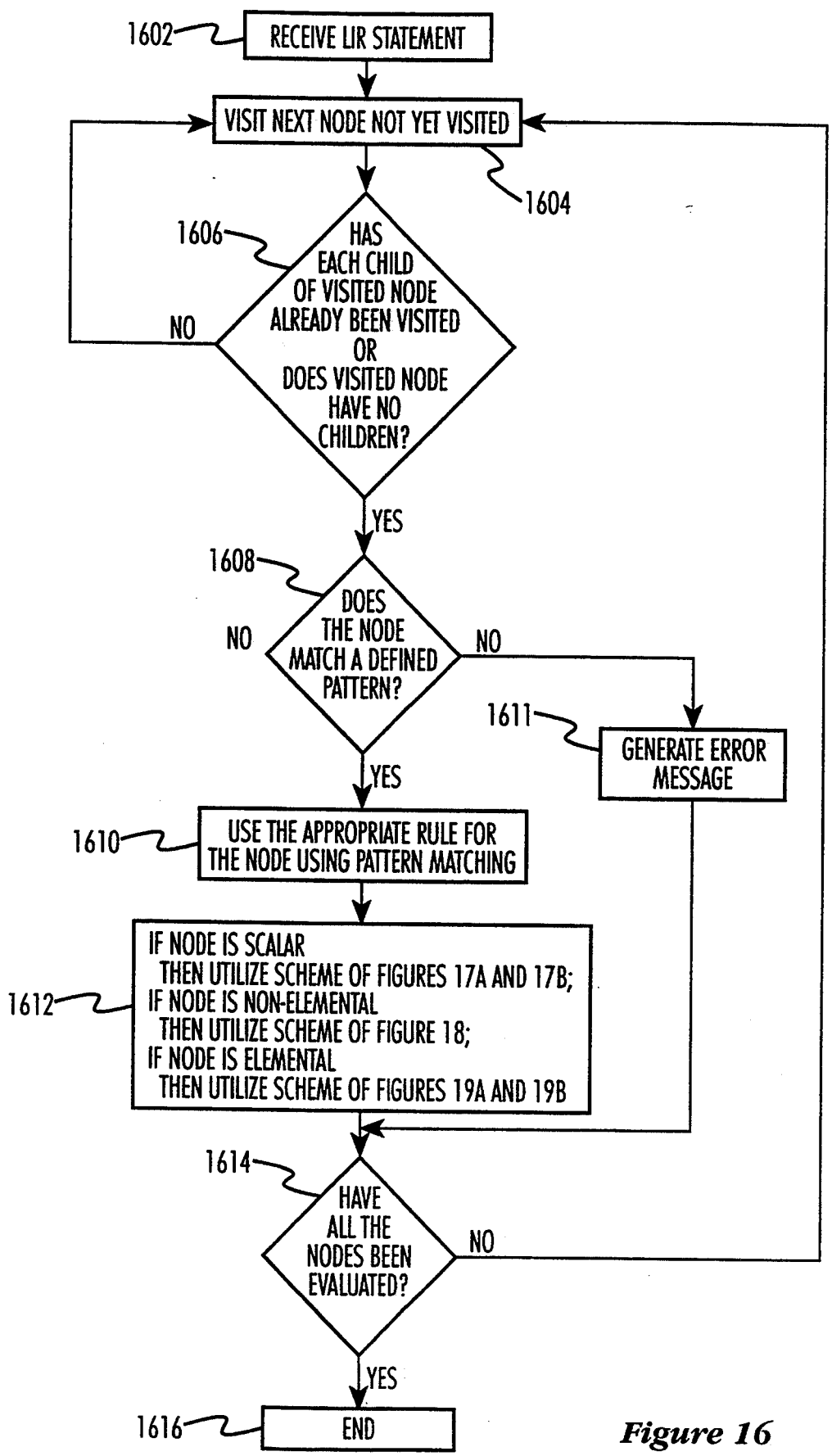
FIG. 16 is a flow diagram of a method contemplated by embodiments of the present invention for determining an appropriate rule to use for generating the appropriate assembly language.

Once a rule has been applied to the visited node, then the next step will be to determine whether all of the nodes have been evaluated, as indicated by Block 1614 at FIG. 16.

Figure 18:
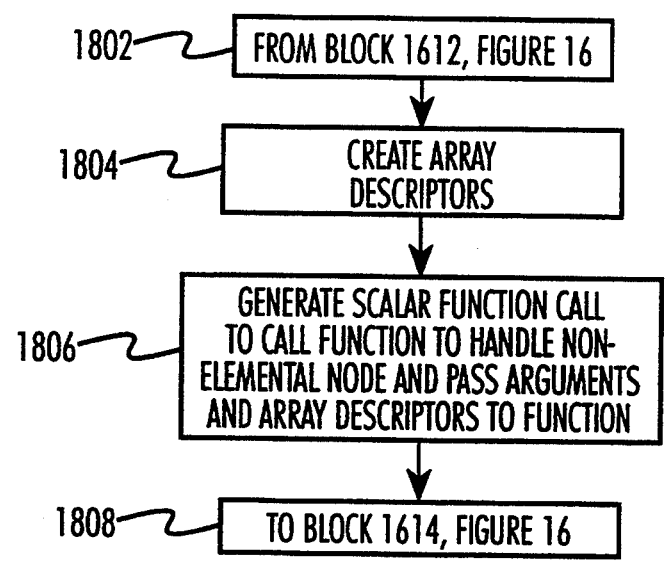
FIG. 18 is a flow diagram of a method contemplated by embodinents of the present invention for utilizing a non-elemental node resolver.

Referring back now to FIG. 16, if a visited node is non-elemental, then the rules which will be applied to this node are shown in FIG. 18. Referring now to FIG. 18, the first step is that array descriptors for the non-elemental node are created, as indicated by a block 1804. These array descriptors "describe" the child nodes of the non-elemental node (which are the parameters for the non-elemental node). Thus, an array descriptor might contain such information as the address of the array, the rank (dimensionality) and size of the array, and the shape of the array.

Once the array descriptors have been created, then embodiments of the present invention contemplate that the next step is to utilize a non-elemental resolver to resolve the non-elemental node. Embodiments of the present invention contemplate that a scalar function call is generated to utilize the non-elemental resolver. In addition, it is envisioned that any arguments and array descriptors are also passed to the non-elemental resolver. This is indicated by a Block 1806.

Embodiments of the present invention contemplate that non-elemental nodes are resolved at run-time using run-time libraries, and thus assembly language is not generated for the specific non-elemental nodes visited in the LIR statement. Embodiments of the present invention also contemplate that any evaluation of arguments within the function will be handled by the scalar portion of the target computer. Thus, if a "CSHIFT" node is encountered and one of the arguments is "a+b," then assembly language will be generated to evaluate this argument before assembly language is generated to forward the arguments to the non-elemental resolver.

Once scalar assembly language has been generated to resolve the non-elemental node, the next step is to determine whether all of the nodes have been evaluated in the LIR, as per step 1614 of FIG. 16. Referring back now to FIG. 16, if the visited node is elemental, then as per step 1612 the rules as described in FIGS. 19A and 19B will be applied. It is first noted, though, that embodiments of the present invention contemplate that some of the LIR statements received by the present invention may be in the form of maximal contiguous elemental blocks (i.e., push nodes followed by PECODE nodes) as discussed above. Consequently, for such purposes as a evaluating "pop" nodes, the statements within this block (i.e., those that are succeeded with a single PECODE node) are treated as a single LIR statement.

Figure 19A:
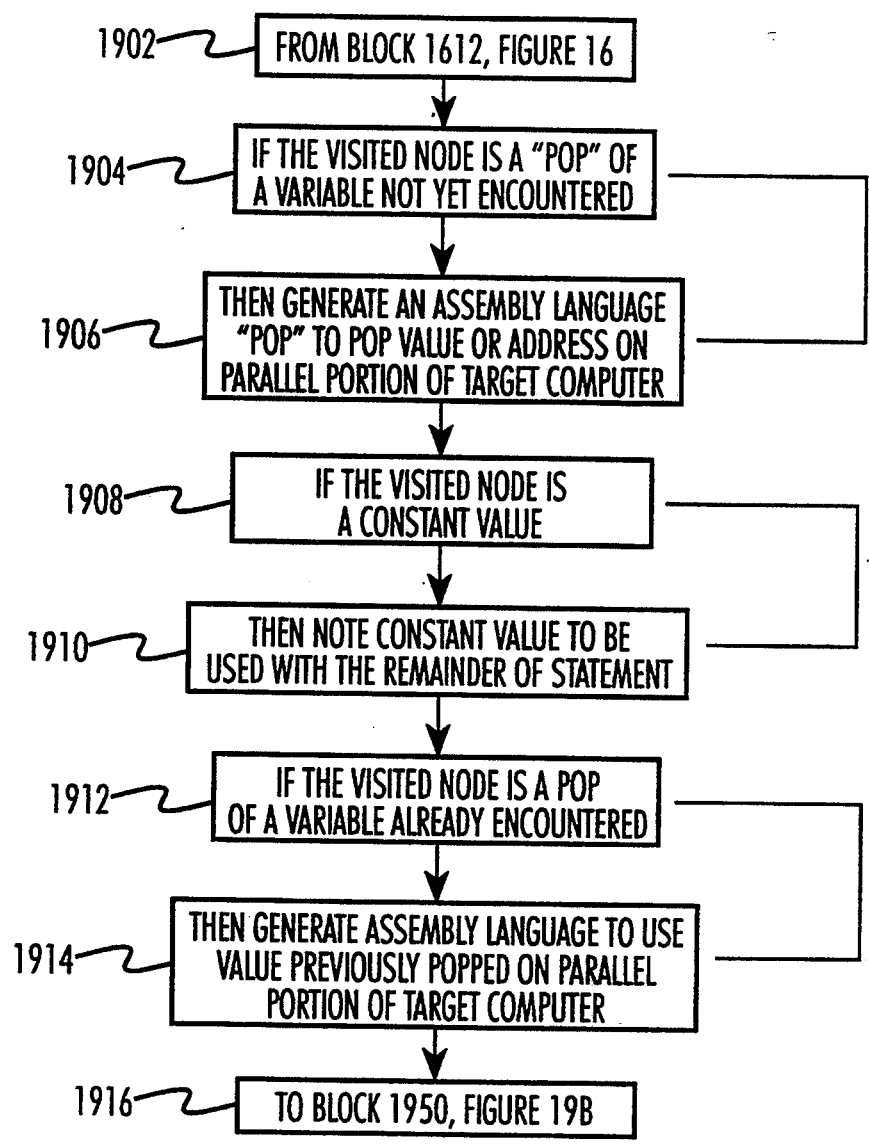
FIGS. 19A and 19B are a flow diagram of a method contemplated by embodiments of the present invention for choosing a rule for a parallel node.
Figure 19B:
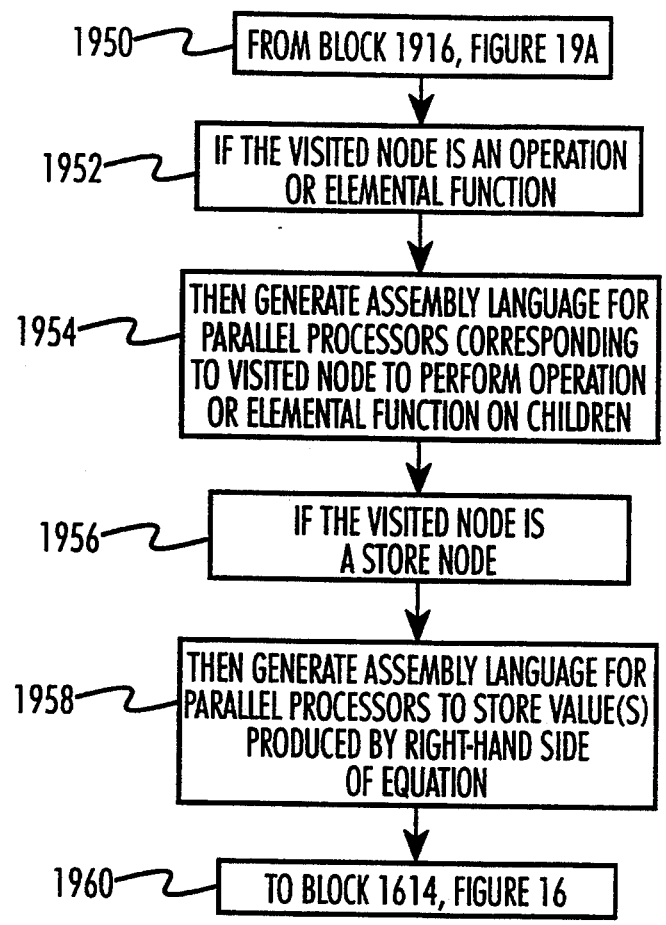

Referring now to FIG. 19A, the first rule will be applied if the visited node is a "pop" of a variable not yet encountered. This is indicated by a Block 1904. In other words, if the pop node is for a variable which has not yet been previously encountered as the child of another "pop" node, then this rule will be applied, and the present invention will generate an assembly language "pop" to pop the value or address into a variable on a parallel portion of the target computer. This is indicated by a Block 1906. Embodiments of the present invention contemplate that the assembly language is generated to pop the value or address into a register.

The next rule is used if the visited node is a constant value. This is indicated by a Block 1908. Where this is the case, then the present invention notes this constant value which is to be used with the remainder of the LIR statement, as indicated by a Block 1910.

The next rule is applied if the visited node is the "pop" of a variable already encountered. In other words, if the node indicates that its "child" variable is to be popped, and that variable was already popped somewhere else in the LIR statement (e.g., in another node associated with the same PECODE node) then assembly language will be generated to use of value previously popped (i.e., a pointer to the "pop" is generated). This is indicated by Blocks 1912 and 1914. Thus, some embodiments contemplate that assembly language is generated to utilize the value which has been placed into a register by a previous "pop."

The next rule will be applied if the visited node is an operation or elemental function. This is indicated by a Block 1952. Thus, if one or more variables in an operation are parallel or if the function has elemental variables as parameters, then the present invention will generated the appropriate assembly language for the parallel processors to perform the specified operation or elemental function on the children nodes. This is indicated by a Block 1954.

The next rule will be applied if the visited node is a store node, as indicated by Block 1956. Where this is the case, the present invention generates assembly language for parallel processors to store the value(s) produced by the right-hand side of the equation, as indicated by a Block 1958.

Once a rule has been applied to the visited node, then the next step will be to determine whether all of the nodes have been evaluated, as indicated by a Block 1614.

It should be noted that the general types of rules discussed above in conjunction with FIGS. 17–19 are examples contemplated by embodiments of the present invention. Various other types of rules as well as a different sequencing of the rules discussed above is also contemplated.

C. MODULE CONFIGURATION

Figure 20:
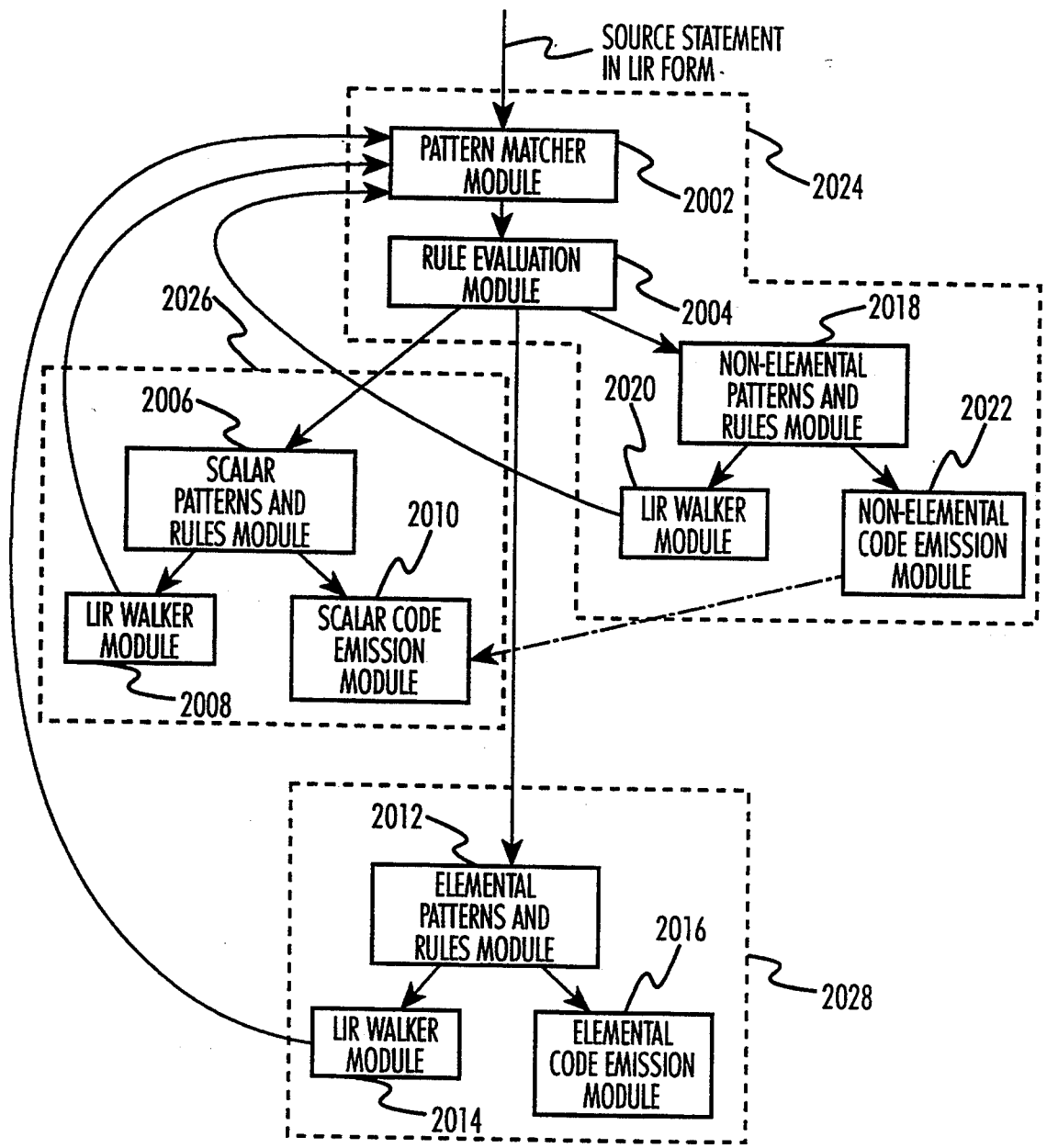
FIG. 20 is a block diagram of embodiments of the present invention for generating appropriate low-level code.

Embodiments of a system of the present invention are described using the diagram of FIG. 20. Referring now to FIG. 20, a pattern matcher module 2002 receives an LIR statement. The nodes of the source statement are then analyzed for a match by the pattern matcher module 2002. Embodiments of the present invention contemplate that the first node will be the top node of the LIR statement, which is an "=".

If the pattern matcher module 2002 cannot match a pattern for a node being visited, then embodiments of the present invention contemplate than an error signal will be generated, and that the present invention will terminate. If, however, a match is found, then a rule evaluator module 2004 will use one of three sub-modules in which the rule resides, depending upon the type of node that it is. For example, if the node is a scalar node, then the rule evaluator module 2004 will utilize a scalar patterns and rules module 2006. Thus, if a node being visited is a "+" and the variables which were being added are scalar, then this module 2006 is used.

In the above-noted example where an operation such as a "+" is the node being visited, embodiments of the present invention contemplate that a rule for this node would indicate that the children of operation node must also be visited. This is because in order to perform an operation, it is necessary to know what is being operated on. To implement this ability to visit other nodes, the scalar patterns and rules module 2006 utilizes an LIR walker module 2008 to visit the children of visited node. The scalar patterns and rules module 2006, depending upon the type of operation, tells the LIR walker module 2008 information such as the order in which the children need to be walked (that is, right-to-left or left-to-right).

The LIR walker module 2008 will traverse to the next node in the LIR statement in accordance with the rule in the scalar patterns and rules module 2006, and will then have this next node evaluated by the pattern matcher module 2002. This will cause the process described above to begin anew. In this way, a recursive scheme is implemented.

If each child of a node being evaluated (i.e., visited) has no children or if each child of the visited node has already been visited, then the rule which the scalar patterns and rules module 2006 will choose is one that will utilize the scalar code emission module 2010. Thus, in embodiments of the present invention, the scalar patterns and rules module 2006 will direct the scalar code emission module 2010 to generate some type of low level code (e.g., assembly language) in accordance with the specified rule for the specific type of node being evaluated. The scalar patterns and rules module 2006 will then direct the LIR walker module 2008 to move "upwards" in the LIR statement, thus unwinding the recursion.

Embodiments of the present invention contemplate that a similar occurrence will transpire if the rule evaluator module 2004 detects that the node being visited requires rules pertaining to elemental nodes. In that case, an elemental patterns rules module 2012 will be utilized in conjunction with an LIR walker module 2014 and an elemental code emission module 2016. A non-elemental node is handled similarly using a non-elemental patterns and rules module 2018, and LIR walker module 2020 and a non-elemental code emission module 2022. A difference, however, is that embodiments of the present invention envision that the non-elemental code emission module 2022 actually utilizes the scalar code emission module 2010 in creating low level code which utilizes the non-elemental resolver.

In embodiments contemplated by the present invention, the modules relating to non-elemental nodes (modules 2018, 2020, 2022), the rule evaluator module 2004 and the pattern matcher module 2002 are contemplated to be part of a processor-independent module 2024. The modules used in conjunction with scalar nodes (module 2006, 2008 and 2010) are part of a scalar processor specific module 2026, and those modules used in conjunction with elemental nodes (modules 2012, 2014, 2016) are part of an elemental-specific module 2028. As indicated above, however, in embodiments where simple non-elemental nodes are encapsulated into a maximal contiguous block, it would be contemplated that the rules of the elemental patterns and rules module 2012 within the elemental specific module 2028 will be applied when one of those nodes is encountered.

It should be understood that the configuration of the modules discussed above are one embodiment of the present invention, and that the present invention contemplates a variety of different types of configurations of these modules, as well as utilization of different types of modules.

D. EXAMPLES

The following examples demonstrate the assembly language generated by embodiments of the present invention given specific LIR statements. The assembly language shown below is surrounded by text showing what is happening as the assembly language is generated. The textual term "SUBTARGET on x" means "find and apply the rule whose pattern matches the node (and any relevant child nodes) starting at node x". As discussed above, sometimes applying a rule will result in assembly language being generated, and sometimes not (e.g., when the child nodes of a "presently visited" operation node have not yet been evaluated). The text following the terms EMIT <type> are the actual assembly language that is generated. Thus, EMIT SCALAR means generate scalar assembly language, and EMIT PE means generate assembly language for the parallel portion of the target computer. Comments about what the code does are prefaced by ";". In addition, the indentation level indicates which rule is being applied. Also, the lines beginning with "return" show what is returned from the rule that is (at that point) being applied. Additional notation for understanding the following description includes: srN="scalar register N"; prN="parallel register N"; lhs="left hand side"; rhs="right hand side."

The following pertains to the example of FIG. 21A, and shows the annotated results as generated by embodiments of the present invention:

```
SUBTARGET on =
 SUBTARGET on +
  SUBTARGET on (rhs) A for VALUE
   SUBTARGET on (rhs) A for ADDRESS
    returns register with address of A: sr0
   EMIT SCALAR: load [sr0], sr1  ; fetch the value of A into sr1
   return register value with value of A: sr1
  SUBTARGET on B for VALUE
   SUBTARGET on (rhs) B for ADDRESS
    returns register with address of B: sr2
   EMIT SCALAR: load [sr2], sr3  ; fetch the value of B into sr3
   return register with value of B: sr3
  EMIT SCALAR: add sr1, sr3, sr4  ; add A + B into sr4
  return register with result of +: sr4
 SUBTARGET on (lhs) A for ADDRESS
  return register with address of A: sr0
 EMIT SCALAR: store sr4, [sr0]   ; store A+B into A
```

Thus, since there are four "EMIT" terms, there are four assembly language instructions that are generated.

The following pertains to the example of FIG. 21B, and shows the annotated results as generated by embodiments of the present invention:

```
SUBTARGET on (first) PUSH
 SUBTARGET on A for ADDRESS
  return register with (parallel) address of A: sr0
 ;now emit code to push the address of A down the
 FIFO between the scalar portion and the parallel portion of the
 target computer; Embodiments of the present invention
 contemplate that this is done using a "CMRT call"
 EMIT SCALAR: push Sr0  ; setup argument to CMRT_push
 EMIT SCALAR: call CMRT_push  ; do the PUSH
SUBTARGET on (second) PUSH
 SUBTARGET on C for ADDRESS
  return register with (parallel) address of C: sr1
 EMIT SCALAR: push sr1 ; setup argument to CMRT_push
 EMIT SCALAR: call CMRT_push ; do the PUSH
SUBTARGET on (third) PUSH
 SUBTARGET ON TEMP1 for ADDRESS
  return register with (parallel) address of TEMP1: sr2
 EMIT SCALAR: push sr2 ; setup argument to CMRT_push
 EMIT SCALAR: call CMRT_push  ; do the PUSH
SUBTARGET on =
 SUBTARGET on *
  SUBTARGET on (second) POP for VALUE
   SUBTARGET on (same) POP for ADDRESS
    EMIT PE: pop pr1  ; pop addr of A from FIFO into pr1
    return register with address popped: pr1
   EMIT PE: load [pr1], pr2 ; fetch value of A into pr2
   return register with value of A: pr2
  SUBTARGET on (third) POP for VALUE
   SUBTARGET on (same) POP for ADDRESS
    EMIT PE: pop pr3  ; pop addr of B from FIFO into pr3
    return register with address popped: pr3
   EMIT PE: load [pr3], pr4 ; fetch value of B into pr4
   return register with value of B: pr4
  EMIT PE: mult pr2, pr4, pr5 ; multiply A by B into pr5
  return register with value of A*B: pr5
 SUBTARGET on (first) POP
  EMIT PE: pop pr6  ; pop addr of TEMP1 from FIFO into pr0
  return register with address popped: pr6
 EMIT PE: store pr5, [pr6]  ; store A*B into TEMP1
 ;emit some code on the scalar to cause this PE code
 to be executed, using "CMRT_funcall"
 EMIT SCALAR: push pe_code_0  ; first arg:name of PE code to execute
 EMIT SCALAR: call CMRT_funcall ; call the PE code
 ;emit PE code to return control to scalar portion of target computer
 EMIT PE: return
```

The following pertains to the example of FIG. 21C, and shows the annotated results as generated by embodiments of the present invention:

```
SUBTARGET on =
 SUBTARGET on TEMP1 for ADDRESS
  return register with (parallel) array descriptor address of
   TEMP1: sr1
 SUBTARGET on 1
  EMIT SCALAR: mov 1, sr2  ; place the constant 1 into sr2
  return register with constant value 1: sr2
 SUBTARGET on 9
  EMIT SCALAR: mov 9, sr3  ; place the constant 9 into sr3
  return register with constant value 9: sr3
 SUBTARGET on TEMP2 for ADDRESS
  return register with (parallel) array descriptor address of
   TEMP2:sr4
 (Now we emit code to setup the arguments for the CMRT call;
 note that the push instructions are normal scalar pushes onto
 the stack; they are not related at all to the PUSH nodes)
 EMIT SCALAR: push sr3   ; setup last argument (shift amount)
 EMIT SCALAR: push sr2   ; third arg (dimension number)
 EMIT SCALAR: push sr1   ; second arg (source array)
 EMIT SCALAR: push sr4   ; first arg (destination array)
 EMIT SCALAR: call CMRT_cshift  ; this does the CSHIFT
```

Note that the CSHIFT itself was not actually sub-targeted. This is to show that some embodiments of the present invention contemplate that non-elemental nodes are not sub-targeted. Rather, the "=" in combination with the CSHIFT is sub-targeted, and thus this is the pattern which is looked for. This is done since non-elemental nodes "historically" have not been associated with equal signs and have instead been the top note in the LIR statement. Thus, this scheme allows for conventional consistency. However, embodiments of the present invention do contemplate that the CSHIFT node can be sub-targeted.

Figure 22:
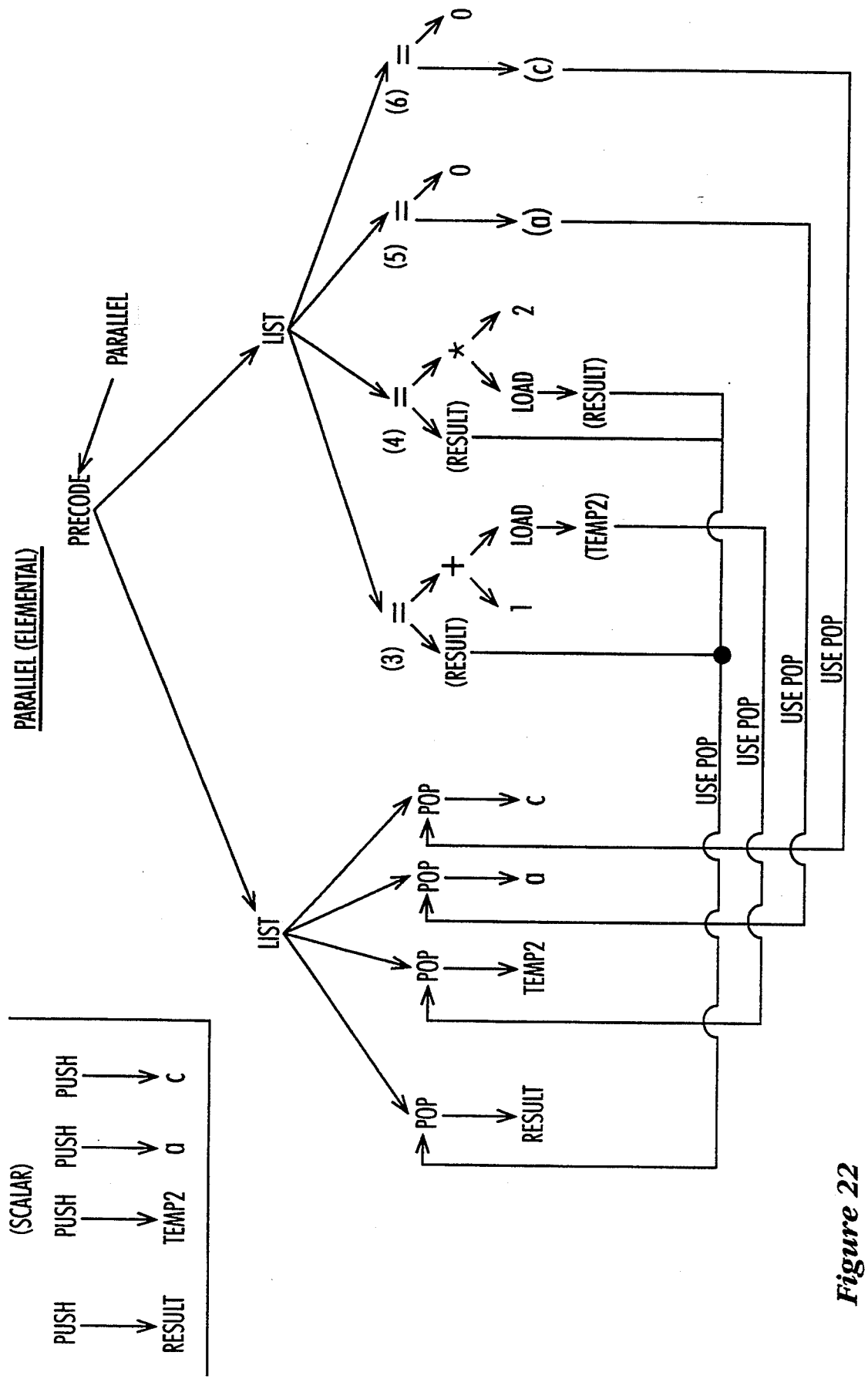

The following pertains to the PECODE node example of FIG. 22, and shows the annotated results as generated by embodiments of the present invention:

```
SUBTARGET on (first) PUSH
 SUBTARGET on RESULT for ADDRESS
  return register with (parallel) address of RESULT: sr0
 ;embodiments of the present invention contemplate that variables
 to be be pushed are buffered in "pe_args"
 EMIT SCALAR: store sr1, [pe_args+1] ; setup third PE argument
SUBTARGET on (second) PUSH
 SUBTARGET on TEMP2 for ADDRESS
  return register with (parallel) address of TEMP2:sr1
 EMIT SCALAR: store sr1, [pe_args+1] ; setup second PE argument
SUBTARGET on (third) PUSH
 SUBTARGET on A for ADDRESS
  return register with (parallel) address of A: sr2
 EMIT SCALAR: store sr2, [pe_args+2]; setup third PE argument
```

-continued

```
SUBTARGET on (fourth) PUSH
  SUBTARGET on B for ADDRESS
    return register with (parallel) address of B: sr3
  EMIT SCALAR: store sr3, [pe_args+3] setup fourth PE argument
SUBTARGET on PECODE
  EMIT SCALAR: push pe_args     ; second arg: pe_args
  EMIT SCALAR: push pe_code_0   ; first arg: name of PE code to execute
  EMIT SCALAR: call CMRT_funcall ; call the PE code
SUBTARGET on (first) LIST
  SUBTARGET on (first) POP
    EMIT PE: pop pr0   ; pop addr of RESULT from FIFO into pr0
    return register with address popped: pr0
  SUBTARGET on (second) POP
    EMIT PE: pop pr1   ; pop addr of TEMP2 from FIFO into pr1
    return register with address popped: pr1
  SUBTARGET on (third) POP
    EMIT PE: pop pr2   ; pop addr of A from FIFO into pr2
    return register with address popped: pr2
  SUBTARGET on (fourth) POP
    EMIT PE: pop pr3   ; pop addr of B from FIFO into pr3
    return register with address popped: pr3
EMIT PE: (code to start subgrid loop)
SUBTARGET on (second) LIST
  SUBTARGET on (first) =
    SUBTARGET on +
      SUBTARGET on 1
        EMIT SCALAR: mov 1, pr8 ; place the constant 1 into pr8
        return register with constant value 1: pr8
      SUBTARGET on (second) USEPOP for VALUE
        SUBTARGET on (same) USEPOP for ADDRESS
          return register with address previously popped: pr1
        EMIT PE: load [pr1], pr4 ; fetch value of TEMP2 into pr4
        return register with value of USEPOP: pr4
      EMIT PE: add pr8, pr4, pr5 ; compute 1+TEMP2 into pr5
      return register with 1+TEMP2: pr5
    SUBTARGET on (first) USEPOP for ADDRESS
      return register with address previously popped: pr0
    EMIT PE: store pr5, [pr0] ; store 1+TEMP2 into RESULT
  SUBTARGET on (second) =
    SUBTARGET on *
      SUBTARGET on (fourth) USEPOP for VALUE
        SUBTARGET on (same) USEPOP for ADDRESS
          return register with address previously popped: pr0
        EMIT PE: load ]pr0], pr6 ; fetch value of RESULT into pr6
        return register with value of USEPOP: pr6
      SUBTARGET on 2
        EMIT SCALAR: mov2, pr9  place the constant 2 into pr9
        return register with constant value 2: pr9
      EMIT PE: mul pr6, pr9, pr7 ; compute RESULT*2 into pr7
      return register with RESULT*2: pr7
    SUBTARGET on (third) USEPOP for ADDRESS
      return register with address previously popped: pr0
    EMIT PE: store pr7, [pr0] ; store RESULT*2 into RESULT
  SUBTARGET on (third) =
    SUBTARGET on 0
      EMIT PE: mov 0, pr10   ; place the constant 0 into pr10
      return register with constant value 0: pr10
    SUBTARGET on (fifth) USEPOP for ADDRESS
      return register with address previously popped: pr2
    EMIT PE: store pr10, [pr2]  ; store 0 into A
  SUBTARGET on (third) =
    SUBTARGET on 0
      return register with previously-loaded constant value 0: pr10
    SUBTARGET on (fifth) USEPOP for ADDRESS
      return register with address previously popped: pr3
    EMIT PE: store pr10, [pr3]  : store 0 into C
EMIT PE: (code to end subgrid loop)
```

The general scheme discussed above is shown below by the following pseudo-code. It is envisioned that this pseudo-code can be used to generate workable source code for the present invention in a suitable language, such as C or PASCAL:

```
/* TOP-LEVEL ROUTINES */

/* Statement-level LIR tree walker */
walk_lir_statements(LIR_tree)
{
  foreach statement in LIR_tree {
    subtarget(statement)
  }
}
```

/* Pattern Matcher and Rule Evaluator */
/* (The pattern matcher and evaluator is actually generated from the patterns and rules below by Compass' "PRL" tool from Compass Corporation of Wakefield Massachusetts. The following pseudo-code simply indicates that a rule is chosen by the pattern matcher, and then evaluated by the rule evaluator.) */

```
subtarget(LIR_node)
{
  /* Find a rule matching this LIR node */
  rule = pattern_match(LIR_node);

/* Evaluate the rule */
  evaluate(rule);
}
```

/* SOME SAMPLE SCALAR PATTERNS AND RULES */

/* These are the input to Compass' "PRL" tool, which generates code to perform the pattern matching and rule evaluation. In the patterns, the notation used is "node_class/name", where "/name" is optional. The node_class indicates that an LIR node matching the pattern must be a member of node_class. An uppercase node_class indicates a singleton class consisting of the single node named. A lowercase node_class indicates a group of nodes (e.g. "lhs" for "left hand side" nodes). When "/name" is given, it indicates that "name" can be used in the rule action to refer to the node matching that part of the pattern. The children (if any) of a node can optionally be included in the pattern to be matched by specifying them in parentheses. "--" indicates the start of a comment. Finally, "^" indicates a synthesized attribute (passed up the LIR tree) and "!" indicates an inherited attribute (passed down the LIR tree). */ rule simple_STORE:
pattern: STORE/S (lhs/L, rhs/R)
action:
[
  -- Fortran language definition says the rhs of a STORE must be eval'd first -- This first subtarget says to find an appropriate rule to evaluate
  -- the rhs "R" and synthesize R.^opd which represents an operand holding
  -- the value to be stored.
  SUBTARGET R(^opd);

-- This subtarget does the same thing for the lhs "L", synthesizing
  -- L.^opd, which represents an operand holding the address in which
  -- R's value should be stored.
  SUBTARGET L(^opd);

-- Finally, generate an instruction which stores R.^opd in the address
-- indicated by L.^opd.
cgn_MiMemOp [
  type = R.type,
  opr  = store,
  val  = R.^opd,
  addr = L.^opd
];

];

rule local_SYMBOL:
pattern: SYMBOL/SYM;
-- Constraints such as the following impose additional qualifications that
-- must be met before the pattern-match succeeds.
constraints: cgn_IsLocal(SYM);
synthesizes: ^opd;
action:
[
  -- Synthesize an operand representing the address of local symbol SYM
  -- as a base-register displaced operand.
  ^opd = cgn_MakeBRDis(cgn_GetBRDis(SYM));

-- Note that no actual code is emitted by this rule.
];
rule PLUS:
pattern: PLUS/P (expr/E1, expr/E2);
synthesizes: ^opd;
action:
[
  -- Evaluate the addends.
  SUBTARGET E1(^opd);
  SUBTARGET E2(^opd);

-- Initialize a new virtual register to hold the sum
  cgn_InitVReg(P);

-- Generate an add instruction
  cgn_MiThreeOp [
    type = E1.type;
    opr  = add,
    opd1 = E1.^opd,
    opd2 = E2.^opd,
    opd3 = P1.vreg
  ];

-- Synthesize result operand (the virtual reg holding the sum)
  ^opd = P1.vreg;
];

```
rule FETCH:
pattern: FETCH/F (lhs/L);
synthesizes: ^opd;
action:
[
  -- Evaluate the lhs address
  SUBTARGET L(^opd);

-- Initialize a new virtual register to hold the loaded value
  cgn_InitVReg(F);

-- Generate a load instruction
  cgn_MiMemOp [
    type = F.type,
    opr  = load,
    val  = F.vreg,
    addr = L.^opd
  ];

-- Synthesize result operand (the virtual reg holding loaded value)
  ^opd = F.vreg;
];

/* SOME SAMPLE ELEMENTAL PATTERNS AND RULES */ rule pSTORE:
pattern: pSTORE/S (POP/L, elemental_rhs/R);
action:
[
  -- Fortran language definition says the rhs of a STORE must be eval'd first
  SUBTARGET R(^opd);
  SUBTARGET L(^opd);

-- Generate PE code to store R into the address specified by L
  pe_cgn_MiMemOp [
    type = R.type,
    opr  = store,
    val  = R.^opd,
    addr = L.^opd
  ];

];

rule POP_first_time:
pattern: POP/P;
constraints: (NOT pe_cgn_HasVReg(P));
synthesizes: ^opd;
action:
```

[
  -- Initialize a new virtual register to hold the popped value/address
  pe_cgn_InitVReg(P);

-- Generate the pop
  pe_cgn_MiPopOp [
    type = P.type,
    dest = P.vreg
  ];

-- Return synthesized ^opd
  ^opd = P.vreg;
];

rule POP_already_popped:
pattern: POP/P;
constraints: pe_cgn_HasVReg(P);
synthesizes: ^opd;
action:
[
  -- Return already-existing virtual register
  ^opd = P.vreg;
];

rule pFETCH:
pattern: pFETCH/F (POP/L);
synthesizes: ^opd;
action:
[
  -- Evaluate the lhs address
  SUBTARGET L(^opd);

-- Initialize a new virtual register to hold the loaded value cgn_InitVReg(F);

-- Generate a load instruction
  pe_cgn_MiMemOp [
    type = F.type,
    opr  = load,
    val  = F.vreg,
    addr = L.^opd
  ];

-- Synthesize result operand (the virtual reg holding loaded value)
  ^opd = F.vreg;
];

rule pPLUS:
pattern: pPLUS (elemental_rhs/E1, elemental_rhs/E2);
synthesizes: ^opd;
action:
[
  -- Evaluate the addends.
  SUBTARGET E1(^opd);
  SUBTARGET E2(^opd);

-- Initialize a new virtual register to hold the sum
  cgn_InitVReg(P);

-- Generate an add instruction
  pe_cgn_MiThreeOp [
    type = E1.type;
    opr  = add,
    opd1 = E1.^opd,
    opd2 = E2.^opd,
    opd3 = P1.vreg
  ];

-- Synthesize result operand (the virtual reg holding the sum)
  ^opd = P1.vreg;
];

/* SAMPLE NON-ELEMENTAL PATTERN AND RULE */
rule CSHIFT:
pattern: pSTORE (array_desc/DST, CSHIFT (array_desc/SRC, expr/DIM, expr/AMT));
action:
  local argl : argument_list;
[
  -- Evaluate operands for CSHIFT call
  SUBTARGET SRC(^opd);
  SUBTARGET DIM(^opd);
  SUBTARGET AMT(^opd);
  SUBTARGET DST(^opd);

-- Construct the argument list for the CMRT call
  argl = cgn_MakeEmptyArgList();
  argl = cgn_AppendAddrToArgList(argl, DST.^opd);
  argl = cgn_AppendAddrToArgList(argl, SRC.^opd);
  argl = cgn_AppendValToArgList(argl, DIM.^opd);
  argl = cgn_AppendValToArgList(argl, AMT.^opd);

```
-- Make the call to CMRT_cshift
cgn_MiCallOp [
  args = argl;
  dest = CMRT_cshift;
];

]
```

V. Alternate Embodiment of the Present Invention

In the above sections (that is, sections I-IV) of this patent document, a first embodiment of the present invention was described wherein only elemental statements were considered to be PE executable. According to a second embodiment of the present invention, some non-elemental statements are also considered to be PE executable.

For example, PE executable statements may include non-elemental statements where minimal communication or communication following some predefined pattern occurs between processor elements. This may include grid communications (such as CSHIFT, EOSHIFT, and implicit shifting with array sections), reductions (such as SUM, MAXVAL, MINVAL, ANY, ALL, and COUNT), scans (such as SPREAD), and array multiplication (such as dot product and MATMUL).

Also, PE executable statements may include non-elemental statements where minimal communication and/or communication following some predefined pattern does not occur between processor elements. For example, PE executable statements may include GETs and SENDs.

Note that, in the second embodhnent of the present invention, the PE executable statements may also include the "FOR ALL" statement since the FOR ALL statement can be used to implement any of the statements listed above.

The second embodiment of the present invention is described in this section. Specifically, this section describes the modifications to the restructurer 112, encapsulator and parallelizer 128, and low level code generator 126 which are necessary to implement this second embodiment. Note that modifications to the front end 202 and the IR tree generator 214 are not necessary to implement this second embodiment.

A. Restructurer

Figure 27:
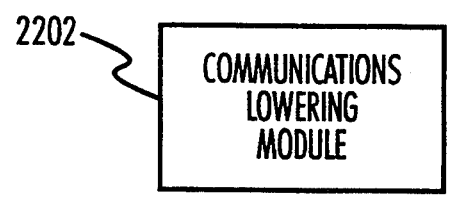
FIG. 27 illustrates the communications lowering module of the present invention.

According to the second embodiment of the present invention, the restructurer 112 includes a communications lowering module 2202 as shown in FIG. 27. This is in addition to the modules shown in FIG. 4.

The communications lowering module 2202 transforms communication operations on whole arrays to separate operations on multiple PEs. The net effect of the separate operations is equal to the effect of the original communication operations. The operation of the communications lowering module 2202 requires the definition of new operations (such as INPROC and LGET) which are local to PEs. These new operations are described below.

The communications lowering module 2202 walks through the lowered LIR statements (received from the IR Tree Generator 214—see FIG. 2) and determines whether each LIR statement is a non-elemental PE executable statement. In this context, an LIR statement is a node (and its children nodes) whose immediate parent is a List node that joins statements of a basic block. The communications lowering module 2202 processes each LIR statement which it identifies as a non-elemental PE executable statement. Such processing is represented by the flowchart in FIG. 23.

Figure 23:
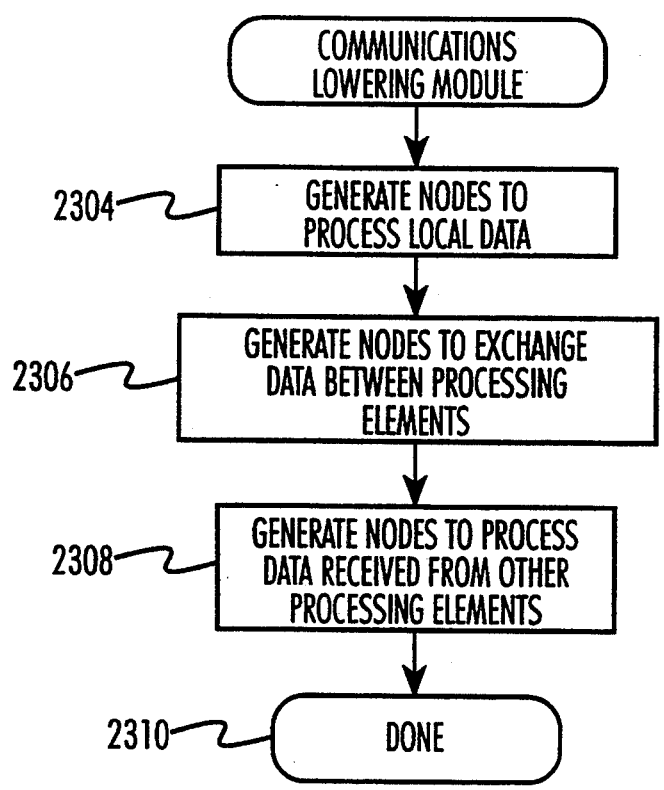
FIG. 23 illustrates a flowchart which represents the operation of a communications lowering module of the present invention.

The communications lowering module 2202 performs the steps shown in FIG. 23 for each LIR statement which it identifies as being a non-elemental PE executable statement. Essentially, in the steps shown in FIG. 23, the communications lowering module 2202 replaces a LIR statement (which has been identified as being a non-elemental PE executable statement) with multiple LIR statements. As noted above, in this context an LIR statement is a node (and its children nodes) whose immediate parent is a List node that joins statements of a basic block. The net effect of the statements is equal to the effect of the original LIR statement.

In step 2304, for an identified LIR statement (that is, a LIR statement that has been identified as being a non-elemental PE executable statement), the communications lowering module 2202 generates nodes to process local data. Local data is data which is stored in a local PE. The local PE is a PE which is executing the identified LIR statement.

In step 2306, the communications lowering module 2202 generates nodes to exchange data between processing elements.

In step 2308, the communications lowering module 2202 generates nodes to process, on the local PE, the data received from the other PEs.

The operation of the communications lowering module 2202 as represented in the flowchart of FIG. 23 shall be further described by way of an example. For purposes of the example, suppose the communications lowering module 2202 encounters the LIR statement shown in FIG. 25 while walking through the lowered LIR statements. The LIR statement in FIG. 25 translates to the following code statement:

$$A = B(V) + C \qquad \text{(code statement 1)}$$

Figure 25:
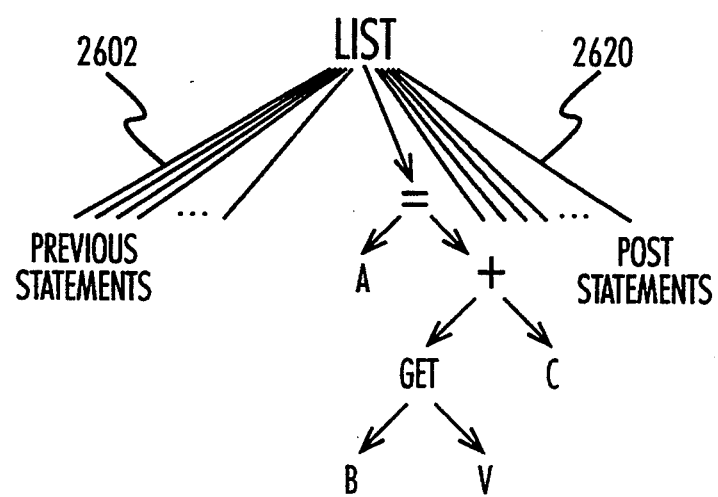
FIG. 25 illustrates LIR statements which are used in an example to illustrate the operation of the communications lowering module of the present invention.

The right hand side node of the LIR statement shown in FIG. 25 includes a GET node. According to the second embodiment of the present invention, GETs are non-elemental PE executable statements. Therefore, the communications lowering module 2202 would identify the LIR statement shown in FIG. 25 as a non-elemental PE executable statement. Consequently, the communications lowering module 2202 would perform the steps shown in FIG. 23 on the LIR statement shown in FIG. 25.

Figure 24:
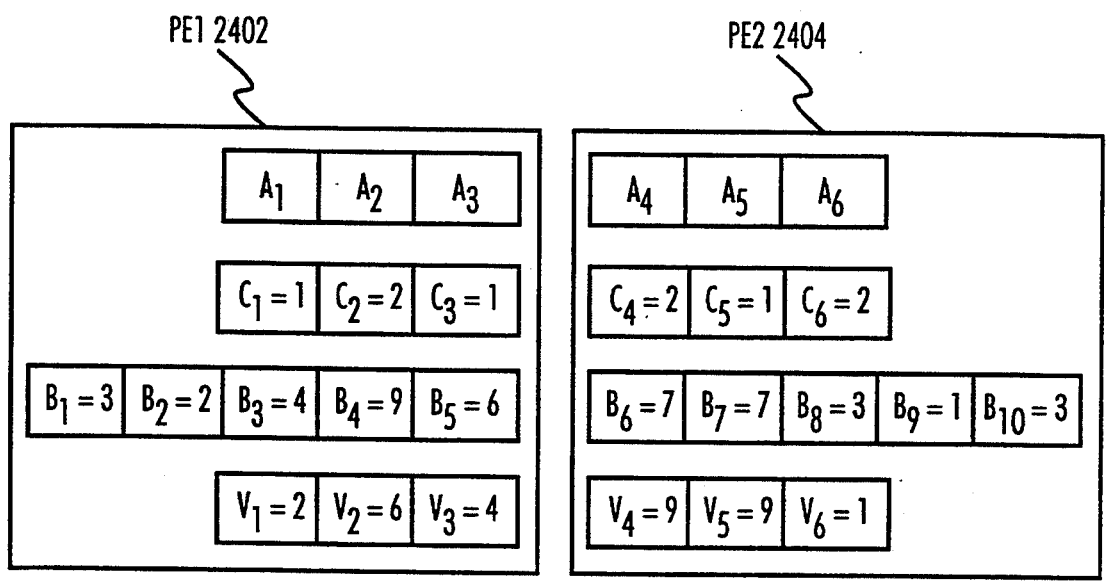
FIG. 24 illustrates a hardware environment which is used in an example to illustrate the operation of the communications lowering module of the present invention.

For purposes of the example, suppose FIG. 24 represents the state of the runtime environment when the statement shown in FIG. 25 is executed. FIG. 24 shows a first processing element PE1 2402 and a second processing element PE2 2404. Parallel variables A, C, and V each have six positions. As shown in FIG. 24, three positions of parallel variable A are located on PE1 2402 and three are located on PE2 2404. Similarly, three positions of parallel variables C and V are located on PE1 2402 and three are located on PE2 2404.

The parallel variable B has ten positions, five of which are located on PE1 2402 and five of which are located on PE2 2404. For this example, assume that parallel variables C, B and V have the following values:

C={1,2,1,2,1,2};
B={3,2,4,9,6,7,7,3,1,3};
V={2,6,4,9,9,1}.

Thus, code statement 1 is equivalent to the following:
A1=B(V1)+C1
A2=B(V2)+C2
A3=B(V3)+C3
A4=B(V4)+C4
A5=B(V5)+C5
A6=B(V6)+C6

Figure 26:
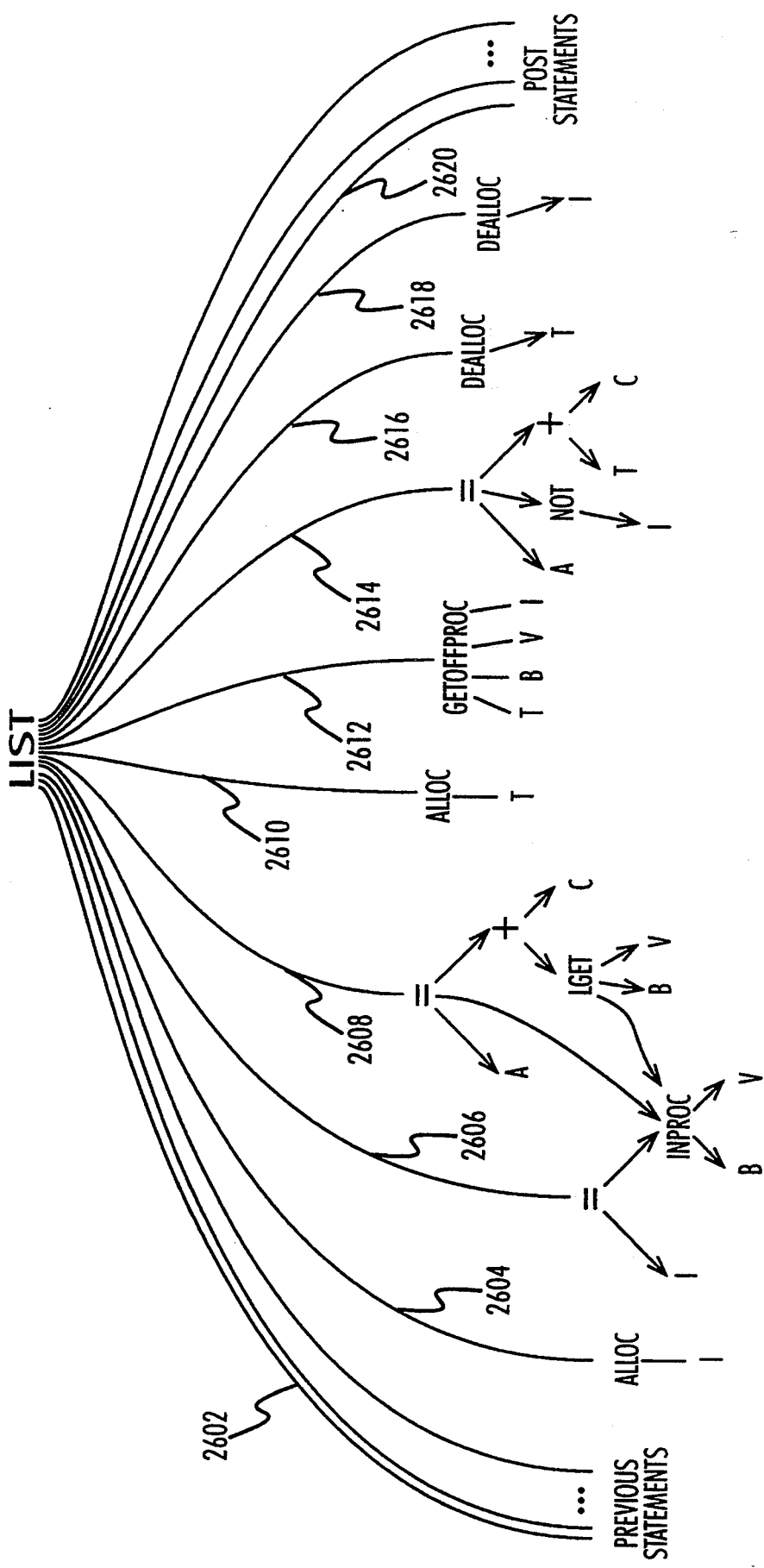
FIG. 26 illustrates LIR statements which are generated by the communications lowering module from those shown in FIG. 25.

In processing the steps shown in FIG. 23, the communications lowering module 2202 would transform the LIR statement shown in FIG. 25 to the nodes 2604–2618 shown in FIG. 26. Specifically, while processing step 2304, the communications lowering module 2202 would generate the nodes connected to branches 2604, 2606 and 2608.

While processing the step 2306, the communications lowering module 2202 would generate the nodes connected to branches 2610 and 2612.

While processing the step 2308, the communications lowering module 2202 would generate the nodes connected to branches 2614, 2616, and 2618.

The nodes generated during steps 2304, 2306, and 2308 would be inserted among other nodes (such as those connected to branches 2602 and 2620) associated with the current basic block.

In generating the nodes shown in FIG. 26, the communications lowering module 2202 uses new operations which are local to PEs. With regard to transforming the LIR statement shown in FIG. 25, these new operations are INPROC, LGET, and GETOFFPROC. As described below, INPROC and LGET are elemental statements. Therefore, INPROC and LGET are PE executable. GETOFFPROC, however, is a non-elemental statement involving communication between PEs. According to the second embodiment of the present invention, GETOFFPROC is defined as a non-PE executable statement. However, the present invention could be modified to include GETOFFPROC as a PE executable statement.

INPROC determines whether the values of B as indicated by the vector valued subscripts in V are contained in the local PE. Referring to FIG. 24, consider PE1 2402 (that is, suppose PE1 2402 is the local PE). PE1 2402 contains B1–B5. PE1 2402 also contains A1–A3 and C1–C3. Therefore, the vector valued subscripts of interest are V1–V3. As noted above, V1=2, V2=6, and V3=4. B2 (corresponding to V1=2) and B4 (corresponding to V3=4) are local to PE1 2402. B6 (corresponding to V2=6) is not local to PE1 2402. Therefore, with regard to PE1 2402, INPROC returns the following: {T,F,T}. This indicates that B(V1) and B(V3) are local to PE1 2402, but B(V2) is not local to PE1 2402. "T" stands for "true" and "F" stands for "false." Note that the results of INPROC are assigned to I.

LGET (which stands for Local Get) returns those values of B indexed by the vector valued subscripts in V which are local to PE1 2402 as indicated by the return value of INPROC. In other words, LGET only returns values of B where I=T. As indicated above, I is true at V1 and V3. Therefore, LGET returns B(V1)=B2=2 and B(V3)=B4=9.

The "=" operator connected to branch 2608 is redefined to update only those positions of A where INPROC returns true. These positions of A are A1 and A3. Therefore, A1=B2+C1=2+1=3. A3=B4+C3=9+1=10. At this point, A2 has not been updated.

GETOFFPROC causes PEs to exchange information. In the current example, GETOFFPROC causes other PEs to transfer to the local PE those values of B where I is false. As noted above, I is false at B(V2)=B6. B6 is located in PE2 2404. Therefore, GETOFFPROC causes PE2 2404 to transfer the value of B6 (in this case, 7) to PE1 2402.

The "=" operator connected to branch 2614 modifies only those values of A where not I is true. I is false at A2. Therefore, not I is true at A2. Therefore, the "=" operator updates A2 only. Specifically, A2=B6+C2=7+2=9.

The restructurer 112 invokes the modules shown in FIG. 4 after invoking the communications lowering module 2202. The modules shown in FIG. 4 receive the lowered IR produced by the communications lowering module 2202. The operation of the modules shown in FIG. 4 is essentially the same for both the first and second embodiments. However, according to the second embodiment, the modules shown in FIG. 4 operate on a PE executable versus non-PE executable basis, rather than an elemental versus non-elemental basis. For example, according to the second embodiment, the node classification module 406 would classify nodes as being either PE executable or non-PE executable (rather than classifying nodes as being elemental or non-elemental). This is accomplished by adding the new instructions that do not involve communication between PEs (such as INPROC and LGET) to the lookup table.

B. Encapsulator and Parallelizer

The operation of the encapsulator and parallelizer 128 is essentially the same for both the first and second embodiments of the present invention. However, according to the second embodiment, the encapsulator and parallelizer 128 operate on a PE executable versus non-PE executable basis, rather than an elemental versus non-elemental basis. Therefore, in block 704 shown in FIG. 7, the encapsulator and parallelizer 128 would classify statements as being either PE executable or non-PE executable when operating according to the second embodiment (rather than classifying statements as being elemental or non-elemental). This is accomplished by adding the new instructions that do not involve communication between PEs (such as INPROC and LGET) to the lookup table.

C. Low Level Code Generator

The operation of the low level code generator 126 is essentially the same for both the first and second embodiments of the present invention. However, with regard to the second embodiment, the low level code generator 126 must be able to handle the new nodes described in this section (that is, Section V). For example, the low level code generator 126 must be able to handle LGET, INPROC, and GETOFFPROC. Note that the handling of these new nodes is analogous to the handling of existing nodes. For example. LGET represents a fetch from offset memory locations. INPROC represents a group of less than/greater than comparisons. GETOFFPROC represents a call to a new runtime function which executes on the local PEs.

These and other aspects of the present invention are further described in the patent applications entitled "System and Method for Mapping an Array to Processing Elements", Ser. No. 07/829,480, abandoned, "System and Method for Compiling Towards a Super-Pipelined Architecture", Ser. No. 07/827,945, and "Parallel Vector Machine Model", Ser. No. 07/827,942, now U.S. Pat. No. 5,274,818. These patent applications were cited above.

It should be understood that the present invention is not limited to the embocliments indicated above, and that the examples presented above are merely for the purposes of illustration. The scope of the present invention should therefore be interpreted by the following claims as defined by the foregoing figures and text.

What is claimed is:

1. A computer-based method of optimizing a computer program to generate an optimized computer program, the optimized computer program to be executed in a data parallel computer comprising a plurality of processors, the computer program represented by at least one representation tree comprising a plurality of nodes, said nodes comprising non-elemental nodes which require communication among processors and elemental nodes which do not require communication among processors, the method comprising the steps of:
   (1) traversing to a node of the representation tree using a predetermined traversal sequence;
   (2) determining whether said node requires communication among processors and is therefore a non-elemental node; and
   (3) in response to said determination, restructuring said nodes within said representation tree such that said node is grouped with other non-elemental nodes.

2. The method of claim 1, wherein said step (2) comprises the step of determining that said node is non-elemental if a parent node of said node is non-elemental.

3. The method of claim 1, wherein step (3) comprises the step of restructuring said nodes within the representation tree such that, during execution of said optimized computer program, said node and all other non-elemental nodes are executed before execution of any elemental nodes.

4. The method of claim 1, further comprising the step of inserting into the representation tree at an original position of said node a reference to a restructured position of said node, such that after execution of step (3) said node located in said restructured position can be accessed by referring to said original position of said node in the representation tree.

5. The method of claim 1, further comprising the step of repeating steps (1)–(3) until all nodes of the representation tree have been traversed.

6. A computer-based method for optimizing a computer program to generate an optimized computer program, the optimized computer program to be executed in a data parallel computer comprising a plurality of processors, the computer program comprising a plurality of non-elemental statements which require communication among processors and elemental statements which do not require communication among processors, the method comprising the steps of:
   (1) classifying each of said statements as elemental or non-elemental;
   (2) identifying a block of two or more contiguous statements each having been classified as elemental; and
   (3) creating a block identifier and associating said block identifier with said identified block, such that said identified block is subsequently compliable as a single statement.

7. The method of claim 6, further comprising the step of classifying a statement as being parallel-processing-element (PE) executable if the statement requires inter-processor communication that satisfies predetermined communication characteristics, and wherein step (2) comprises the step of identifying a block comprising two or more contiguous elemental statements and PE executable statements.

8. The method of claim 7, wherein a statement requiring inter-processor communication satisfies said predetermined communication characteristics if the inter-processor communication required by the statement adheres to a predefined inter-processor communication pattern.

9. The method of claim 6, wherein step (1) comprises the step of using a look-up table stored in a memory device to classify each of said statements as elemental or non-elemental.

10. A computer-based method for optimizing a computer program to generate an optimized computer program, the optimized computer program to be executed in a computer comprising a scalar portion, a parallel portion, and an intermediary memory accessible by both the scalar portion and the parallel portion, the computer program comprising a contiguous block of elemental statements which do not require communication among processors in the parallel portion, said elemental statements represented by representation trees each comprising a plurality of nodes, the method comprising the steps of:
   (1) traversing to a node in one of the representation trees using a predetermined traversal sequence;
   (2) determining whether said node is a variable; and
   (3) creating, if said node is a variable, a store instruction node and a corresponding retrieve instruction node, wherein said store instruction node when executed in the computer enables the scalar portion to store a value of said variable in the intermediary memory, and said retrieve instruction node when executed in the computer enables the parallel portion to retrieve said value of said variable from said intermediary memory.

11. The method of claim 10, further comprising the step of adding said store instruction node and said retrieve instruction node to said representation tree.

12. The method of claim 10, further comprising the step of repeating steps (1)–(3) for each node in said representation tree.

13. The method of claim 10, wherein said intermediary memory comprises a first-in first-out (FIFO) queue stored ill a memory device of said computer.

14. A method of generating a target computer program from a source computer program, the target computer program to be executed in a processor array comprising a plurality of processors, the source computer program including a plurality of instructions each represented by a representation tree having a plurality of nodes, each node being a non-elemental node involving communication among processors or an elemental node not involving communication among processors, said method comprising the steps of:
   (1) determining whether an instruction exists in the source computer program wherein the instruction, when executed in at least one of said processors of the processor array, enables said at least one of said processors to process elements of an array, wherein said array elements comprise local array elements maintained by each of said at least one of said processors during execution of the target computer program, and non-local array elements which are maintained by other processors of the processor array during execution of the target computer program;

(2) selecting said instruction in response to said determination;

(3) determining whether said selected instruction includes at least one non-elemental node;

(4) identifying, in response to said determination, whether all non-elemental nodes of said selected instruction satisfy predetermined communication characteristics;

(5) transforming, in response to said identification, said selected instruction to a plurality of lower intermediate representation (LIR) instructions, comprising the steps of (a) generating one or more LIR instructions which, when executed in the processor array, enable the transfer of said non-local array elements from said other processors to said at least one of said processors, (b) generating one or more LIR instructions which, when executed in said at least one of said processors, enable said at least one of said processors to process said local and non-local array elements, and (c) storing said generated LIR instructions in the target computer program.

15. The method of claim 14, wherein step (b) comprises the steps of:

generating one or more LIR instructions which, when executed in said at least one of said processors, enable said at least one of said processors to identify local array elements which are processed during execution of said selected instruction; and generating one or more LIR instructions which, when executed in said at least one of said processors, enable said at least one of said processors to retrieve said identified local array elements from a memory of said at least one of said processors.

16. The method of claim 15, wherein step (b) further comprises the step of:

generating one or more LIR instructions which, when executed in said at least one of said processors, enable said at least one of said processors to store the results of said processing of said local and non-local array elements in particular locations of said array.

17. The method of claim 14, wherein step (b) comprises the steps of:

(i) generating one or more LIR instructions which, when executed in said at least one of said processors, enable said at least one of said processors to identify non-local array elements which are processed during execution of said selected instruction;

(ii) generating one or more LIR instructions which, when executed in said processor array, enable said other processors to transfer said identified non-local array elements to said at least one of said processors; and (iii) generating one or more LIR instructions which, when executed in said at least one of said processors, enable said at least one of said processors to receive from said other processors said identified non-local array elements.

18. The method of claim 17, wherein said LIR instructions generated in step (ii), when executed in the processor array, command said other processors to transfer said identified non-local array elements to said at least one of said processors.

19. The method of claim 14, wherein step (5) further comprises the steps of:

generating one or more LIR instructions which, when executed in said processor array, enable said processor array to identify local array elements which are processed at said other processors during execution of said selected instruction; and generating one or more LIR instructions which, when executed in said processor array, enable said at least one of said processors to transfer said identified local array elements to said other processors.

* * * * *